US00RE47858E

(19) United States
(12) Reissued Patent
Zhu et al.

(10) Patent Number: US RE47,858 E
(45) Date of Reissued Patent: Feb. 11, 2020

(54) METHOD AND SYSTEM FOR MAINTAINING SESSION CONTINUITY WHEN CHANGES OCCUR AT THE TERMINAL DURING A SESSION

(71) Applicant: HUAWEI TECHNOLOGIES CO., LTD., Shenzhen, Guangdong (CN)

(72) Inventors: Dongming Zhu, Shenzhen (CN); Hui Li, Shenzhen (CN); Jiongjiong Gu, Shenzhen (CN); Baofeng Zhang, Shenzhen (CN); Shibi Huang, Shenzhen (CN)

(73) Assignee: HUAWEI TECHNOLOGIES CO., LTD., Shenzhen, Guangdong (CN)

(21) Appl. No.: 14/584,662

(22) Filed: Dec. 29, 2014

Related U.S. Patent Documents

Reissue of:
(64) Patent No.: 8,625,527
Issued: Jan. 7, 2014
Appl. No.: 11/649,022
Filed: Jan. 3, 2007

U.S. Applications:
(63) Continuation of application No. PCT/CN2005/002240, filed on Dec. 19, 2005.

(30) Foreign Application Priority Data

Dec. 17, 2004 (CN) ..... 2004 1 0101259
Dec. 31, 2004 (CN) ..... 2004 1 0082358
(Continued)

(51) Int. Cl.
*H04W 72/02* (2009.01)
*H04W 36/00* (2009.01)
*H04L 29/06* (2006.01)

(52) U.S. Cl.
CPC ..... *H04W 36/0022* (2013.01); *H04L 65/1083* (2013.01)

(58) Field of Classification Search
CPC ..... H04L 12/5692; H04W 88/08
(Continued)

(56) References Cited

U.S. PATENT DOCUMENTS 5,940,762 A 8/1999 Lee et al.
6,236,359 B1 * 5/2001 Watters et al. ..... 342/357.1
(Continued)

FOREIGN PATENT DOCUMENTS

CN 1545818 11/2004
CN 1545818 A 11/2004
(Continued)

OTHER PUBLICATIONS

Kimberley Keeton, Bruce A. Mah, Srinivasan Seshan, Randy H. Katz, and Domineco Ferrari, "Providing Connection-Oriented Network Services to Mobile Hosts," Proceedings of the USENIX Symposium on Mobile and Location-Independent Computing, Cambridge, Massachusetts, Aug. 1993, total 20 pages.
(Continued)

*Primary Examiner* — Fred O Ferris, III
(74) *Attorney, Agent, or Firm* — Gregg L. Jansen

(57) ABSTRACT

A method and a system for maintaining session continuity, in which the system includes a Handover Source Function (HOSF), a Handover Destination Function (HODF), a Handover Anchor Function-Control Plane (HOAF-CP) and a Handover Anchor Function-User Plane (HOAF-UP). The method includes a first user establishing a connection through the HOSF with the HOAF-CP and the HOAF-UP which correspond to a second user, so as to establish a session with the second user. The method further includes that, during session handover, the HODF that corresponds to the HOSF establishing another connection with the HOAF-CP and HOAF-UP though which the first user continues the session with the second user, so as to maintain the session continuity. When access address or access technology of the
(Continued)

terminal changes, or even the terminal changes during a session, the method and the system can logically replace the connection before the handover with a new connection to ensure the session continuity.

64 Claims, 18 Drawing Sheets

(30) Foreign Application Priority Data

Mar. 8, 2005 (CN) ..... 2005 1 0033578
Mar. 30, 2005 (CN) ..... 2005 1 0063705
Jun. 10, 2005 (CN) ..... 2005 1 0035265

(58) Field of Classification Search
USPC ..... 354/331; 455/436
See application file for complete search history.

(56) References Cited

U.S. PATENT DOCUMENTS 6,501,952 B1 12/2002 Foster et al.
6,522,880 B1 2/2003 Verma et al.
6,813,496 B2 * 11/2004 Numminen ..... H04W 12/08 455/411
6,861,980 B1 * 3/2005 Rowitch et al. ..... 342/357.06
6,975,864 B2 * 12/2005 Singhal et al. ..... 455/438
6,980,535 B2 * 12/2005 Bennett ..... H04W 36/0083 370/331
7,010,301 B2 3/2006 Foster et al.
7,171,209 B2 * 1/2007 Numminen ..... H04W 8/12 455/428
7,272,413 B2 * 9/2007 Yu ..... H04L 69/18 455/418
7,299,048 B2 11/2007 Lim et al.
7,469,142 B2 12/2008 Nelakanti et al.
7,508,793 B2 * 3/2009 Haddad ..... H04L 29/1232 370/331
7,512,336 B1 * 3/2009 Meli et al. ..... 398/17
7,583,625 B2 * 9/2009 Bennett ..... 370/313
7,660,584 B2 * 2/2010 Maxwell ..... H04L 29/12047 370/331
7,664,501 B2 * 2/2010 Dutta ..... H04W 36/005 370/331
7,693,541 B1 4/2010 Shao et al.
7,869,406 B2 1/2011 Kim et al.
8,144,659 B2 * 3/2012 Yamamoto ..... H04W 36/0011 370/329
8,625,527 B2 1/2014 Zhu et al.
8,639,248 B2 * 1/2014 Giustina ..... H04L 12/5692 370/331
2001/0009544 A1 * 7/2001 Vanttinen et al. ..... 370/338
2001/0033563 A1 * 10/2001 Niemela et al. ..... 370/349
2002/0035699 A1 * 3/2002 Crosbie ..... 713/201
2003/0016654 A1 * 1/2003 Das et al. ..... 370/351
2003/0050077 A1 * 3/2003 Takeuchi et al. ..... 455/456
2003/0103496 A1 * 6/2003 Lakshmi Narayanan et al. ..... 370/352
2004/0242227 A1 * 12/2004 Huotari et al. ..... 455/432.1
2004/0246990 A1 * 12/2004 Krishnamurthi et al. .... 370/466
2005/0040790 A1 2/2005 Ito et al.
2006/0126565 A1 * 6/2006 Shaheen ..... H04W 36/0022 370/331
2006/0258358 A1 * 11/2006 Kallio ..... H04W 36/0066 455/437
2007/0104205 A1 * 5/2007 Baik ..... 370/395.3
2007/0153675 A1 * 7/2007 Baglin et al. ..... 370/216
2007/0155386 A1 * 7/2007 Wahl ..... H04L 29/06027 455/436
2007/0281699 A1 * 12/2007 Rasanen ..... 455/436
2008/0205345 A1 * 8/2008 Sachs ..... H04W 36/0011 370/332

FOREIGN PATENT DOCUMENTS

EP 1843614 A1 * 10/2007 ..... H04L 29/06027
WO 0131963 A1 5/2001
WO 0182551 A2 11/2001
WO 02/33999 A1 4/2002
WO 02104057 A1 12/2002
WO WO 02104057 A1 * 12/2002
WO 2004/025930 A1 3/2004
WO 2004025930 A1 3/2004

OTHER PUBLICATIONS

Bruce A. Mah, Srinivasan Seshan, Kimberly Keeton, Randy H. Katz, and Domenico Ferrari, "Providing Network Video Service to Mobile Clients," Proceedings of the Fourth Workshop on Workstation Operating Systems, Napa, CA. Oct. 1993. total 7 pages.
Srinivasan Seshan, "Low-Latency Handoff of Cellular Data Networks," Dissertation submitted in partial satisfaction of the requirements for the degree of Doctor of Philosophy in Computer Science in the Graduate Division of the University of California Berkeley, 1995, total 184 pages.
Ramon Caceres and Venkata N. Padmanabhan, "Fast and Scalable Handoffs forWirelesss Internetworks," Mobicom 96, Rye, NY, Nov. 11, 1996, total 11 pages.
Srinivasan Seshan, Hadri Balakrishnan, and Randy H. Katz, "Handoffs in Cellular Wireless Networks: The Daedalus Implementation and Experience," Kluwer Journal on Wireless Personal Communications, Jan. 1997, total 18 pages.
Ramon Caceres and Venkata N. Padmanabhan, "Fast and scalable wireless handoffs in support of mobile Internet audio," Mobile Networks and Applications, 1998, pp. 351-363, vol.3, total 13 pages.
David A. Maltz and Pravin Bhagwat, "MSOCKS: An Architecture for Transport Layer Mobility" IEEE, 1998, total 9 pages.
Mark Stemm and Randy H. Katz, "Verticle handoffs in wireless overlay networks," Mobile Networks and Applications, Mar. 1998, pp. 335-350, total 16 pages.
Charles E. Perkins and Kuang-Yeh Wang, "Optimized Smooth Handoffs in Mobile IP," Research Gate, Feb. 1999, total 8 pages.
Wedlund, Elin and Henning, Schulzrinne, "Mobility support using SIP," in Proceedings of the 2nd ACM international workshop on Wireless mobile multimedia, pp. 76-82. ACM, 1999. total 7 pages.
Campbell, Andrew T. and Javier Gomez-Castellanos, "IP micro-mobility protocols," ACM SIGMOBILE Mobile computing and Communications Review 4, No. 4 (2000):45-53. total 9 pages.
Charles E. Perkins, "Recent Activities in MobileIPv6," Nokia Research Center, Mountain Vew, CA USA, 2000, total 31 pages.
S. Glass, T. Hiller, S. Jacobs, and C. Perkins, "Mobile IP Authentication,Authorization, and Accounting Requirements," Network Working Group, Information for the Internet Community Memo, Oct. 2000, pp. 1-27, total 27 pages.
Lennox, Jonathan, Kazutaka Murakami, Mehmet Karaul, and Thomas F. La Porta, "Interworking Internet telephony and wireless telecommunications networks," ACM SIGCOMM Computer Communication Review 31, No. 5 (2001):25-36. total 9 pages.
Charles Perkins and David, B. Johnson, "Route Optimization in Mobile IP," Mobile IP Working Group, Internet Draft. Sep. 6, 2001, total 27 pages.
G. Montenegro, Ed., "Reverse Tunneling for Mobile IP, revised," Network Working Group, Information for the Internet community Memo, Jan. 2001, pp. 1-30, total 30 pages.
Dutta, Ashutosh, Faramak Vakil, Jyh-Cheng Chen, Miriam Tauil, Shinichi Baba, Nobuyasu Nakajima, and Henning Schulzrinne, "Application layer mobility management scheme for wireless internet." in 3G Wireless, pp. 1-7. 2001. total 7 pages.
Han-Chieh Chao, Wei-Ming Chen, and Yen-Ming Chu, "A Low Latency Handoff Algorithm for Voice over IP Traffics in the Next Generation Packet-Based Cellular Networks: Cellular Mobile IPv6", Wireless Personal Communications 23:353-78, Nov. 2002, total 27 pages.

(56) References Cited

OTHER PUBLICATIONS

Ted Taekyoung Kwon, Mario Gerla, Sajal Das, and Subir Das, "Mobility Management for VoIP Service: *Mobile IP* vs. *SIP*," IEEE Wireless Communications, vol. 9, Issue 5, Oct. 2002, pp. 66-75, total 10 pages.
Zhimei Jiang, Kin K. Leung, Byoung-Jo J. Kim, and Paul Henry, "Seamless Mobility Management Based on Proxy Servers," Wireless Communications and Networking Conference, 2002, WCNC2002, 2002 IEEE, vol. 2, pp. 563-568, total 6 pages.
Zhimei Jiang, Kin K. Leung, Byoung-Jo J. Kim, and Paul Henry Fabio M. Chiussi, Denis A. Khotimsky, and Santosh Krishnan, "Mobility Management in Third-Generation All-IP Networks," Topics in Wireless Communications, IEEE communications Magazine, Sep. 2002, pp. 124-135, total 12 pages.
C. Perkins, Ed., "IP Mobility Support for IPv4," Network Working Group, Information for the Internet Community, Aug. 2002, pp. 1-99, total 99 pages.
Dutta, Ashutosh, O. Altintas, H. Schulzrinne, and W. Chen, "Multimedia SIP sessions in a mobile heterogeneous access environment," In prihvateno za World Wireless Congress. 2002. total 6 pages.
Shelley Zhuang, Kevin Lai, Ion Stoica, Randy Katz and Scott Shenker, "Host Mobility Using an Internet Indirection Infrastructure," Proceedings of MobiSys 2003: The First International Conference on Mobile Systems, Applications, and Services, San Francisco, May 5-8, 2003, Uninix Association, pp. 128-144, total 17 pages.
D. Johnson, C. Perkins, and J. Arkko, "Mobility Support in IPv6," Network Working Group, Standards Track, The Internet Society, Jun. 2004, pp. 1-165, total 165 pages.
Andrew T. Campbell, Javier Gomez, Sanghyo Kim, Andras G. Valko, Chieh-Yih Wan, and Zoltan R. Turanyi, "Design, Implementation, and Evaluation of Cellular IP," IEEE Personal Communications, vol. 7, Issue 4, Aug. 2000, pp. 42-49, total 8 pages.
Marco Carli, Alessandro Neri, and Andrea Rem Picci, "Mobile IP and Cellular IP Integration for Inter Access Networks Handoff," Communications, 2001, ICC 2001, IEEE International Conference, vol. 8, pp. 2467-2471, total 5 pages.
Alex C. Snoeren and Had Balakrishnan, "An End-to End Approach to th Host Mobility," 6th ACM/IEEE International Conference on Mobile Computing and Networking, MobiCom '00, total 12 pages.
Solomon, James D., "Mobile IP—The Internet Unplugged," PTR Prentice Hall, Upper Saddle River, NJ (1998). total 367 pages.
Charles E. Perkins, "Mobile IP," IEEE Communications Magazine, May 1997, pp. 84-99, total 12 pages.
Charles E. Perkins, "Mobile Networking Through Mobile IP," IEEE Internet Computing, vol. 2, Issue 1, Jan./Feb. 1998, pp. 58-69, total 12 pages.
Ana Victoria Delgado Martin, Andrej Mihailovic, Nikos Georganopoulos, and A.H. Aghvami, "Adaptation of Transport Protocols for an IP-Micromobility Scheme," Communications, 2001, ICC 2001, IEEE International Conference, vol. 8, pp. 2462-2466, total 5 pages.
Janise NcNair, Ian F. Akyildiz, and Michael D. Bender, "Handoff for Real-Time Traffic in Mobile IP Version 6 Networks," Global Telecommunications Conference, 2001, Globecom '01, IEEE, vol. 6, pp. 3463-3467, total 5 pages.
Seung Jei Yang and Sung Han Park, "A Dynamic Service Range-Based Multicast Routing Scheme Using RSVP in Mobile IP Networks," Global Telecommunications Conference, 2001, Globecom '01, IEEE, vol. 4, pp. 2395-2399, total 5 pages.
R. Ramjee, T. La Porta, L. Salgarelli, S. Thuel, K. Varadhan, and L. Li, "IP-based Access Network Infrastructure for Next Generation Wireless Data Networks," IEEE Personal Communications 7(4):34-41, total 24 pages.
Henning Schulzrinne and Elin Wedlund, "Application-Layer Mobility Using SIP," Service Portability and Virtual Customer Environments, 2000 IEEE, pp. 29-36, total 9 pages.
3GPP "3rd Generation Partnership Project; Technical Specification Group Services and Systems Aspects; Evolution of the GSM platform towards UMTS (3G TR 23.920 version 2.0.0) (also published as SP-99291)", Jun. 21-23, 1999, total 54 pages.
Heikki Kaaranen et al., "UMTS Networks: Architecture, Mobility and Services," John Wiley & Sons Ltd., Chichester, (2001) 1st Edition, total 320 pages.
Yi-Bing Lin and Imrich Chlamtac, "Wireless and Mobile Network Architectures," John Wiley & Sons, Inc., New York, (2001), total 548 pages.
Declaration of Srinivasan Seshan, Ph.D., Submitted with Petition for Inter Partes Review of U.S. Pat. No. 8625527, Trial No. IPR2017-00674. Dated Jan. 19, 2017. Total 131 pages. Exhibit 1002.
Soloman, James D., Mobile IP: The Internet Unplugged, Prentice Hall, Upper Saddle River, New Jersey (1998). pp. vii-xii, xxv, 1-2, 7-8, 16-26, 35-40, 47-61, 63-84, 89-95, 99-102, 115-118, 155-163, 199-245, 273-277, 301-305, 307-309. total 156 pages. Exhibit 1003.
Lin, Yi-Bing et al., Wireless and Mobile Network Architectures, John Wiley and Sons, New York (2001), pp. ii-iii, v-xviii, 1-6, 15-23, 93-95, 162-169, 197-200, 239-242, 275-282, 287-302, 305-307, 335-361, 413-416. Total 109 pages. Exhibit 1004.
USPTO Final Office Action in U.S. Appl. No. 11/649,022, from File History of U.S. Pat. No. 8625527. Dec. 7, 2012. Total 34 pages Exhibit 1005.
Amendment and Response, in U.S. Appl. No. 11/649,022, from File History of U.S. Pat No. 8625527. Jun. 28, 2012. Total 27 pages Exhibit 1006.
Amendment and Response to Final Office Action, in U.S. Appl. No. 11/649,022, from File History of U.S. Pat. No. 8625527. Mar. 1, 2013. Total 29 pages. Exhibit 1007.
Notice of Allowance, in U.S. Appl. No. 11/649,022, from File History of U.S. Pat. No. 8625527. Oct. 25, 2013. Total 32 pages. Exhibit 1011.
Joint Claim Construction and Prehearing Statement filed Dec. 9, 2016, in *Huawei Technologies Co. Ltd.* v. *T-Mobile U.S., Inc.* and *T-Mobile USA, Inc.*, Case No. 2:16-cv-00057-JRG-RSP (E.D. Texas), pp. 1-26. Exhibit 1012.
T-Mobile and Nokia Invalidity Contentions (Case No. 2:16-cv-00057-JRG-RSP, E.D. Texas), filed Aug. 11, 2016. Total 224 pages.
Claim Chart (Exhibit A-1) filed with T-Mobile and Nokia Invalidity Contentions (Case No. 2:16-cv-00057-JRG-RSP, E.D. Texas), filed Aug. 11, 2016. Total 110 pages.
Claim Chart (Exhibit A-2) filed with T-Mobile and Nokia Invalidity Contentions (Case No. 2:16-cv-00057-JRG-RSP, E.D. Texas), filed Aug. 11, 2016. Total 97 pages.
Claim Chart (Exhibit A-3) filed with T-Mobile and Nokia Invalidity Contentions (Case No. 2:16-cv-00057-JRG-RSP, E.D. Texas), filed Aug. 11, 2016. Total 89 pages.
Claim Chart (Exhibit A-4) filed with T-Mobile and Nokia Invalidity Contentions (Case No. 2:16-cv-00057-JRG-RSP, E.D. Texas), filed Aug. 11, 2016. Total 108 pages.
Claim Chart (Exhibit A-5) filed with T-Mobile and Nokia Invalidity Contentions (Case No. 2:16-cv-00057-JRG-RSP, E.D. Texas), filed Aug. 11, 2016. Total 190 pages.
Petition for Inter Partes Review of U.S. Pat. No. 8,625,527 Under 35 U.S.C. § 312 and 37 C.F.R. § 42.104, filed Jan. 20, 2017. Total 85 pages.
K. Daniel Wong et al: "A multilayered mobility management scheme for auto-configured wireless IP networks", IEEE wireless communications, dated Oct. 2003, total 8 pages.
Henning Schulzrinne et al: "Application-layer mobility using SIP",XP00992003, Mobile computing and communications review vol. 4, dated Jul. 2000, total 11 pages.
"IP Multimedia Subsystem IMS Service Architecture", Lucent Technologies White Paper, dated Jan. 23, 2004, total pages.
"3rd Generation Partnership Project; Technical Specification Group Core Network; IP Multimedia (IM) session handling;IM call model; Stage 2 (Release 6)", 3GPP TS 23.218 V6.2.0, dated Sep. 2004, total 56 pages.
"3rd Generation Partnership Project; Technical Specification Group Services and System Aspects; IP Multimedia Subsystem (IMS);Stage 2 (Release 6)", 3GPP TS 23.228 V6.7.0, dated Sep. 2004, total 180 pages.

(56) References Cited

OTHER PUBLICATIONS

"3rd Generation Partnership Project;Technical Specification Group Services and System Aspects;IP Multimedia (IMS),Stage 2(Release 6)", 3GPP TS 23.228 V6.9.0, dated Mar. 2005, total 179 pages.
"3rd Generation Partnership Project;Technical Specification Group Core Network;IP Multimedia Call Control Protocol based on Session Initiation Protocol (SIP) and Session Description Protocol (SDP);Stage 3(Release 6)", 3GPP TS 24.229 V6.4.0, dated Sep. 2004,. total 299 pages.
"3rd Generation Partnership Project;Technical Specification Group Core Network;IP Multimedia Call Control Protocol based on Session Initiation Protocol (SIP) and Session Description Protocol (SDP);Stage 3(Release 6)", 3GPP TS 24.229 V6.6.0, dated Mar. 2005, total 291 pages.
R. Shacham et al: "Session Initiation Protocol (SIP) Session Mobility draft-shoehorn-sipping-session-mobility-00", Shpiing Internet-Draft, dated Feb. 14, 2005, total 32 pages.
J. Rosenberg et al: "SIP: Session Initiation Protocol", RFC 3261, Network Working Group, dated Jun. 2002, total 202.
R. Sparks: "The Session Initiation Protocol (SIP) Refer Method", RFC 3515, Network Working Group, dated Apr. 2003, total 24 pages.
R. Mahy: "The Session Initiation Protocol (SIP) "Replaces" Header", RFC 3891, Network Working Group, dated Sep. 2004, total 17 pages.
Decision Denying Institution of Inter Partes Review, Case IPR2017-00674, *T-MOBILE U.S., INC.* and *T-MOBILE USA, INC.,* Petitioner v. *HUAWEI TECHNOLOGIES CO. LTD.,* Patent 8,625,527, Aug. 7, 2017, total 21 pages.
Decision Denying Institution of Inter Partes Review, Case IPR2017-00675, *T-MOBILE U.S., INC.* and *T-MOBILE USA, INC.,* Petitioner v. *HUAWEI TECHNOLOGIES CO. LTD.,* Patent 8,625,527, Aug. 7, 2017, total 23 pages.
3GPP TS 23.205 V5.0.0 (Dec. 2001), 3rd Generation Partnership Project; Technical Specification Group Core Network; Bearer-independent circuit switched core network; Stage 2(Release 5), 182 pages.
James D. Solomon, "MOBILE IP, The Internet Unplugged", Prentice-Hall, Inc., Upper Saddle River, NJ, 1998, pp. 85-88, total 6 pages.
Patent Owner Huawei Technologies' Preliminary Response, Case IPR2017-00674, *T-Mobile U.S.* v. *Huawei,* Patent 8,625,527, May 8, 2017, total 42 pages.
Patent Owner Huawei Technologies' Preliminary Response, Case IPR2017-00675, *T-Mobile U.S.* v. *Huawei,* Patent 8,625,527, May 8, 2017, total 42 pages.
Lucent Technologies White Paper, "IP Multimedia Subsystem (IMS) Service Architecture." Jan. 23, 2004. XP-002407116,pp. 1-12.*
International Search Report: PCT/CN2005/002240.
Schulzrinne et al., Application-Layer Mobility Using SIP, XP-000992003, Mobile Computing and Communications Review, vol. 5, No. 3, Jul. 2000 (11 pgs.).
Wong et al., A Multilayered Mobility Management Scheme for Auto-Configured Wireless IP Networks, IEEE Wireless Communications, Oct. 2003 (8 pgs.).
Shacham et al., Session Initiation Protocol (SIP) Session Mobility, Sipping, Internet-Draft, Feb. 14, 2005 (31 pgs.).
Written Opinion of the International Searching Authority (translation) dated (mailed) Mar. 2, 2006, issued in related Application No. PCT/CN2005/002240, filed Dec. 19, 2005, Huawei Technologies Co., Ltd. (3 pgs.).
European Patent Office Communication pursuant to Article 44a EPC, Extended European search report, supplementary European search report (Art. 157(2)(a) EPC) and the European search opinion for Application No. 05820665.7, mailed Nov. 13, 2007, Huawei Technologies C., LTD (8 pgs.).
Sparks, The Session Initiation Protocol (SIP) Refer Method, Network Working Group, Request for Comments: 3515, Category: Standards Track, dated Apr. 2003 (23 pgs.).
Mahy, The Session Initiation Protocol (SIP) "Replaces" Header, Network Working Group, Request for Comments: 3891, Category: Standards Track, dated Sep. 2004 (16 pgs.).

* cited by examiner

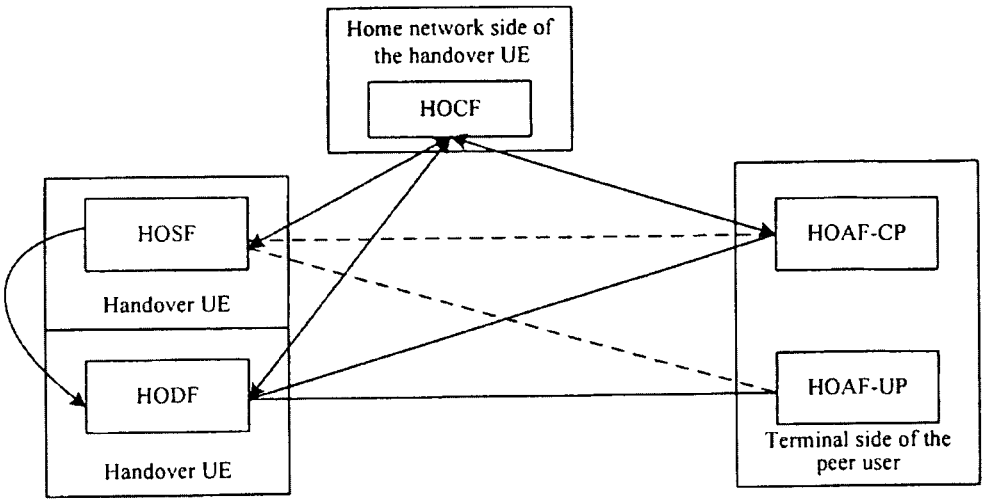
Figure 3B
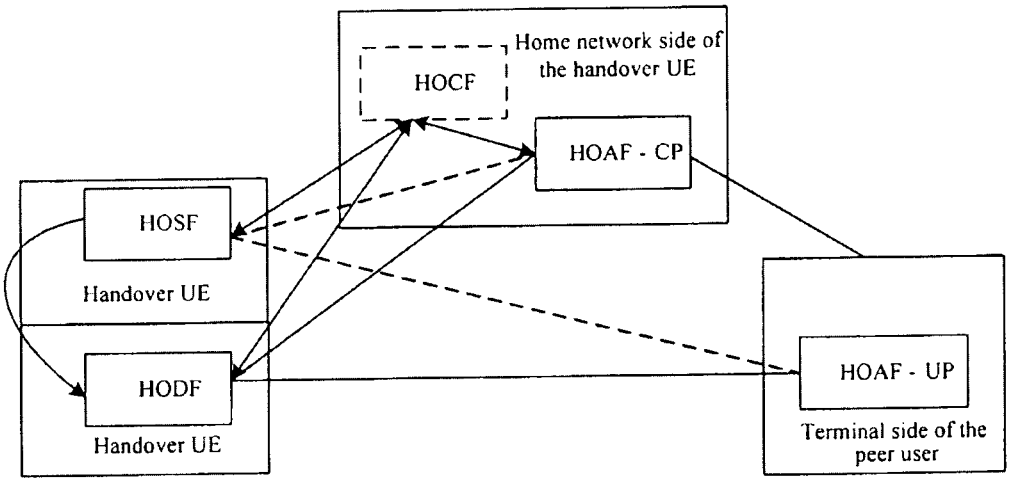
Figure 3C1

Figure 3C2

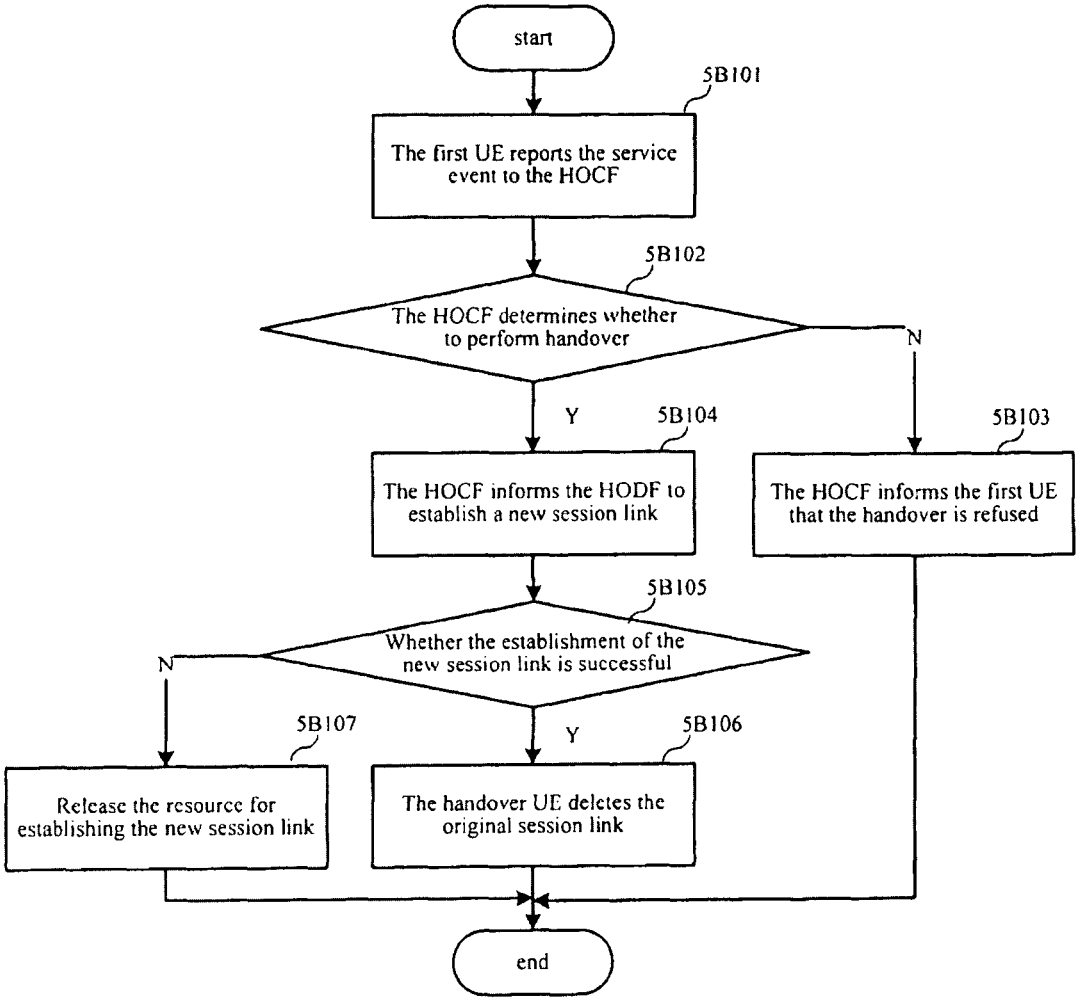
Figure 5B1

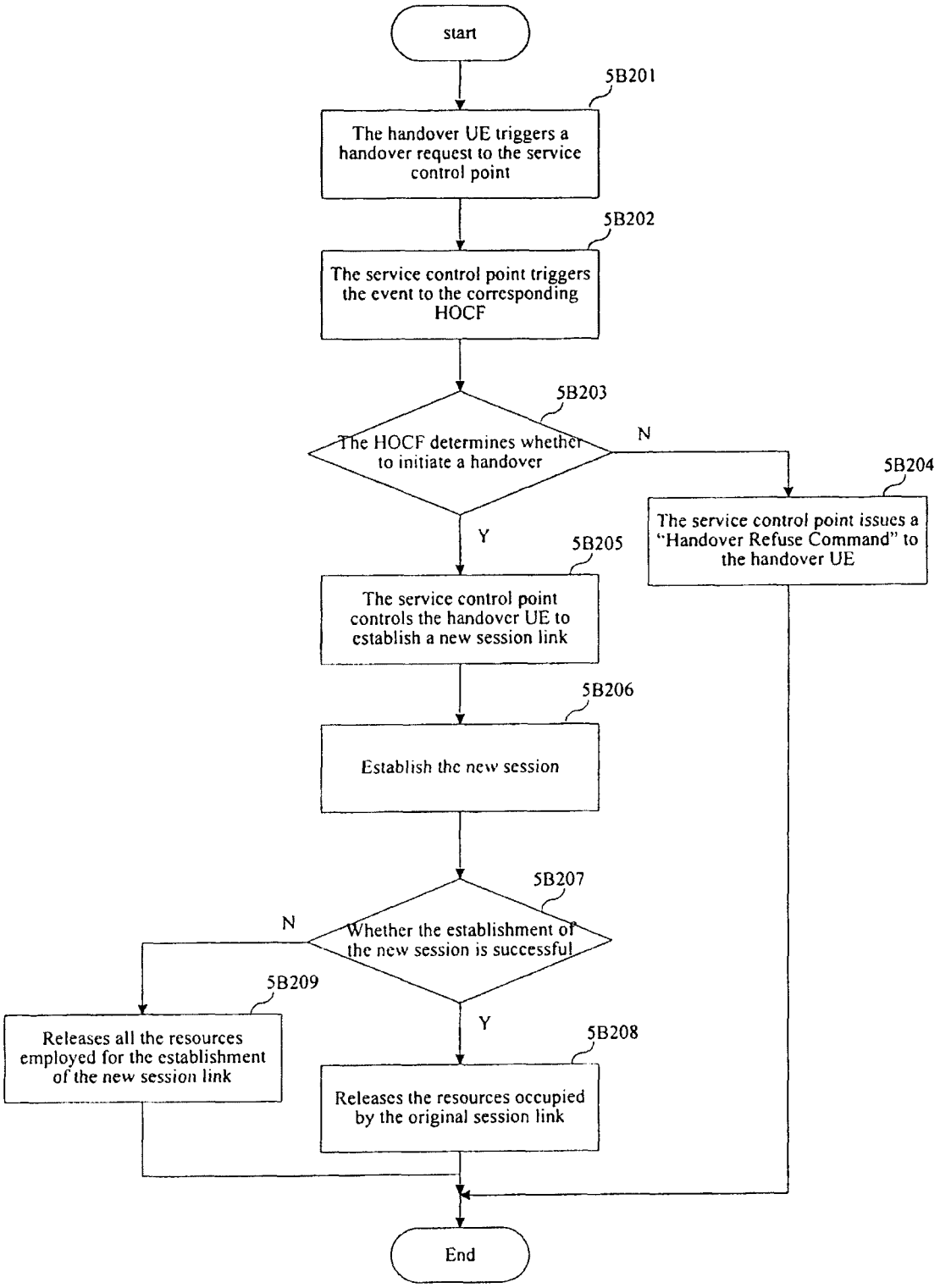
Figure 5B2

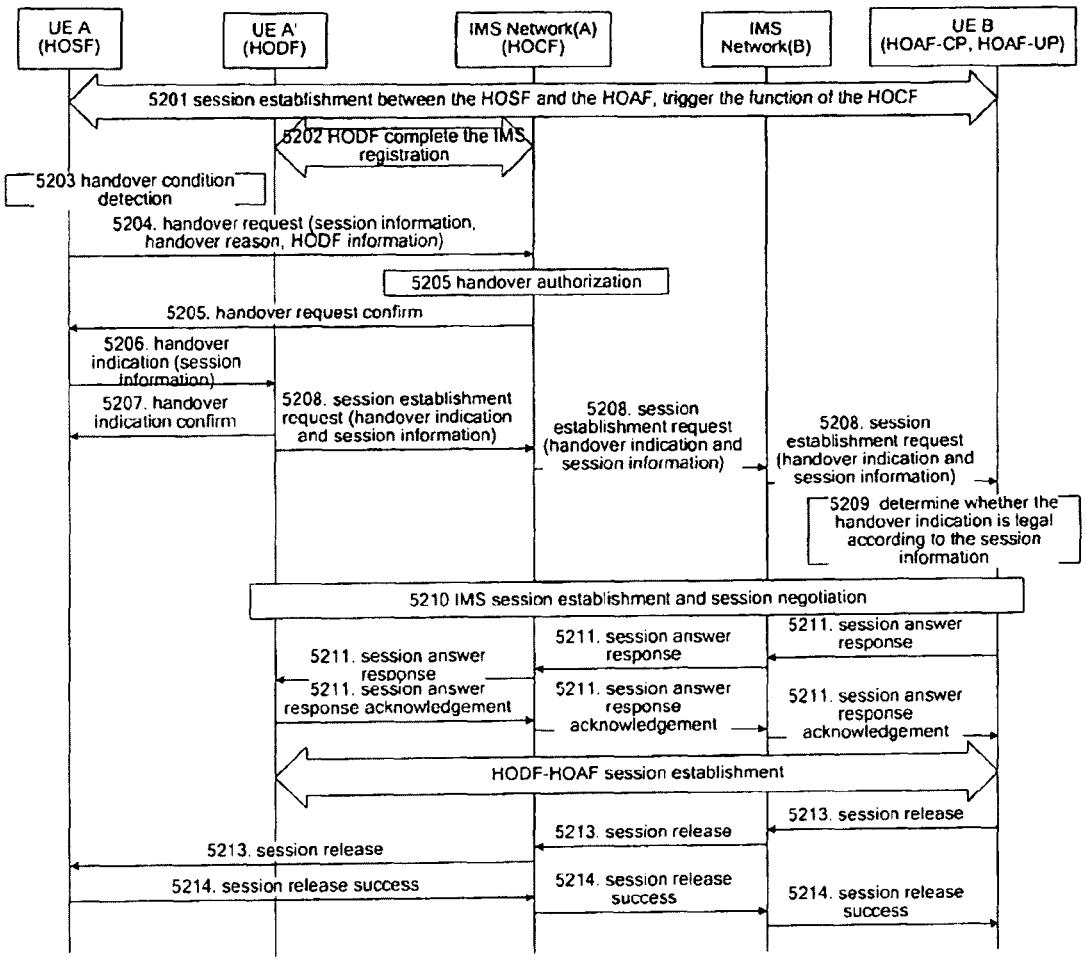
Figure 5B3

HOSF or HODF

METHOD AND SYSTEM FOR MAINTAINING SESSION CONTINUITY WHEN CHANGES OCCUR AT THE TERMINAL DURING A SESSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES

This application is a *Reissue Application of patent application Ser. No. 11/649,022 filed on Dec. 19, 2005, issued as U.S. Pat. No. 8,625,527 B2 on Jan. 7, 2014, which is a* continuation of International Application No. PCT/CN2005/002240, filed on Dec. 19, 2005[, which]. *The international application* claims priority to Chinese Patent Application No. 200410101259.1, filed on Dec. 17, 2004, Chinese Patent Application No. 200410082358.X, filed on Dec. 31, 2004, Chinese Patent Application No. 200510033578.8, filed on Mar. 8, 2005, Chinese Patent Application No. 200510063705.9, filed on Mar. 30, 2005, and Chinese Patent Application No. 200510035265.6, filed on Jun. 10, 2005, *both of which are hereby incorporated by reference in their entireties*.

FIELD OF THE INVENTION

The present invention relates to communication technologies, more particularly to a method and a system for maintaining session continuity when a user changes access address or access technology of a terminal, or even changes the terminal in a session.

BACKGROUND OF THE INVENTION

As communication and information technology rockets now, and along with the maturation of Internet Protocol (IP) technology, the application of the Internet spreads rapidly. People are no longer satisfied with monotonous voice communications. Instead, they demand brand new multimedia communications. At the same time, mobile communication networks and fixed communication networks still serve as the main communication medium. Therefore, it is acknowledged in the industry that it is the trend that the mobile communication network and the fixed communication network will develop towards IP and the Internet will merge with the telecommunication network. In other words, an IP multimedia communication system which supports multiple access technologies is a focus of the future development in the industry. An IP Multimedia Subsystem (IMS) and a Next Generation Network (NGN) are just the kind of networks which support multiple access technologies while implementing IP multimedia applications.

The IMS is a network subsystem introduced by the 3$^{rd}$ Generation Partnership Project (3GPP) on the basis of a Universal Mobile Telecommunications System (UMTS) Packet Switched (PS) domain to achieve IP multimedia communication control. The IMS supports multiple access technologies, shields user access technology, controls the openness of service capability and provides IP multimedia communication experience based on customized user data. The IMS employs the UMTS PS domain or other IP access networks as a bearer for upper layer control signaling and media transmission. Major functional entities in the IMS include: a Call Session Control Function (CSCF) for controlling user registrations and sessions, an Application Server (AS) for providing various service logic control functions, a Home Subscriber Server (HSS) for centralized administration of subscription data, and a Multimedia Gateway Control Function/IM Multimedia Gateway Function (MGCF/IM-MGW) for interworking with a Circuit Switched (CS) network. In the IMS, a user accesses the IMS through a Proxy-CSCF (P-CSCF), which is a proxy node in a visited network where the user is currently located. While the session and service triggering control and the service control interaction with the AS are performed by a Service-CSCF (S-CSCF), which is a service node in a home network of the user.

The IMS provides IMS users with IP multimedia value-added services through various ASs. In the IMS, services are triggered based on an initial Filter Criteria (iFC) evaluation. The iFC is a major part of the user subscription data saved in the HSS and downloaded by the S-CSCE assigned to the user during registration. The iFCs with different priority levels defines different service triggering conditions and corresponding destination ASs. The S-CSCF compares a service request received from or sent to a user it serves with the service triggering conditions in the iFCs one by one according to their priorities. If the service request matches the service triggering condition in an iFC, the service request will be sent to the corresponding AS defined by this iFC. If the service request does not match the service triggering conditions in the iFCs, the S-CSCF continues the evaluation of the next iFC in the descending priority sequence. Or, if the service request matches the service triggering condition in an iFC and is sent to the corresponding AS and the AS returns the service request to the S-CSCF, the S-CSCF also continues the evaluation of the next iFC in the descending priority sequence. After finishing the evaluation of all the iFCs, the S-CSCF sends the service request to a next network node according to a destination identifier in the service request. In this method, services are triggered according to uniform filter criteria which are independent with specific service. Thus the processing model employed by the IMS service node S-CSCF can be shared and reused by various services, so that the IMS architecture is able to provide rich and various customized services through various ASs.

The NGN is a convergent network based on packet technologies, mainly adopting packet switched technologies and employing a bearer/control separated architecture. The NGN inherits all the services of the previous fixed network as well as some of the mobile network. The NGN integrates advantages of the fixed network, the mobile network and the IP network so as to allow users, such as analog users, digital users, mobile users, Asymmetrical Digital Subscriber Line (ADSL) users, Integrated Service Digital Network (ISDN) users, IP narrow-band network users, IP broadband network users and even satellite users, to communicate with each other in the NGN.

Both the IMS and the NGN adopt a Session Initiation Protocol (SIP) as their session control protocols. The SIP is one of the multimedia communication system frame protocols defined by Internet Engineering Task Force (IETF), and is an application layer protocol for the establishment, modification and termination of a multimedia session. Since the SIP is based on published Internet standards and is innately advantageous with respect to the combination and interworking of a voice service and a data service, it can implement session controls across media and equipment and support varieties of media formats. It should be noted that the SIP supports interaction between two participants of a session to exchange Session Description Protocol (SDP) descriptions of the media streams desired to be exchanged in an offer/answer mode during a session establishment, so as to accomplish a negotiation of the exchanged media streams in the session. In an established session, a participant can also exchange the SDP description to change the media stream desires to be exchanged by re-negotiation, i.e., using the offer/answer mode again, to dynamically add/delete media streams or modify the attribute of the exchanged media streams. In this way, it is easier to present abundant multimedia service features. At the same time, the SIP supports pushing the intelligence towards applications and terminals and so as to relieve the burden of the network. The SIP also supports application layer mobility capability including dynamic registration, location management, and re-direction mechanisms, as well as the Presence capability (determining the specific communication means according to the location and status of the user), Fork capability (an ability to perform serial attempt or parallel forwarding a service request to multiple valid contact address registered to a destination identifier), and Subscribe and Notify mechanism, which makes it facilitated for the deployment of new services. Moreover, the SIP is a simple protocol with recognized extension potential and is thus widely applied in networks including the IMS and the NGN.

In the IMS and the NGN, a user can access the network through a multi-mode terminal, or through different terminals, via access networks of different access technologies, and obtain uniform multimedia services according to his/her subscription.

In the IMS and the NGN, a user binds his/her current terminal contact address and service identifier (which is the user's IP Multimedia Public identity (IMPU) in the IMS) through registration. Therefore, during a registration period, there should be a unique access address corresponding to the service identifier of the user. In order words, once the access address changes, the user needs a re-registration, and the original access address will be deleted, and the on-going session will be released if no special processing is performed in the service layer. Therefore, when a user in a session needs to change his/her Access Point (AP) or access technology which further result in the change of the access address, or even change the terminal, the problem of maintaining session continuity emerges.

On the other hand, a voice call to a peer user (e.g., a subscriber of the IMS or the NGN) can be either established as a Voice over IP (VoIP) call using an end-to-end IP bearer under the control of the IMS/NGN, or directly established as an interworking call between traditional CS domain and the IMS/NGN. Some access technologies through which the terminal accesses the IMS or the NGN belong to hot spot coverage technologies (e.g., Wireless Local Access Network (WLAN)). When a user accesses IMS/NGN through the WLAN to initiate a VoIP call, if the user roams out of the hot spot coverage of the WLAN, the network connection will be lost. At this time, if the user can change to access the CS domain through Wideband Code Division Multiple Access (WCDMA) which usually implemented with wide, continuous coverage to continue the session with the peer user, the session continuity will be well kept. Similarly, a WCDMA system, which is designed to cover wide areas continuously, may fail to provide high quality wireless connection in some buildings due to penetration loss of wireless signals, while hot spot coverage technologies, represented by the WLAN, are able to fill the coverage holes emerged here. In other words, if the user changes a CS voice call to an IMS VoIP session through the WLAN access when he moves into such a coverage hole of WCDMA, the session continuity will be well kept. Considering that the call between the user and the peer IMS/NGN user through the CS domain actually includes a CS call connection from the user to an interworking gateway between the CS domain and the IMS/NGN, and a SIP session from the interworking gateway between the CS domain and the IMS/NGN to the called IMS/NGN user. A CS call, which is converted to an IMS/NGN session through the interworking gateway, can be regarded as a special access means to the IMS/NGN from the point of view of the IMS/NGN. So the problem of maintaining session continuity when a terminal changes access means in an IMS/NGN session should also be taken into consideration to better guarantee the session continuity.

There exists a possible solution to guarantee the session continuity, i.e., Unlicensed Mobile Access (UMA).

The UMA standards are a set of published specifications jointly developed by a number of leading operators and vendors within the wireless industry. The UMA standards enable a terminal to access a cellular network and acquire services of the cellular network through unlicensed spectrum access technologies such as WLAN and Bluetooth (BT), and eventually enable a dual-mode terminal to roam and handover between the cellular network and the unlicensed spectrum wireless network.

FIG. 1 is a schematic diagram illustrating a process of maintaining session continuity through the UMA standards according to the prior art. As shown in FIG. 1, a UMA network controller (UNC), whose network location is similar to that of a Base Station Controller (BSC) or a Radio Network Controller (RNC) in the cellular network, is added in advance into the unlicensed spectrum wireless network, e.g., the WLAN. The added UNC is used for providing an interface with the core network just like that provided by the BSC/RNC in cellular network. Therefore the core network may regard the unlicensed spectrum wireless network as a normal cellular access network. When a terminal roams and handovers between the cellular network and the unlicensed spectrum wireless network, handover between the two networks are implemented through the interaction among the core network, the UNC in the unlicensed spectrum wireless networks and a corresponding entity, such as the BSC, in the cellular network.

SUMMARY OF THE INVENTION

The present invention provides a method and a system for maintaining session continuity, when access address of a terminal is changed as a result of alteration of Access Point (AP), access technology, access means or a terminal used by a user, the method and system provided by the present invention may logically replace an original session connection established before a handover with a new session connection established after the handover to guarantee the session continuity.

The present invention provides the following technical schemes:

A method for maintaining session continuity, wherein there exists a correlated relationship between a Handover Source Function (HOSF) and a Handover Destination Function (HODF) of a first user, including:

Step A: the first user establishing a session with a second user via a first connection through the HOSF, including a control plane first connection with a Handover Anchor Function-Control Plane (HOAF-CP) and a user plane first connection with a Handover Anchor Function-User Plane (HOAF-UP);

Step B: when it is detected that a handover condition is satisfied, the HODF that corresponds to the HOSF establishing a second connection, including a control plane second connection and a user plane second connection, respectively with the HOAF-CP and the HOAD-UP;

Step C: the first user continuing the session with the second user through the second connection.

A system for maintaining session continuity includes: an HOSF, an HODF, an HOAF-CP, an HOAF-UP and a Handover Detection Function; wherein, there exists a corresponding relationship between the HOSF and the HODF; and the HOSF is used for establishing a session control plane first connection with the HOAF-CP and a session user plane first connection with the HOAF-UP when the first user initiates or accepts a session;

the HODF is used for establishing a session control plane second connection with the HOAF-CP and a session user plane second connection with the HOAF-UP when the handover condition is satisfied;

the HOAF-CP is used for establishing the control plane first connection with the HOSF when the first user initiates or accepts a session; establishing the control plane second connection with the HODF when the handover condition is satisfied; replacing the control plane first connection with the HOSF with the control plane second connection with the HODF, and indicating the HOAF-UP to replace the user plane first connection between the HOAF-UP and the HOSF with the user plane second connection between the HOAF-UP and the HODF;

the HOAF-UP is used for establishing the user plane first connection with the HOSF when the first user initiates or accepts a session; establishing the user plane second connection with the HODF when the handover condition is satisfied; and replacing the user plane first connection with the HOSF with the user plane second connection with the HODF according to the indication of the HOAF-CP;

the Handover Detection Function is used for detecting whether the handover condition is satisfied.

The present invention provides a method and a system on the service layer for maintaining session continuity in a network that supports multiple access technologies. The method, the two connections before and after the handover are swapped logically on the service layer while the connection after the handover is established, therefore the session usability after the handover is guaranteed, the session continuity is kept and the service experience of users is enhanced.

BRIEF DESCRIPTION OF THE DRAWINGS

FIG. 3B is a block diagram logically illustrating a system when performing a session handover in an end-to-end/network-controlled mode according to an embodiment of the present invention;

FIG. 3C1 is a block diagram logically illustrating a system when performing a session handover in a CP-segmented/terminal-controlled mode or a CP-segmented/network-controlled mode according to an embodiment of the present invention;

FIG. 3C2 is a block diagram logically illustrating a system when performing a session handover in a CPandUP-segmented/terminal-controlled mode or a CPandUP-segmented/network-controlled mode according to an embodiment of the present invention;

FIG. 5B1 is a flowchart illustrating a handover according to the structure of the FIG. 3B;

FIG. 5B2 is a flowchart illustrating a procedure of the handover UE establishing a new connection for the handover under the control of a service control point based on the structure of FIG. 3B according to an embodiment of the present invention;

FIG. 5B3 is a flowchart illustrating a handover in an end-to-end/network-controlled mode while the HODF initiates the performing of the handover according to the structure of FIG. 3B;

DETAILED DESCRIPTION OF THE INVENTION

Figure 1:
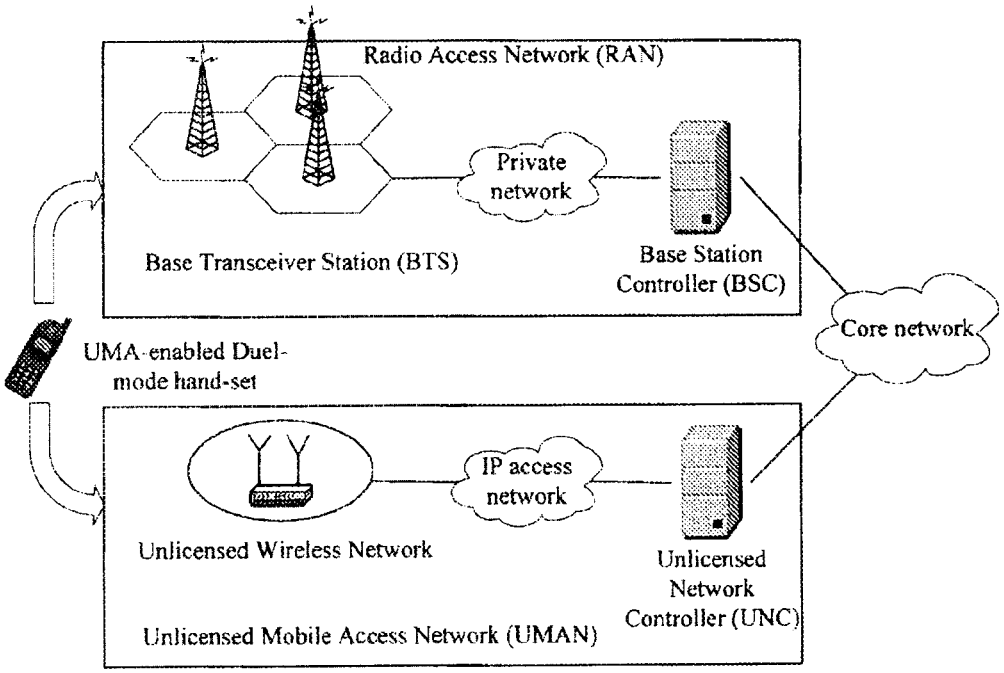
Figure 1 (PRIOR ART)
FIG. 1 is a schematic diagram illustrating a procedure of maintaining session continuity through UMA standards according to the prior art.

The present invention will be described in detail hereinafter with reference to embodiments and accompanying drawings.

Inventor of the present invention found that the solution of the existing UMA standards may have the following disadvantages:

1. The UMA is just a solution on the access network layer without processes such as IP address allocation, so it is impossible for a terminal to keep a same IP address when it moves. During the movement of the terminal, if the IP address allocated to the terminal changes for some networking factors, it is impossible to avoid new address registration and old address de-registration in the application layer, and session interrupt brought by the registration and de-registration, thus it is impossible to guarantee session continuity.

2. The UMA only provides a handover solution on the access network layer, in other words, it assigns new wireless resources to the terminal after the handover to maintain the continuity access to the network. But the UMA does not give consideration to the bandwidth differences of different access technologies, and it has no corresponding necessary process in the application layer, such as necessary media attribute modification, Quality of Service (QoS) guarantee, etc. Therefore, in practical service implementations, it is impossible to guarantee session continuity.

3. When the user changes his/her access means to the IMS during a session, i.e., changes between "interworking access to the IMS from the CS domain" and "direct access to the IMS through varieties of IP access networks", since the control signaling between the user and the network are completely different in these two access means, the UMA on access network layer is not able to solve this problem.

4. The UNC is a brand new product with brand new technology, the development of the UNC requires much work, and the terminal also needs to include corresponding protocol support. Still under development, the UNC technology and product are immature and some time away from wide application.

As described above, both the IMS and the NGN are networks that support multiple access technologies and provide IP multimedia services, and the embodiments of the present invention are applicable to both the IMS and the NGN. However, to simplify the description, the following paragraphs describe the embodiments of the invention in the IMS network only, and the differences in the NGN are explicated at the end of the description to demonstrate the feasibility of the embodiments of the present invention in the NGN.

The embodiments of the present invention are applicable to various cases when a handover user accesses to the IMS, including direct access through different IP access networks and interworking access through a CS domain, and provide a handover mechanism to maintain session continuity. The application of the embodiments of the present invention is independent of the network of the peer user. In other words, the peer user can be located in an IMS network or a CS domain/Public Switched Telephone Network (PSTN). When the peer user is located in the CS domain/PSTN, the home IMS network of the handover user selects an interworking gateway according to the standard IMS-CS interworking mechanism to implement an interworking call with the peer user. Therefore, to fit in different cases when the peer user is located in different networks, in embodiments of the present invention, all the descriptions are towards the terminal side of the peer user from the point of view of the IMS/NGN. The "terminal side of the peer user" has different meanings when the location of the peer user differs: when the peer user accesses to the IMS/NGN via different IP access networks, the terminal side of the peer user refers to the peer User Equipment (UE); when the peer user is located in the CS domain/PSTN, the terminal side of the peer user includes the peer UE, an interworking gateway for interworking with the network where the peer user are located, and a CS connection between the peer UE and the interworking gateway.

The session handover of a UE can be controlled by the UE itself. Preferably, the session handover can also be controlled by the network to guarantee the legality and reliability of the session handover.

Figure 2A:
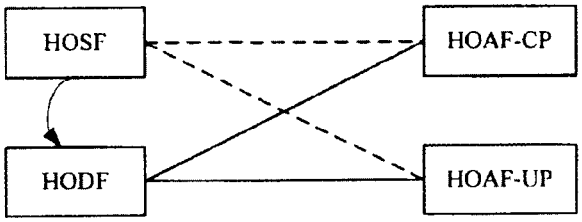
FIG. 2A is a schematic diagram illustrating a system when performing a session handover in a terminal-controlled mode according to an embodiment of the present invention.

FIG. 2A is a schematic diagram illustrating a system when performing a session handover in a terminal-controlled mode according to an embodiment of the present invention. As shown in FIG. 2A, when the session handover is performed in the terminal-controlled mode, the system, which is applicable to a network supporting multiple access technologies, includes at least: an HOSF, an HODF, an HOAF and a Handover Detection Function. The HOSF and the HODF have a correlated relationship with each other. The HOAF includes a control plane and a user plane, i.e., an HOAF-CP and an HOAF-UP. The HOSF and the HODF are directly connected with the HOAF-CP and the HOAF-UP respectively. The connection between the HOSF and the HOAF-CP and the connection between the HOSF and the HOAF-UP respectively correspond to the control plane connection and the user plane connection established before the handover. The two connections are illustrated with dotted lines. The connection between the HODF and the HOAF-CP and the connection between the HODF and the HOAF-UP respectively correspond to the control plane connection and the user plane connection established after the handover, and they are illustrated with solid lines.

The connection between the HOSF and the HOAF is referred to as the first connection hereinafter, the connection between the HOSF and the HOAF-CP is referred to as the control plane first connection, and the connection between the HOSF and the HOAF-UP is referred to as the user plane first connection. The connection between the HODF and the HOAF is referred to as the second connection hereinafter, the connection between the HODF and the HOAF-CP is referred to as the control plane second connection, and the connection between the HODF and the HOAF-UP is referred to as the user plane second connection.

The HOSF is used for establishing a control plane first connection with the HOAF-CP and a user plane first connection with the HOAF-UP when the first user initiates or accepts a session.

The HODF is used for establishing a control plane second connection with the HOAF-CP and a user plane second connection with the HOAF-UP when the handover condition is satisfied.

The HOAF-CP is used for establishing a control plane first connection with the HOSF when the first user initiates or accepts a session; establishing a control plane second connection with the HODF when the handover condition is satisfied; replacing the control plane first connection with the HOSF with the control plane second connection with the HODF, and indicating the HOAF-UP to replace the user plane first connection between the HOAF-UP and the HOSF with the user plane second connection between the HOAF-UP and the HODF.

The HOAF-UP is used for establishing a user plane first connection with the HOSF when the first user initiates or accepts a session; establishing a user plane second connection with the HODF when the handover condition is satisfied; and replacing the user plane first connection with the HOSF with the user plane second connection with the HODF according to the indication of the HOAF-CP.

The Handover Detection Function is used for detecting whether the handover condition is satisfied and triggering a handover when the handover condition is satisfied. The Handover Detection Function can be implemented as an independent physical entity, or as a logical entity in the HOSF or the HODF.

When the Handover Detection Function is implemented as a logical entity in the HODF, the working principle of the system is: the HODF detects whether the handover condition is satisfied, if the handover condition is satisfied, the HODF sends a connection establishment request to the HOAF-CP, the HOAF-CP interacts with the HOOF after receiving the connection establishment request to establish a new session link, i.e., the second connection.

When the Handover Detection Function is implemented as a logical entity in the HOSF, the working principle of the system is: the HOSF detects whether the handover condition is satisfied, when the handover condition is satisfied, the HOSF sends a handover indication to the HODF or the HOAF-CP. If the HOSF sends the handover indication to the HODF, the HODF sends a connection establishment request to the HOAF-CP after receiving the handover indication; the HOAF-CP interacts with the HODF after receiving the connection establishment request to establish a new session link, i.e., the second connection. If the HOSF sends the handover indication to the HOAF-CP, the HOAF-CP sends a connection establishment request to the HODF after receiving the handover indication; the HODF interacts with the HOAF-CP after receiving the connection establishment request to establish a new session link.

After establishing the second connection with the HODF, the HOAF-CP and the HOSF release the first connection between them, and the two users can continue the session through the second connection.

Moreover, in order to maintain the media exchange continuity better during the handover, the HOAF-UP may also be equipped with media stream duplication and filtering functions, i.e., the HOAF-UP duplicates the media stream to the handover user and sends the media stream to the HOSF and the HODF simultaneously, filters the media streams from the HOSF and the HODF, selects a valid part and send the selected valid part to the terminal side of the peer user or present to the peer user.

Figure 2B:
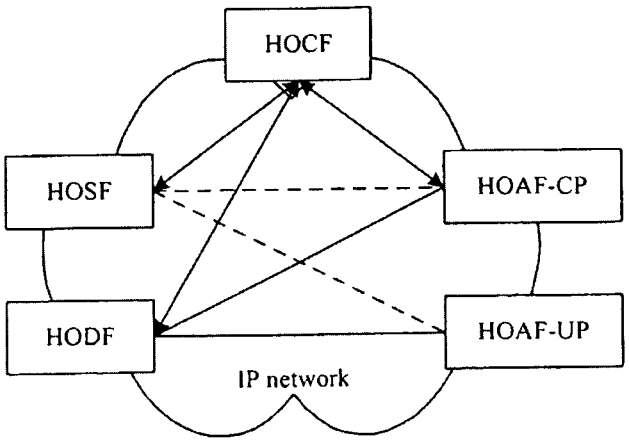
FIG. 2B is a schematic diagram illustrating a system when performing a session handover in a network-controlled mode according to an embodiment of the present invention.
Figure 3A:
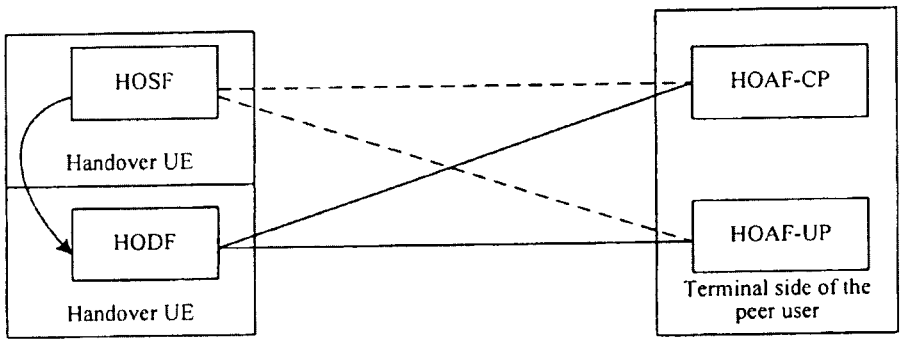
FIG. 3A is a block diagram logically illustrating a system when performing a session handover in an end-to-end/terminal-controlled mode according to an embodiment of the present invention.

The functions of the entities in the system shown in FIG. 2A are implemented in the end-to-end/terminal-controlled mode, which is shown in FIG. 3A, and in the segmented/terminal-controlled mode (including the CP-segmented mode shown in FIG. 3C1 and the CPandUP-segmented mode shown in FIG. 3C2).

FIG. 2B is a schematic diagram illustrating a system when performing a session handover in a network-controlled mode according to an embodiment of the present invention. As shown in FIG. 2B, when the session handover is performed in the network-controlled mode, the system includes not only the HOSF, HODF, HOAF-CP, HOAF-UP and the Handover Detection Function, which are shown in FIG. 2A, but also an HOCF. The HOSF and the HODF are directly connected with the HOAF-CP and the HOAF-UP respectively, wherein the connection between the HOSF and the HOAF-CP and the connection between the HOSF and the HOAF-UP respectively correspond to the control plane connection and user plane connection established before the handover, and are illustrated with dotted lines. The connection between the HODF and the HOAF-CP and the connection between the HODF and the HOAF-UP respectively correspond to the control plane connection and the user plane connection established after the handover. The two connections are illustrated with solid lines. Meanwhile, the HOCF is respectively connected with the HOSF, the HODF and the HOAF-CP to illustrate the control and interaction relationships between them.

In the system shown in FIG. 2B, besides the functions shown FIG. 2A, the HOSF, HODF, HOAF-CP, HOAF-UP and the Handover Detection Function may also have other functions. The function of the HOSF may also include: sending a handover request to the HOCF and processing an authorization result returned from the HOCF. The function of the HODF may also include: sending a handover request to the HOCF and processing an authorization result returned from the HOCF.

The HOCF is used for forwarding signal streams between the HOSF and the HOAF, and used for centralized management of handover strategies to perform handover authorization, and further for acquiring relevant information by performing signaling interactions with the handover UE in order to update the handover strategies saved in the HOCF.

The functions of the Handover Detection Function in FIG. 2B are the same with those shown in FIG. 2A: when the handover condition is satisfied, the Handover Detection Function triggers the handover. When the Handover Detection Function is a logical entity, it can be set not only in the HOSF or the HODF, but also in the HOCF. When the Handover Detection Function is set in the HOCF, the HOCF is able to perform signaling interactions with the handover UE to update the handover detection condition saved in the HOCF.

As shown in the structure illustrated in FIG. 2A, the second connection can be initiated by the HODF or the HOAF. Therefore, based on the structure shown in FIG. 2B, no matter the Handover Detection Function is set in the HOSF, the HODF or the HOCF, as long as a handover indication is sent to either the HODF or the HOAF-CP when the handover condition is satisfied, and the HODF or the HOAF-CP which receives the handover indication sends a second connection establishment request to the peer side, after interactions between the HODF and the HOAF-CP, a new session link, i.e., the second connection, can be established.

For example, when the Handover Detection Function is a logical entity in the HOCF, the working principle of the system is: the HOSF establishes a control plane first connection and a user plane first connection respectively with the HOAF-CP and the HOAF-UP. When the HOCF detects that the handover condition is satisfied, it can send a handover indication to the HOAF-CP, the HOSF or the HODF. If the handover indication is sent to the HOAF-CP, the HOAF-CP initiates a connection establishment request to the HODF after receiving the handover indication, and interacts with the HODF to establish a second connection. If the handover indication is sent to the HODF, the HODF initiates a connection establishment request to the HOAF-CP after receiving the handover indication, and interacts with the HOAF-CP to establish a second connection; If the handover indication is sent to the HOSF, the HOSF sends a handover indication message to the HODF after receiving the handover indication, the HODF initiates a connection establishment request to the HOAF-CP after receiving the handover indication message, and interacts with the HOAF-CP to establish a second connection.

After establishing the second connection with the HODF, the HOAF-CP and the HOSF release the first connection between them, and the two users can continue their conversation through the second connection.

The functions of the entities in the system shown in FIG. 2B are implemented in the end-to-end/network-controlled mode, which is shown in FIG. 3B, and in the segmented/network-controlled mode, which is shown in FIG. 3C.

The HOSF and the HODF in the system may be located in a same terminal or different terminals of the handover user (also referred to as the first user herein), and accordingly, they can be different access modules in a same terminal of the handover user, or access modules in different terminals of the handover user. To simplify the description, the HOSF and the HODF are described hereinafter to be in the handover UE, including two situations above.

Figure 10:
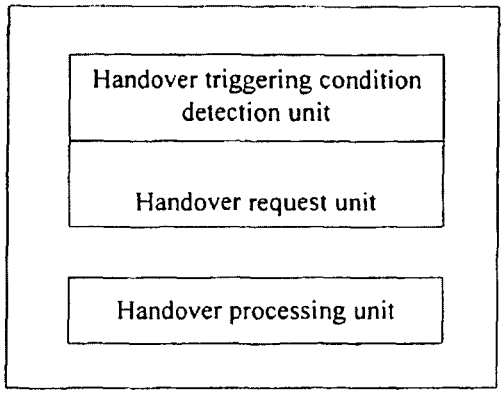
FIG. 10 is a schematic diagram illustrating a structure of a UE in which a Handover Detection Function is configured according to an embodiment of the present invention.

As shown in FIG. 10, as the handover UE used in an embodiment of the present invention, when the HOSF and the HODF are implemented in a same terminal of the handover user and the Handover Detection Function is set as a logical entity in the HOSF, the handover UE may include a Handover Processing Unit and a Handover Detection Function. The Handover Detection Function includes a Handover Trigger Condition Detection Unit and a Handover Request Unit.

The Handover Trigger Condition Detection Unit can monitor continuously and trigger a handover according to various conditions. For example, it can continuously check the quality of the received radio signal (e.g., signal intensity). When the quality degrades to a pre-configured handover threshold, it automatically searches whether there is a wireless network of the same type as the current radio coverage. If there is not any network of the same type, it continues to search whether there are other types of wireless networks covering the area, selects a new radio access network and triggers a handover. Thus a radio access network of the same type is a preferable choice, and when there is no such network, other usable access networks are selected based on a pre-configured priority order (usually set in an ascending order according to access charging rate).

The Handover Request Unit is used for initiating a handover request to the network. For example, after the HODF newly accesses to the network and obtains a new IP address (the IP address is obtained from different places according to different types of access networks, e.g., in a General Packet Radio Service (GPRS) network, it is obtained from a Gateway GPRS Support Node (GGSN)), registers the new IP address on a register server through the new access network, and initiates a handover request through SIP signaling via the new access network.

The Handover Processing Unit, used for supporting special processing on a signaling plane during the session handover, e.g., interacting with the HOAF-CP to establish the second connection, or avoiding ringing (i.e., avoiding responding 180), etc.

In addition, the HOAF-CP and the HOAF-UP in the system may have different locations: the HOAF-CP and the HOAF-UP may be both located on the terminal side of the peer user (also referred to as the second user herein); or the HOAF-CP may be located on the home network side of the handover user while the HOAF-UP is located on the terminal side of the peer user; or the HOAF-CP and the HOAF-UP may be both located on the home network side of the handover user.

When the HOAF-CP and the HOAF-UP are both located on the terminal side of the peer user, the session between the handover user and the peer user is born only by the control plane connection between the HOSF or the HODF in the handover UE and the HOAF-CP and the user plane connection between the HOSF or the HODF in the handover UE and the HOAF-UP respectively. This mode is hereinafter referred to as an end-to-end mode.

If the HOAF-CP is located on the home network side of the handover user and the HOAF-UP is located on the terminal side of the peer user, on the control plane, the session between the handover user and the peer user needs to be born by two segments of connections, one is the connection between the HOSF or the HODF and the HOAF-CP, i.e., the control plane first connection or the control plane second connection, and the other is the control plane connection between the HOAF-CP and the terminal side of the peer user. As the HOAF-UP is on the terminal side of the peer user, on the user plane, the session between the handover user and the peer user is still born by the end-to-end user plane first or second connection. This mode is hereinafter referred to as a CP-segmented mode.

If the HOAF-CP and the HOAF-UP are both located on the home network side of the handover user, besides the control plane and user plane first connection and the second connection with the HOSF and the HODF of the handover user respectively, the HOAF needs to establish another control plane connection and user plane connection with the terminal side of the peer user. The session between the handover user and the peer user in such a situation is born by two segments of connections on both control plane and user plane. To be specific, one segment is the control plane and user plane first connections or the control plane and user plane second connections, the other segment is the control plane and user plane connections between the HOAF and the terminal side of the peer user. This mode is hereinafter referred to as a CPandUP-segmented mode.

The structure of the system will be described in detail hereinafter with reference to the embodiments in the terminal-controlled mode and in the network-controlled mode respectively, wherein the session is born in the end-to-end mode, CP-segmented mode or CPandUP-segmented mode.

Corresponding to FIG. 2A, FIG. 3A is a block diagram logically illustrating a system when performing a session handover in an end-to-end/terminal-controlled mode according to an embodiment of the present invention. As shown in FIG. 2A and FIG. 3A, when the session handover is performed in the end-to-end/terminal-controlled mode, the HOSF and the HODF are located in the handover UE; the HOAF-CP and the HOAF-UP are located on the terminal side of the peer user. The service implementation mode corresponding to the system logic shown in FIG. 3A is the end-to-end/terminal-controlled mode.

Corresponding to FIG. 2B, FIG. 3B is a block diagram logically illustrating a system when performing a session handover in an end-to-end/network-controlled mode according to an embodiment of the present invention. As shown in FIG. 2B and FIG. 3B, the HOSF and the HODF are located in the handover UE, the HOCF is located on the home network side of the handover user, and the HOAF-CP and the HOAF-UP are both located on the terminal side of the peer user. The service implementation mode corresponding to the system logic shown in FIG. 3B is the end-to-end/network-controlled mode.

Corresponding to FIG. 2A or 2B, FIG. 3C1 is a block diagram logically illustrating a system when performing a session handover in a CP-segmented/terminal-controlled mode or a CP-segmented/network-controlled mode according to an embodiment of the present invention. As shown in FIG. 2A, 2B and FIG. 3C1, the HOSF and the HODF are located in the handover UE, the HOCF and the HOAF-CP are located on the home network side of the handover user, and the HOAF-UP is located on the terminal side of the peer user; besides the control plane first connection and control plane second connection established respectively with the HOSF and the HODF before and after the handover, a control plane connection is also established by the HOAF-CP with the terminal side of the peer user. The service implementation mode corresponding to the system logic shown in FIG. 3C1 is the CP-segment mode; when the HOCF, shown with dotted lines, is included in the system, the system works in the network-controlled mode, otherwise, the system works in the terminal-controlled mode.

Corresponding to the system shown in FIGS. 2A and 2B, FIG. 3C2 is a block diagram logically illustrating a system when performing a session handover in a CPandUP-segmented mode according to an embodiment of the present invention. As shown in FIG. 2A, 2B and FIG. 3C2, the HOSF and the HODF are located in the handover UE, the HOCF, HOAF-CP and HOAF-UP are located on the home network side of the handover user; besides the control plane and user plane first connection and second connection established before and after the handover with the HOSF and the HODF respectively, a control plane connection and a user plane connection are also established respectively by the HOAF-CP and the HOAF-UP with the terminal side of the peer user. The service implementation mode corresponding to the system logic as shown in FIG. 3C2 is the CPandUP-segment mode; when the HOCF, shown with dotted lines, is included in the system, the system works in the network-controlled mode, otherwise, the system works in the terminal-controlled mode.

With respect to the segmented/terminal-controlled mode or the segmented/network-controlled mode, as shown in FIG. 3C1 and FIG. 3C2, it may be concluded from the above logical block diagrams that:

the functions of the HOAF-CP further include: establishing a control plane connection with the terminal side of the peer user, and performing correlative control over different session connections with the handover UE and the terminal side of the peer user before and after the handover in a $3^{rd}$ Party Call Control (3PCC) mode.

Furthermore, with respect to the CPandUP-segmented/terminal-controlled mode or the CPandUP-segmented/network-controlled mode shown in FIG. 3C2, it may be concluded that:

the functions of the HOAF-CP further include: assigning resources to implement the HOAF-UP in the network, controlling the HOAF-UP to establish media connections with the handover UE and the terminal side of the peer user respectively before and after the handover, and controlling the HOAF-UP to connect these media connections.

The functions of the HOAF-UP further include: under the control of the HOAF-CP, establishing a media connection with the terminal side of the peer user, connecting its media connections with the terminal side of the peer user and the HOSF respectively before the handover, and connecting its media connections with the terminal side of the peer user and the HODF respectively after the handover.

In the present embodiment, different implementation plans are provided to satisfy different service requirements through above modes. Among the different modes, the end-to-end/terminal-controlled mode is the simplest one without occupying extra network resources, yet in such a mode the network is not able to control the session handover. The end-to-end mode/network-controlled mode provides basic network control mechanism. Unlike the situation in the end-to-end mode, in the CP-segmented mode the complex handling process of new session establishment and session replacement is screened to the terminal side of the peer user through the HOAF-CP set in the network during the session handover, therefore the terminal side of the peer user only needs to support session re-negotiation to implement the media stream redirection required by the session handover as well as necessary media stream adding/deleting or media stream attribute modification. In addition, as the connection between the HOAF-CP and the terminal side of the peer user is unchanged before and after the session handover, the service control over this connection and the charging on this connection in the IMS in which the session handover is performed may continue, so that the session handover is performed more smoothly with respect to the terminal side of the peer user and the IMS in which the session handover is performed. Based on the above, when the HOAF-CP is also set in the network in the CPandUP-segmented mode, the terminal side of the peer user is no longer required to perform the media stream redirection during the handover. Only when the media capabilities of the HOSF and the HODF are different does the terminal side of the peer user need to support session re-negotiation to perform media stream adding/deleting or media stream attribute modification; together with the media stream duplication and filtering functions which are easier to be implemented by the HOAF-UP on the network side, the service is performed more smoothly during the handover.

With respect to the network which performs the handover, the HOSF and the HODF are represented by different access addresses or access means. The different access addresses correspond to different access points of the same access technology. or correspond to different access technologies. The different access means refer to direct access to a network that supports multiple access technologies or interworking access through a CS domain. It should be noted that in the present embodiment a CS call which is converted by the CS/IMS interworking gateway into an IMS session is regarded as a special means for a UE to access the IMS. On the handover user side, the HOSF corresponds to an access module of the access point, or the access technology or the access means before the handover, and the HODF corresponds to another access module of the access point, or another access technology or another access means after the handover. When the terminal of the handover user remains the same before and after the handover, then the HOSF and the HODF are located in the same handover UE; when the terminals of the handover user are different before and after the handover, the HOSF is located in the handover UE before the handover, and the HODF is located in the handover UE after the handover.

In the present embodiment, the HOSF and the HODF correspond to a same handover user, thus the HOSF and the HODF are correlated with each other, and the correlated relationship is used to identify that the HOSF and the HOSF correspond to a same user.

To explain the correlated relationship between the HOSF and the HODF, it is needed to introduce in the first place the existing IM Private Identity (IMPI), IM PUblic identity (IMPU). IMS subscription, and subscription identities of a same user in different network subsystems, e.g., the IMPU in an IMS network and the MSISDN in a CS domain, both of which correspond to a same user.

In the IMS, a home network operator assigns one or more IMPIs to a user subscribing IMS services for registration, authorization, management and charging. Usually the IMPIs are kept private. In addition, one or more IMPUs are also assigned to the user subscribing IMS services to identify the user in the sessions of various services. The IMPUs are announced to the public. In the IMS network, there are many-to-many mapping relationships between the IMPIs and IMPUs of user.

On the other hand, to satisfy some special application requirements, an IMS subscription corresponding to multiple IMPIs and IMPUs is also allowed in the IMS network. Further more, the subscription identities of a same user in different network subsystems, i.e., the IMPU of the user in an IMS network and the MSISDN of the user in other network sub-systems such as a CS domain, are managed and assigned by the home operator of the user, they can be associated with each other.

Thus, the HOSF and the HODF in the present embodiment may be correlated with or correspond to each other through various means, e.g., the HOSF and the HODF may respectively correspond to different public identities under a same private identity of an IMS user; or the HOSF and the HODF may respectively correspond to different private identities under a same public identity of the IMS user; or the HOSF and the HODF may correspond to different private identity and public identity respectively, but the private identity and the public identity are under the same subscription of a user in the IMS network; or the HOSF and the HOSF may be associated with each other through the subscriptions of a same user in different subsystems on the operator layer, for example, the HOSF and the HODF may respectively correspond to the public identity/private identity of a user in IMS network and the MSISDN/International Mobile Subscriber Identity (IMSI) of the user in CS domain, etc.

As described above, a voice call of a user may be implemented through a Voice over IP (VoIP) born by IP under the control of the IMS, or through a traditional CS domain call, while the access technology through which the UE accesses the IMS may not have continuous coverage like the WCDMA system (e.g., the WLAN adopts hot spot coverage), so when a user accesses the IMS through the WLAN to make a VoIP call and roams out of the hot spot coverage of the WLAN, the network connection will be lost. However, the WCDMA system, which is designed to cover wide areas continuously, has its own disadvantages in some buildings due to penetration loss of radio signals, while hot spot coverage technology, such as the WLAN, is able to fill the coverage holes emerged here. Therefore, the session handover between the IMS and CS domain should also be taken into consideration. In the present embodiment, a CS call which is converted by the CS/IMS interworking gateway into an IMS session is regarded as a special means for a UE to access the IMS. Therefore, the present embodiment covers not only the handover from an IMS to another IMS, but also the handover between an IMS and a CS domain.

Firstly, the service interworking between the IMS and the CS domain will be explained.

The core network of a Universal Mobile Telecommunications System (UMTS) is divided into a CS domain and a PS domain, which performs CS services (such as voice, circuit data and fax services) and PS services respectively. In UMTS Release 5, an IMS domain is introduced, signaling and media streams of the IMS domain are born by the PS domain. According to the IMS architecture definitions, interworking with the CS network, i.e., the PSTN or the PLMN CS is performed through an interworking gateway Media Gateway Control Function/IP Multimedia-Media Gateway (MGCF/IM-MGW). The MGCF is used for performing a control plane interaction between the CS domain and the IMS, supporting protocol interaction and call interworking between ISUP/Bearer Independent Call Control (BICC) and the SIP, controlling the IM-MGW to perform interworking between a Time Division Multiplex (TDM) hearer of the CS network and a user plane broadband/narrow band IP bearer of the IMS domain through H.248, and accomplishing necessary Codec transformations.

Figure 4:
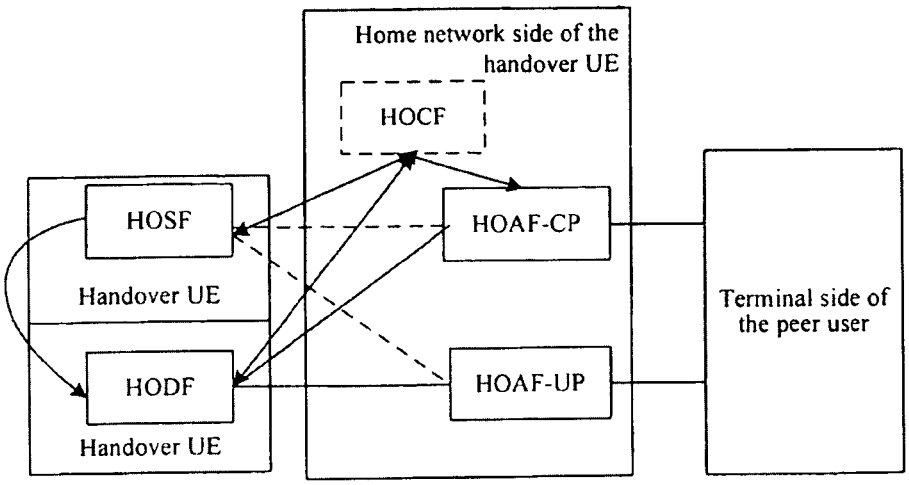
FIG. 4 is a schematic diagram illustrating connection relationships when an IMS session is transferred to a CS call.
Figure 4:
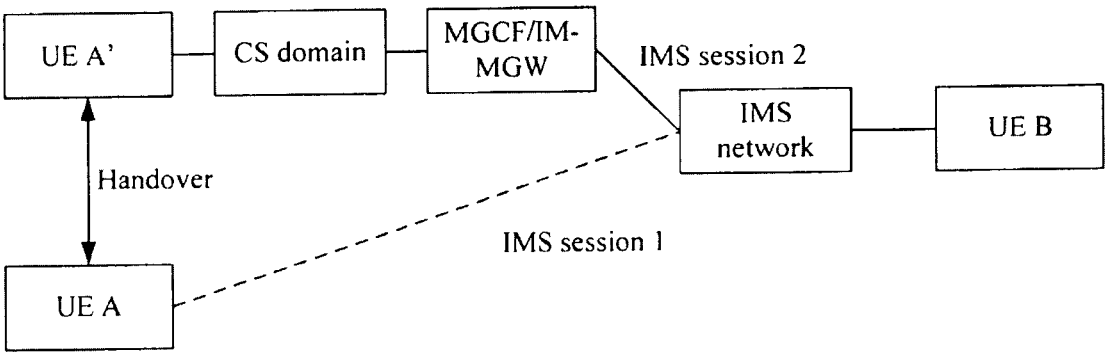

FIG. 4 is a schematic diagram illustrating connection relationships when an IMS session is transferred to a CS call. When a VoIP call controlled by the IMS is transferred to a CS call, the actual connections are shown in FIG. 4. At this time, from the point or view of the IMS network, the CS call which is converted by the CS/IMS gateway into an IMS session may be regarded as a special means for a UE to access the IMS, therefore the IMS-CS handover is equivalent to the IMS-IMS handover between the IMS session 1 and IMS session 2 which points to the CS/IMS interworking gateway shown in FIG. 4.

It can be concluded from the above that in practical implementations, if both the HOSF and the HODF on the handover user side access the IMS network directly through varieties of IP access networks to establish a session with the terminal side of the peer user, it is an IMS-IMS session handover that is performed in the present embodiment; if the HOSF establishes a session with the terminal side of the peer user through a CS/IMS interworking gateway between the CS domain and the IMS network, while the HOOF accesses the IMS network directly through varieties of IP access networks to establish a session with the terminal side of the peer user, it is a CS-IMS session handover that is performed in the present embodiment; and if the HOSF accesses the IMS network directly through varieties of IP access networks to establish a session with the terminal side of the peer user, while the HODF establishes a session with the terminal side of the peer user through a CS/IMS interworking gateway between the CS domain and the IMS network, it is an IMS-CS session handover that is performed in the present embodiment.

Several embodiments of different service modes in different session handover circumstances will be described hereinafter.

In the flowcharts of the following embodiments, UE A and UE A' are terminals of the handover user, in other words, the terminals of the handover user before and after the handover respectively. The UE A corresponds to the HOSF and the UE A' corresponds to the HODF. UE B is the terminal of the peer user, in other words, the second UE. UE C is the terminal of a third user; IMS Network (A) includes the home IMS network of the handover user and the IMS network where the handover user is currently located excepting the case that the handover user accesses the IMS through CS interworking; IMS Network (B) includes the home IMS network of the peer user and the IMS network where the peer user is currently located; CS Network (A) is the home CS network of the handover user, or the CS network where the handover user is currently located; CS Network (B) is the home CS network of the peer user, or the CS network where the peer user is currently located.

The IMS-IMS session handover is described hereinafter with reference to an embodiment of the present invention.

Figure 5A:
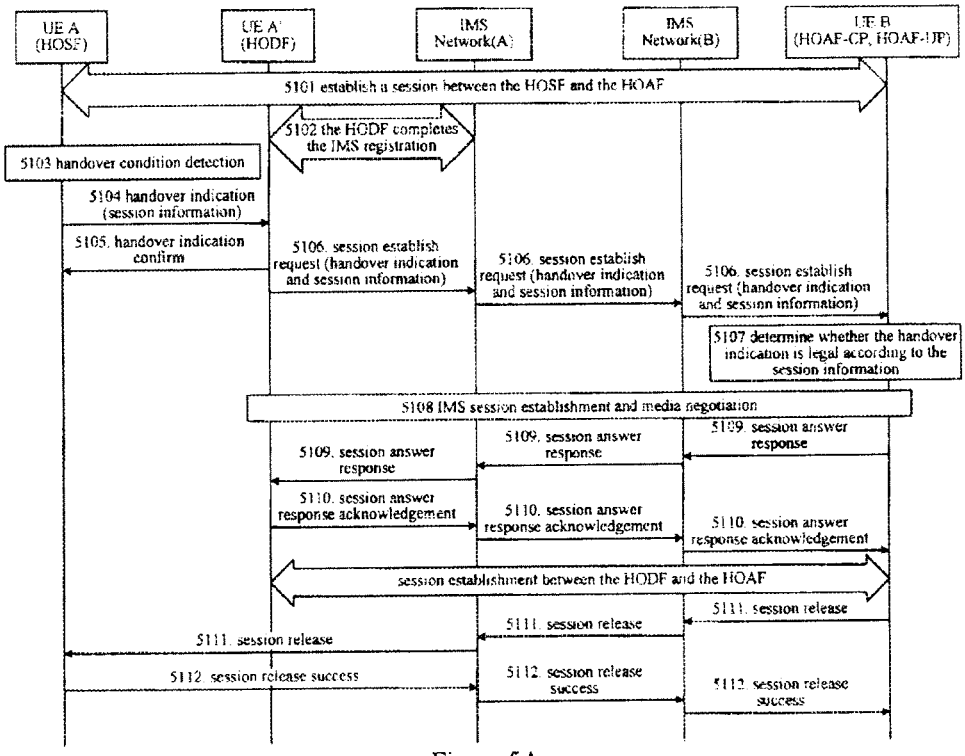
FIG. 5A is a flowchart illustrating a handover in an end-to-end/terminal-controlled mode according to an embodiment of the present invention, while the HODF initiates the performing of the handover.

FIG. 5A is a flowchart illustrating when both the handover UE and the peer UE are located in the IMS, a handover is performed in an end-to-end/terminal-controlled mode, while the HODF initiates the performing of the handover, i.e., initiates the establishment of the new connection between the HODF and the HOAF-CP, according to an embodiment of the present invention.

This embodiment is an IMS-IMS session handover in the end-to-end/terminal-controlled mode, wherein the HOSF detects whether the handover condition is satisfied and indicates the HODF to perform the handover.

As shown in FIG. 3A and FIG. 5A, the IMS-IMS handover in the end-to-end/terminal-control led mode includes the following steps:

Step 5101: during the establishment of an initial session, the HOSF in the handover UE establishes an initial session connection with the HOAF on the terminal side of the peer user via the IMS.

The initial session connection established by the HOSF and the HOAF includes a control plane connection established between the HOSF and the HOAF-CP, and a user plane connection established between the HOSF and the HOAF-UP; the IMS network includes the IMS network that the handover user involves in, and the IMS network that the peer user involves in, i.e., the home IMS networks of the two users and the IMS networks where the two users are currently located. Since the peer user is also in an IMS network, the terminal side of the peer user herein is referred as the peer UE.

Step 5102: during the conversation between the handover UE and the peer user through the HOSF, the HODF in the handover UE successfully registers in the IMS network (e.g., as the handover user roams, the HODF finds another IP access network and successfully accesses the IMS).

Based on the correlated relationship between the HOSF and the HODF subscribed in the IMS, a same service node is guaranteed to be assigned to the HODF when the HODF accesses the IMS network according to a standard service node distribution way during registration of an IMS network user.

Step 5103: the HOSF detects a handover-related event.

The step of the HOSF detecting a handover-related event includes: the HOSF detects that it will lose the connection to the IMS network, e.g., the radio signal intensity degrades to a pre-configured threshold. Optionally the battery in the local end is about to be used up when the HODF is located in another handover UE. Optionally the HOSF detects that the HODF has successfully accessed the IMS network, e.g., the HOSF learns through interactions of internal modules in the same terminal or through a user indication that the HODF has successfully accessed the network, and the radio signal quality, or the network priority level or the service charging rate of the network that the HODF accesses are better than those of the network that the HOSF accesses, or the HOSF detects that the handover condition pre-configured by the user is satisfied, e.g., the conversation duration reaches a pre-configured handover interval, or the HOSF detects a handover indication from the user, or any combination of the above;

Step 5104: the HOSF sends a handover indication to the HODF.

The handover indication includes a location identifier of the HOAF, and initial session information between the HOSF and the HOAF;

Step 5105: the HODF acquires the location identifier of the HOAF and the initial session information from the handover indication, and returns a handover indication confirmation to the HOSF;

As described above, the HOSF and the HODF can be located in different modules of a same UE or in different UEs, when they are located in different UEs, the interaction between them is performed through the SIP or a Service Location Protocol (SLP) via short distance wireless communication technologies, such as Bluetooth; when they are located in the same UE, they can interact with each other through various internal interaction methods, e.g., interacting through internal messages among internal modules or through visiting a shared internal memory, etc.

When the HOSF and the HODF are located in different modules in the same UE, the interaction between them is the interaction among internal modules within a physical entity, the present embodiment is only a preferred embodiment illustrating an interaction requirement; the two modules can interact through any convenient internal interaction method, as long as the method provides equivalent effect and is in accordance with the essence of the present embodiment.

The relationship and interaction between the HOSF and the HODF in the following embodiments are identical to the description above. However, in order to simplify the description, the HOSF and the HODF are supposed to be in different modules of the same UE.

Step 5106: the HODF constructs a session establishment request, which carries initial session information and handover indication information, and sends the session establishment request to the HOAF through the IMS network.

The session establishment request includes the location identifier of the HOAF. Network entities in the IMS network decide routing according to the location identifier of the HOAF, and accomplish some special processes according to the handover indication information, including prohibiting the duplicate triggering of service, and/or avoiding influences from other services, and/or special charging processes, etc.

In the session establishment request, an indication declaring that the new session is used to replace the original session between the HOSF and the HOAF, and session related information may be carried through the REPLACES header field.

Step 5107: the HOAF judges whether the session establishment request is legal; if it is legal, execute Step 5108; otherwise, the HOAF returns a failure response to the HODF to end the procedure.

Since the terminal side of the peer user cannot obtain the subscription data of the handover user in the end-to-end/terminal-control mode, it is hard to perform checking on correlated relationship between the HOSF and the HODF, i.e., it is impossible to determine whether the HOSF and the HODF belong to the same user. Therefore, the step of the HOAF judging whether the session establishment request is legal is performed according to the initial session information carried in the session establishment request.

The step of the HOAF judging whether the session establishment request is legal includes: the HOAF judges whether the original session to be replaced and indicated by the initial session information corresponds to the initial session established between the HOAF and the HOSF in the handover UE according to the session information carried by the session establishment request, so as to determine whether the session establishment request used for the handover is legal.

In addition, after receiving the session establishment request, the HOAF can further instruct the peer UE to avoid ringing according to the handover indication information.

Step 5108: the HOAF interacts with the HODF for the information needed in the establishment of the new session, and replaces the initial session with the new session.

The step of replacing the initial session with the new session includes: replace the media stream exchanged with the HOSF in the initial session with the media stream exchanged with the HODF; add/delete media streams and modify the attribute of the media stream, such as media type or coding format, etc., required by the change of the media capabilities between the HODF and the HOSF through session media re-negotiation.

Step 5109: the HOAF returns a session answer response to the HODF.

Step 5110: the HODF returns a session answer response acknowledgment to the HOAF.

Now the new session connection between the HODF and the HOAF is established, and the initial session connection with the HOSF is replaced by the new session connection on the HOAF side.

Step 5111: the HOAF sends a session release message to the HOSF.

Step 5112: the HOSF returns a session release success message to the HOAF, the HOSF and the HOAF release the session connection between them.

Now the handover user and the peer user continue their conversation through the new connection between the HODF and the HOAF.

It should be noted that, although in the present embodiment the peer UE is located in the IMS network, actually the method described in the above embodiment is also applicable to the cases when the peer UE is located in a PLMN CS domain or in the PSTN, so far as the terminal side of the peer user is taken as the combination of the peer UE, the CS/IMS interworking gateway which performs interworking for the peer UE and the CS connection between them. At this time, the call to the terminal side of the peer user is processed according to the standard IMS-CS interworking process, in other words, is directly routed by the home IMS network of the handover user to the network where the peer UE is located and further to the peer UE.

That is to say the schemes are independent of the network that the peer UE accesses, therefore in the embodiments described hereinafter, all peer users are supposed to be located in the IMS network, unless there is a special reason that needs to be explained.

FIG. 5B1 is a flowchart illustrating a handover according to the structure of the FIG. 3B.

The handover when there is an HOCF is described in detail hereinafter with reference to FIG. 5B1 and an embodiment.

As shown in FIG. 5B1, in the present embodiment, a normal session, i.e., the first connection, has already been established between the HOSF which has accessed the network and the peer UE. The session handover in the end-to-end/network-controlled mode according to the embodiment includes the following steps:

Step 5B101: the handover UE reports a service event to the HOCF.

The handover UE includes the HOSF and the HODF, and there are multiple methods for the handover UE to report the service event to the HOCF on the application layer, e.g., a Presence mechanism or directly access a database, etc.

The service event includes one of the following cases or any combination of the following:

(1) when the session connection of the handover UE changes, report session link change information, e.g., when the HOSF successfully establishes the initial session connection with the peer side, the HOSF reports the address of the peer side and the status of the established connection to the HOCF, the HOCF saves and maintains address of the peer side and the status of the established connection of the HOSF associated with each user, and sends the address of the peer side and the status of the established connection to the HODF during the handover to establish the new session link;

(2) when the HODF enters into the coverage area of a new access network, and if the handover successfully accesses the new access network and obtains a new access point, the HODF reports the address of the new access point and this event to the HOCF;

(3) When the HOSF detects that the signal intensity of the original network degrades to a threshold, the HOSF reports this situation to the HOCF, in other words, it gives a communication quality falling alert, and in such a case a handover may be performed.

(4) When the handover user triggers a handover on his own initiative, a handover request is reported by the handover UE to the HOCF; this may happen when the handover user needs to transfer to other mode or adopt services provided by other operators, at this time, the HOCF needs to verify the handover condition;

(5) the handover UE may also trigger a handover in follow circumstances: the handover UE moves, or needs to transfer to a new access network due to pre-configured conditions of the user or the network operator. At this time, the handover UE triggers a handover request to the HOCF. There may be many pre-configured conditions, e.g., when the handover UE detects that the signal of the original access network deteriorates, it actively triggers a "signal weak handover request", and this kind of request is basically handled completely by the radio access network according to the prior art; or, when the handover UE enters into the coverage area of a new access network, it triggers an access request and makes a connection request attempt, including obtaining address and access verification, etc., if the connection request attempt succeeds, it triggers a "handover possibility event" to the HOCF for processing.

Actually, the handover may be performed in various cases including not only the signal deterioration of a cell caused by roaming, but also conditions pre-configured by the user, e.g., when there are multiple access networks, the user may assign higher priority to a network which provides plenty of services, at this time, a handover is needed. In a word, the handover strategies can be more accurate and flexible, for instance, a handover can be triggered according to signal intensity, operator priority, access network priority, time and location, etc. For example, for a dual-mode cell phone that supports a Global System of Mobile (GSM) and a Wideband Code Division Multiple Access (WCDMA) system, when there is a coverage of the GSM and a coverage of the WCDMA simultaneously and the GSM is the current serving-network, the user usually wants to switch to the WCDMA network to obtain richer services with higher quality.

In this embodiment, the system may further perform a handover condition update, i.e., the handover user updates the handover conditions and user handover strategies by interacting with the HOCF through the handover UE. The HOCF maintains the handover conditions and strategies and initiates a handover when receiving a notification of a related event, or performs an authorization when receiving a handover request.

Step 5B102: after receiving the service event from the handover UE, the HOCF determines whether to initiate a handover according to the pre-configured handover conditions; the handover conditions can be signal intensity, operator preference, charging strategy or user pre-configured strategies, or any combination of the above. The HOCF then informs the handover UE by returning a handover initialization or a handover refuse command; if a handover refuse command is returned, go to Step 5B103, otherwise, go to Step 5B104.

Step 5B103: if the handover condition is not satisfied, the HOCF needs to inform the handover UE in some cases, e.g., when the handover user actively triggers a handover request, the HOCF should return a handover refuse message to the handover user, and ends the procedure.

Step 5B104: the HOCF indicates the HODF to perform the handover and establish a new session link; the HODF also receives other information from the HOCF at the same time along with the handover indication, wherein the most important information is the address of the peer UE, which is reported in Step 5B101; the HODF establishes a new session link, i.e., the second connection, on its own with the peer side of the original session link, and the process of the establishment can be implemented without the intervention of the service control layer.

Step 5B105: after the establishment of the second connection, the HODF reports the result to the HOCF; if the new session link is successfully established, go to Step 5B106, otherwise, go to Step 5B107.

Step 5B106: the HOCF informs the HOSF to release the original session link, i.e., the first connection; the HOSF release the original session link with the peer side on its own, thus the service is transferred to the new session link, end the procedure. The step of releasing the original link can be implemented without the intervention of the service control layer.

Step 5B107: after receiving new session link establishment failure information from the HODF, the HOCF releases the resources used for session link establishment, informs the handover user of the new session link establishment failure information, and end the procedure.

When the handover UE is controlled by a service control point, the handover is described hereinafter with reference to FIG. 5B2.

As shown in FIG. 5B2, the HOSF establishes a normal session link with the second UE on the other side through an access network in this embodiment.

Step 5B201: when the handover UE needs to be switched to a new access network due to movement or pre-configured conditions of the user or the operator, trigger a handover request to the service control point.

As the embodiment described above, there can be many handover conditions, which will not be described herein.

Step 5B202: after receiving a signal weak handover request event or a handover possibility event or other events from the access network, the service control point triggers the event to the corresponding HOCF. In other words, the service control point reports the handover request to the HOCF, which is responsible for centralized handling of handover requests in the entire network.

Step 5B203: after receiving the trigger event from the service control point, the HOCF determines whether to initiate a handover according to the pre-configured handover conditions; the handover condition may be signal intensity, operator preference, charging strategy or user pre-configured strategies, or any combination of the above. The HOCF then returns a handover indication or handover refuse command to the service control point; if a handover refuse command is returned, go to Step 5B204, otherwise, go to Step 5B205.

Step 5B204: after receiving the handover refuse command, the service control point issues a "Handover Refuse Command" to the handover UE at the original access point. The handover UE at the original access point ends the current handover request procedure, and returns a processing result to the service control point. For instance, the handover UE can modify the pre-configured handover condition due to the handover failure, and return the modification event to the service control point. End the current handover procedure.

Step 5B205: after receiving the handover indication, the service control point controls the handover UE to establish a new session link with the other end of the session. The step of establishing the new session link includes: issue a command to the handover UE, require the handover UE to call the other end of the session actively following a standard procedure, and establish a new session link, which uses the address and other relevant resources of the handover UE in the new access network, through the service control point of the other end of the session. Optionally, the service control point controls other network components which are able to provide conference resources to establish a conference, and establishes an additional session link for the handover UE and the other end of the session through a standard procedure, and controls them to join the conference.

Step 5B206: after receiving the control command from the service control point, the handover UE at the new access point calls to establish the new session or joins in the conference cooperating with the command, and returns the processing result to the service control point.

Step 5B207: the service control point performs corresponding process according to the processing result about the establishment of the new session link returned by the handover UE, if the processing result is that the link is successfully established, sends a command to the handover UE at the original access point to release the first session, go to Step 5B208, otherwise, go to Step 5B209.

Step 5B208: after receiving the command of releasing the original session link, the handover UE at the original access point releases the resources occupied by the original session link, transfers the service born by the original session to the new session for subsequent process, and returns a releasing result to the service control point to inform the HOCF that the handover is accomplished; the HOCF continues with the subsequent process, such as recording current access mode and status.

Step 5B209: the service control point reports handover failure information to the HOCF, and completes the release of the related resources employed in the handover, returns a handover failure information to the handover UE at the same time, maintains the original session link, releases all the resources employed for the establishment of the new session link, ends the procedure.

The above two embodiments mainly show the handover initiated by the HOCF according to the detection of the information reported by the handover UE, and also show different establishment methods of the new end-to-end session link during the handover. The embodiment hereinafter shows an IMS-IMS handover in the end-to-end/network-controlled mode, wherein the HOSF detects that the handover condition is satisfied and sends a handover request to the HOCF, which authorizes the request and returns a confirmation to the HOSF. Then the HOSE instructs the HODF to perform the handover.

FIG. 5B3 is a flowchart illustrating a handover in an end-to-end/network-controlled mode while the HODF initiates the performing of the handover according to the structure of FIG. 3B. The IMS-IMS handover in the end-to-end/network-controlled mode will be described hereinafter with reference to accompanying FIG. 5B3 and FIG. 3B, including:

Step 5201: the HOSF establishes a session connection with the HOAF on the terminal side of the peer user during the establishment of the initial session, and the HOCF is triggered in the home IMS network of the handover user according to the evaluation of the iFC in the user subscription data;

During the establishment of the initial session, the service node S-CSCF, which is currently assigned to the handover user by his/her home IMS network, triggers the current session to a network entity that performs the functions of the HOCF, such as an AS, according to the iFC in the subscription data downloaded from the HSS during the user registration according to the existing service triggering method in the IMS.

Step 5202: the HODF in the handover UE accesses the IMS network during the session, and the HOSF learns through interactions among internal modules in the handover UE or through a user indication that the HODF has already accessed the network.

Step 5203: the HOSF detects a handover-related event, e.g., the signal of the local point is weaker than that of the network which the HODF accesses.

Step 5204: the HOSF sends a handover request to the HOCF.

The handover request carries session information, handover reason information and HODF identity information.

Step 5205: the HOCF performs a handover authorization, i.e., determines whether the handover request is legal; if the handover request is legal, the HOCF returns a handover confirmation to the HOSF, execute Step 5206, otherwise, the HOCF returns a handover refuse to end the procedure.

The handover authorization performed by the HOCF can be a step of determining whether the HOSF is correlated with the HODF, the detailed process includes: the HOCF determines, according to the information carried in the handover request, e.g., the respective IMPU of the HOSF and the HODF, whether the two IMPUs are different public identities of a same IMS user's private identity; if they are, it is indicated that the HOSF is correlated with the HODF, otherwise, the HOSF is not correlated with the HODF.

The steps from Step 5206 to Step 5214 are basically identical to the steps from Step 5104 to Step 5112, the only difference lies in Step 5104, wherein the HOSF directly sends a handover indication to the HODF after the detection of the handover-related event, while in Step 5206 the HOSF sends the handover indication to the HODF after receiving a confirmation message from the HOCF when the authorization passes.

The handover in segmented mode is described hereinafter with reference to two embodiments of the present invention.

This embodiment is an IMS-IMS session handover in the CP-segmented/terminal-controlled mode, wherein the HODF determines whether the handover condition is satisfied and directly performs the handover.

Figure 5C:
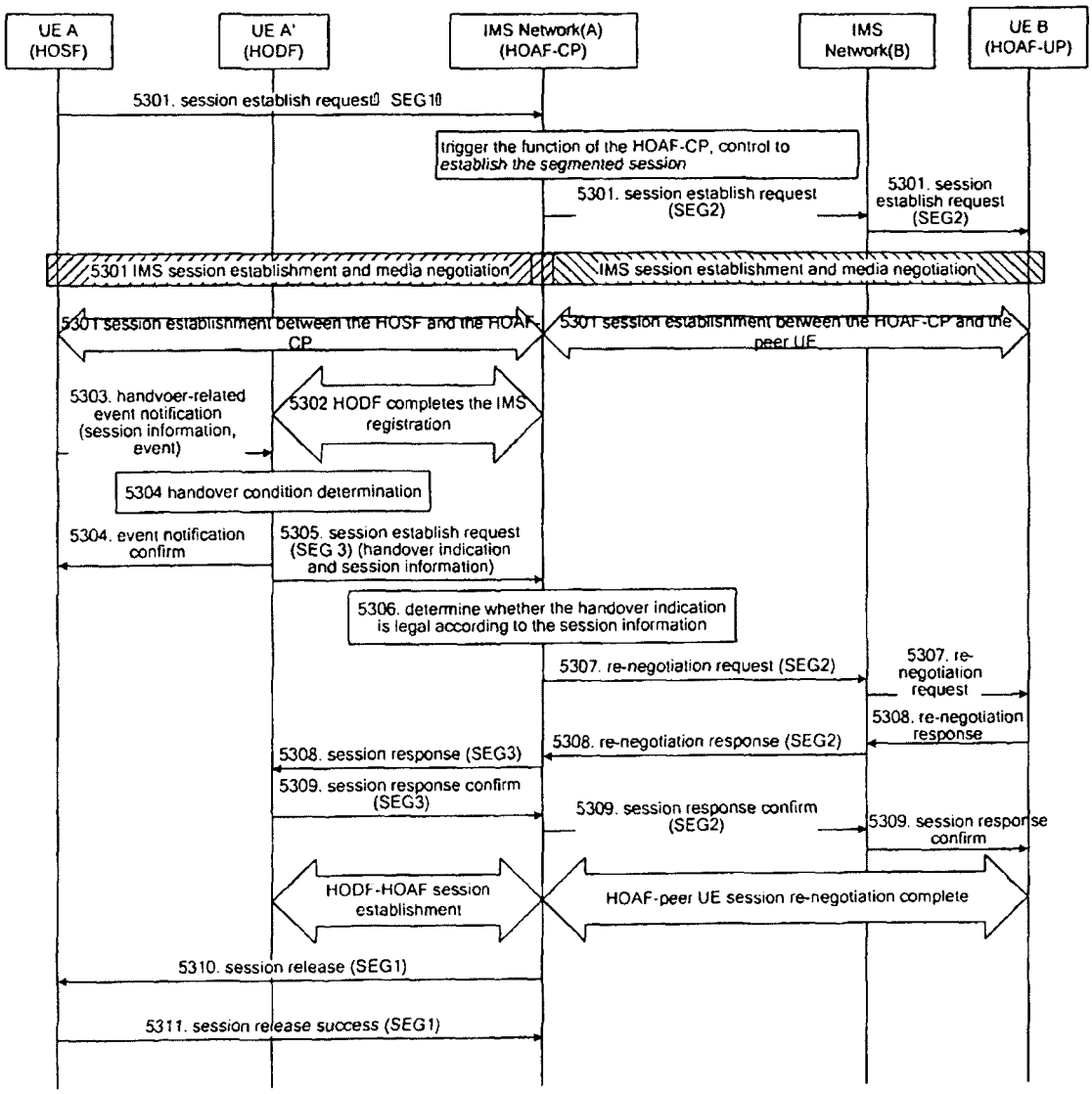
FIG. 5C is a flowchart illustrating a handover in a CP-segmented mode while the HODF initiates the performing of the handover according to an embodiment of the present invention.

FIG. 5C is a flowchart illustrating a handover in a CP-segmented mode while the HODF initiates the performing of the handover according to an embodiment of the present invention. As shown in FIG. 5C, the IMS-IMS handover in the CP-segmented/terminal-controlled mode includes:

Step 5301: during the establishment of the initial session, the HOSF sends a session establishment request to the home IMS network of the handover user, the IMS network triggers the control function of an AS that performs the functions of the HOAF-CP according to the evaluation of iFC in the user subscription data, the HOAF-CP ends the session establishment request from the HOSF, interacts with the HOSF to establish a first session segment, SEG1, initiates and establishes a second session segment, SEG2, with the terminal side of the peer user.

During the establishment of the initial session, the service node S-CSCF, which is currently assigned to the handover user by his/her home IMS network, triggers the current session to the AS that performs the functions of the HOAF-CP according to the iFC in the subscription data downloaded from the HSS during the user registration following the existing service triggering method in the IMS. In order to reduce the influence to other IMS services, the HOAF-CP should be set as close as possible to the HOSF/HODF, i.e., when the HOSF is a calling party during the establishment of the initial session, the priority level of the iFC corresponding to the AS that performs the functions of the HOAF-CP should be set as high as possible; when the HOSF is a called party during the establishment of the initial session, the priority level of the iFC corresponding to the AS that performs the functions of the HOAF-CP should be set as low as possible.

The HOAF-CP controls the establishment of the segmented session between the HOSF and the terminal side of the peer user, and performs correlative control over the session segments SEG1 and SEG2 in the 3PCC mode, so as to implement the end-to-end media exchange between the HOSF and the HOAF-UP on the terminal side of the peer user.

Step 5302: during the session between the handover user and the peer user through the HOSF, the HODF accomplishes an IMS access, and the HOSF learns that through interactions among internal modules in the handover UE or a user indication;

Step 5303: the HOSF sends a handover event notification to the HODF when the HOSF detects a handover event.

The handover event may include: the HOSF is about to lose the connection to the IMS network, and/or user pre-configured handover strategies, e.g., the conversation duration reaches a pre-configured handover interval. In addition, when the HOSF sends the handover event notification to the HODF, relevant information of the initial session between the HOSF and the HOAF is carried in the handover event notification;

Step 5304: the HODF determines whether the handover condition is satisfied, if the condition is satisfied, the HODF returns an event notification confirmation to the HOSF, otherwise, do not perform the handover and end the procedure.

The handover condition is considered to be satisfied under the following situations: the HODF considers that it has successfully accessed the IMS network, and/or the HODF determines that it can process a session, and/or the access point of the HODF is better than that of the HOSF with respect to signal intensity, network priority or service fee.

Step 5305: the HODF sends a session establishment request, which carries the session information and the handover indication, to the HOAF-CP through the IMS network.

The HODF sends the session establishment request to the HOAF-CP according to the session information in the handover event notification, and the session establishment request carries the location identifier of the network entity that performs the functions of the HOAF-CP; the location identifier can be provided by the HOSF to the HODF in the handover event notification, or be pre-stored as a part of network service settings, or be issued by the network when the HODF registers in the network and then stored in the HODF; In the IMS network, the session establishment request will be routed to the HOAF-CP by relevant entities according to the location identifier.

Step 5306: the HOAF-CP judges whether the session establishment request is legal; if it is legal, execute Step 5307; otherwise, the HOAF-CP returns a failure response to the HODF and ends the procedure.

Step 5307: based on a media negotiation situation during the establishment of the session between the HOAF-CP and the HODF, the HOAF-CP sends a re-negotiation request to the terminal side of the peer user through the SEG2 between itself and the terminal side of the peer user.

Step 5308: the terminal side of the peer user performs a re-negotiation interaction with the HOAF-CP, and returns a re-negotiation response to the HOAF-CP, which in turn returns a session answer response to the HODF.

Step 5309: the HODF returns a session answer response acknowledgement to the HOAP-CP, which in turn returns a re-negotiation response acknowledgement to the terminal side of the peer user.

From Step 5305 to Step 5309, the HOAF-CP correlatively controls the establishment of the SEG3 between itself and the HODF and the re-negotiation on the SEG2 bet ween itself and the terminal side of the peer user in the 3PCC mode, so as to make the HOAF-UP on the terminal side of the peer user change to exchange with the HODF finally, and the type of the exchanged media is compatible to the media capability of the HODF.

Thus, the new session connection is established between the HOAF and the HODF, and the initial connection with the HOSF is thus replaced by the new session connection; in the following steps the initial session will be released.

Step 5310: the HOAF sends a session release message to the HOSF through the SEG1.

Step 5311: the HOSF returns a session release success message to the HOAF through the SEG1, the HOSF and the HOAF release the session connection between them.

It should be noted that the CP-segmented mode in this embodiment can also work in the network-controlled mode, wherein, the home IMS network of the handover user triggers not only the control of the HOAF-CP, but also the control of the HOCF for the handover authorization, and the two control functions usually are performed in the same AS. During the handover event detection and handover initiation, when the entity which is in charge of condition detection (e.g., the HODF in this embodiment) detects that the handover condition is satisfied, it needs to send a handover request to the HOCF first, and performs handover only after the request authorization on the HOCF passes.

The next embodiment shows an IMS-IMS handover in a CPandUP-segmented/network-controlled mode, wherein the HOSF detects that the handover condition is satisfied and sends a handover request to the HOCF, the HOCF indicates the HOAF to perform the handover after the authorization succeeds.

Figure 5D:
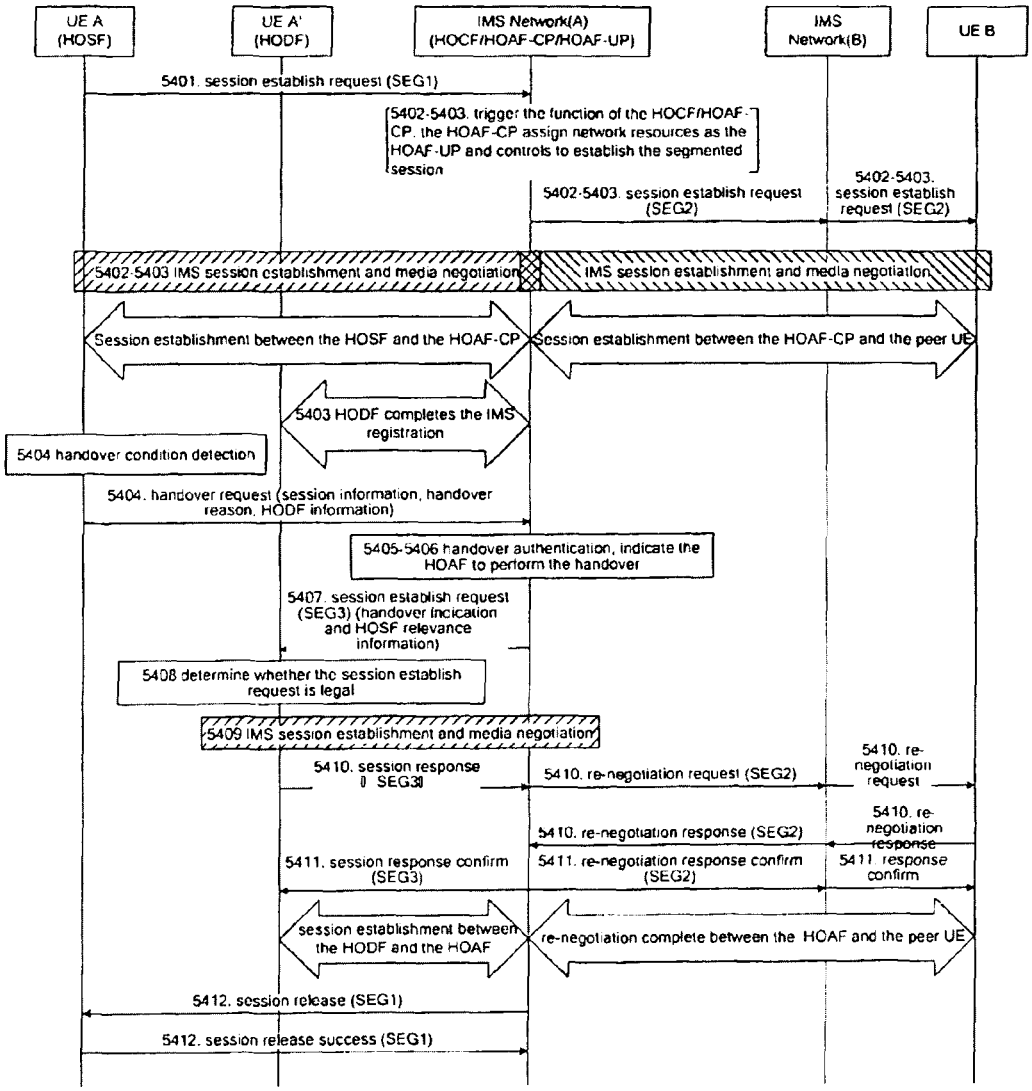
FIG. 5D is a flowchart illustrating a handover in a CPandUP-segmented mode while the HOAF initiates the performing of the handover according to an embodiment of the present invention.

FIG. 5D is a flowchart illustrating a handover initiated in a CPandUP-segmented mode while the HOAF initiates the performing of the handover according to an embodiment of the present invention. As shown in FIG. 5D, the IMS-IMS handover in the CPandUP-segmented/network-controlled mode according to the embodiment of the present invention includes the following steps:

Step 5401: the HOST sends a session establishment request to the home IMS network of the handover user during the establishment of the initial session.

Step 5402: the IMS network triggers, according to the iFC in the user subscription data, the control function of the AS that performs the functions of the HOCF and the HOAF-CP, the HOAF-CP controls the establishment of the segmented session between the HOSF and the terminal side of the peer user, including the SEG1 between the HOAF-CP and the HOSF, and the SEG2 between the HOAF-CP and the terminal side of the peer user.

Step 5403: during the establishment of the segmented session, the HOAF-CP assigns corresponding media resources on the network side as the HOAF-UP for the session, and establishes segmented media exchange between the HOSF and the terminal side of the peer user through the HOAF-UP over the two session segments separated by the HOAF-CP.

The step of the HOAF-CP assigning media resources as the HOAF-UP for the session includes: assign a corresponding port on an IMS Media Resource Function (MRF), and accomplish the segmented media exchange between the HOSF and the terminal side of the peer user, wherein, the segments include: from the HOSF to an HOAF-UP port 1, from the HOAF-UP port 1 to an HOAF-UP port 2 and from the HOAF-UP port 2 to the terminal side of the peer user. Among the segments, the media exchange between the HOSF and the HOAF-UP port 1 is controlled by the SEG1 between the HOSF and the HOAF-CP, the media interaction between the HOAF-UP port 2 and the terminal side of the peer user is controlled by the SEG2 between the HOAF-CP and the terminal side of the peer user, and the connection between the HOAF-UP port 1 and HOAF-UP port 2 is controlled by the HOAF-CP.

Thus, the initial session connection in the CPandUP-segmented mode is established between the HOSF and the terminal side of the peer user to transmit the session. During the session between the handover user and the peer user through the HOSF, the HODF accesses the network, and the HOSF learns that through interactions among the internal modules in the same terminal of a handover user or a user indication.

Step 5404: the HOSF detects that the handover condition is satisfied, and then sends a handover request to the HOCF.

The handover request carries session information, handover reason information and HODF information.

Step 5405: the HOCF performs a handover authorization to determine whether the handover is legal; if it is legal, execute Step 5406, otherwise, the HOCF returns a handover refuse message to the HOSF and ends the procedure.

The step of HOCF performing the handover authorization to determine whether the handover is legal can be implemented by determining whether the HOSF is associated with the HODF, i.e., determining, according to the information, e.g., the IMPI, of the HOSF and the HODF carried in the handover request and in the user subscription data (saved in the HOCF, or saved in the HSS and downloaded to the HOCF when the user registers), whether the IMPIs of the HOSF and the HODF are corresponding IMPIs of a same IMPU; if they are, it indicates that the HOSF is associated with the HODF, otherwise, it indicates that the HOSF is not associated with the HODF.

Step 5406: the HOCF indicates the HOAF-CP to perform the session handover.

When the HOCF indicates the HOAF-CP to perform the session handover, it provides the location identifier of the HODF, obtained from the handover request or the user subscription data, to the HOAF-CP.

Since the HOCF and the HOAF-CP are located in the same network entity (implemented in the same AS), the above interaction between the HOCF and the HOAF-CP is also interactions among internal modules, and the foregoing is only a preferred embodiment illustrating an interaction requirement. The interactions between the HOCF and the HOAF-CP can be implemented through any convenient internal interaction process, as long as the process achieves the equivalent effect and is in accordance with the essence of the embodiment of the present invention.

Step 5407: the HOAF-CP sends a session establishment request to the HODF through each IMS network entity according to the obtained location identifier of the HODF.

The session establishment request carries the location identifier of the HODF, the HOAF-CP and each IMS network entity decide the route according to the location identifier of the HODF. Furthermore, the session establishment request can carry a handover indication, and each IMS network entity performs special processes on the session according to the handover indication, including: prohibiting the duplicate triggering of service, and/or shunning influences from other services, and/or special charging, etc.

Step 5408: the session establishment request can further carry relevant information of the HOSF, and the HODF determines whether the session establishment request is legal according to the relevant information of the HOSF in the session establishment request; if the request is legal, execute Step 5409, otherwise, the HODF returns a refuse response to the HOAF-CP and ends the procedure.

The step of the HODF determining whether the session establishment request is legal includes: the HODF determines whether the HOSF is the associated HOSF of the HODF. In addition, each IMS network entity can also perform a special process on the session according to the relevant information of the HOSF in the session establishment request (regard the relevant information as a kind of implicit handover indication), including: prohibiting the duplicate triggering of service, and/or shunting influences from other services, and/or special charging treatment, etc.

Step 5409: the HODF interacts with the HOAF-CP to establish a new session SEG3 between them, and during the establishment, the HODF performs a media negotiation with the HOAF-CP according to the media capability of the local end to determine the media type, coding format, address and port or other information of the exchanged media. During the establishment of the SEG3, the HOAF-CP assigns a new port resource, i.e., HOAF-UP port 3, on the MRF, and controls the establishment of the media exchange between the HODF and the HOAF-UP port 3.

The HODF can also perform a special process according to the handover indication (including the relevant information of the HOSF as an implicit handover indication) in the session establishment request, e.g., controls the handover UE to avoid ringing.

Step 5410: the HODF returns a session answer response to the HOAF-CP. The HOAF-CP determines whether to modify the attribute of the media exchanged with the terminal side of the peer side according to the result of the media negotiation with the HODF. In the present embodiment, the HOAF-CP initiates and interacts to accomplish the re-negotiation through the SEG2 with the terminal side of the peer user.

During the re-negotiation through the SEG2, the HOAF-CP modifies the attribute of the media exchanged between the HOAF-UP port 2 and the terminal side of the peer side according to the result of the media negotiation with the HODF. Finally, under the control of the HOAF-CP, replace the connection between the HOAF-UP port 1 and the HOAF-UP port 2 by the connection between the HOAF-UP port 2 and the HOAF-UP port 3, and release the HOAF-UP port 1 during the release of the SEG1.

Step 5411: the HOAF-CP returns a session answer response acknowledgement to the HODF, and returns a re-negotiation answer response acknowledgement to the terminal side of the peer user.

Thus, the session between the HODF and the HOAF is established, and the initial session between the HOSF and the HOAF is replaced.

Step 5412: the HOAF-CP sends a session release message through the SEBG to the HOSF, the HOSF then releases the connection of the SEG1 with the HOAF-CP, and returns a session release success message to the HOAF-CP.

Now the handover user and the peer user continue their conversation through the new connection between the HODF and the HOAF.

It can be seen from the above embodiment that in the establishment of the new connection between the HODF and the HOAF during the handover, the session establishment request can also be initiated by the HOAF-CP to the HODF (i.e., the HOAF-CP initiates the performing of the handover). However, in the two segmented modes shown in FIG. 3C, since the HOAF-CP is on the network side while the HODF is in the handover UE, the handover with the new connection initiated to establish by the HODF equals to a new session establishment adopting a mobile origination procedure, and the handover with the new connection initiated to establish by the HOAF-CP equals to a new session establishment adopting a mobile termination procedure. Use mobile termination procedure includes an additional step of inquiring the current position of the user than the mobile origination procedure. In addition, when the HODF is located in the CS domain, a paging process is further needed. Therefore, the mobile termination procedure is generally slow than mobile origination procedure. Although both the two methods can be adopted, the new connection is established more quickly when the HODF initiates the establishment of the new connection, and therefore better handover effect can be achieved. So, in the following embodiments, new connections initiated to establish by the HODF are taken as examples.

Figure 8:
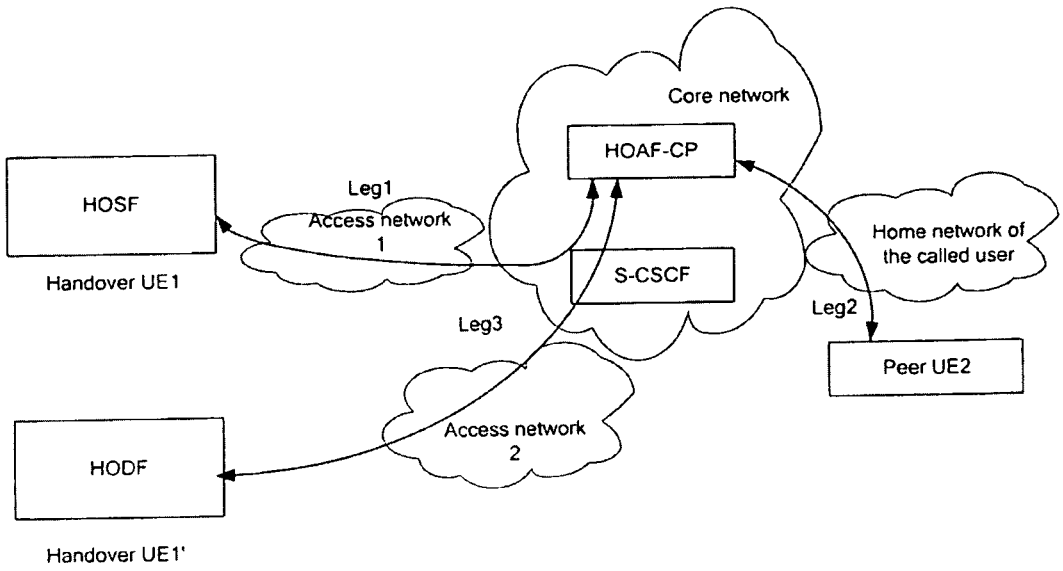
FIG. 8 is a schematic diagram illustrating a system implementing an IMS-IMS handover when access networks of the HOSF and HODF are different.

The segmented mode in the above two embodiments can be represented by FIG. 8. FIG. 8 is a schematic diagram illustrating a system of an IMS-IMS handover when access networks of the HOSF and HODF are different. In FIG. 8, during the establishment of the initial session connection, the connection between the HOAF-CP and the HOSF in the handover UE through the access network 1 is the control plane first connection, i.e., leg1.

The connection between the HOAF-CP and the terminal side of the peer user is leg2, and the handover user implements the conversation with the peer user through the leg1 and the leg2. When the handover condition is satisfied, the HODF establishes a second connection, i.e., leg3, with the HOAF-CP. When the handover is accomplished, the handover user continues the conversation with the peer user through the leg3 and the leg2.

During the IMS-IMS handover in various modes, a third user may initiate a call to the HOSF used by the handover user in the initial connection, wherein the call may be towards the shared IMPU of the HOSF and the HODF or towards the dedicated IMPU of the HOSF. Since in the embodiments of the present invention, the session handover process from the HOSF to the HODF may be invoked by various reasons, such as, the HOSF is about to lose the connection to the network, e.g., when the radio signal deteriorates, or the battery of the handover UE is used up, so proper actions should also be taken in such cases. In other words, the call from the third user to the HOSF should also be delivered to the HODF in the handover UE according to the specific handover reason.

Figure 6A:
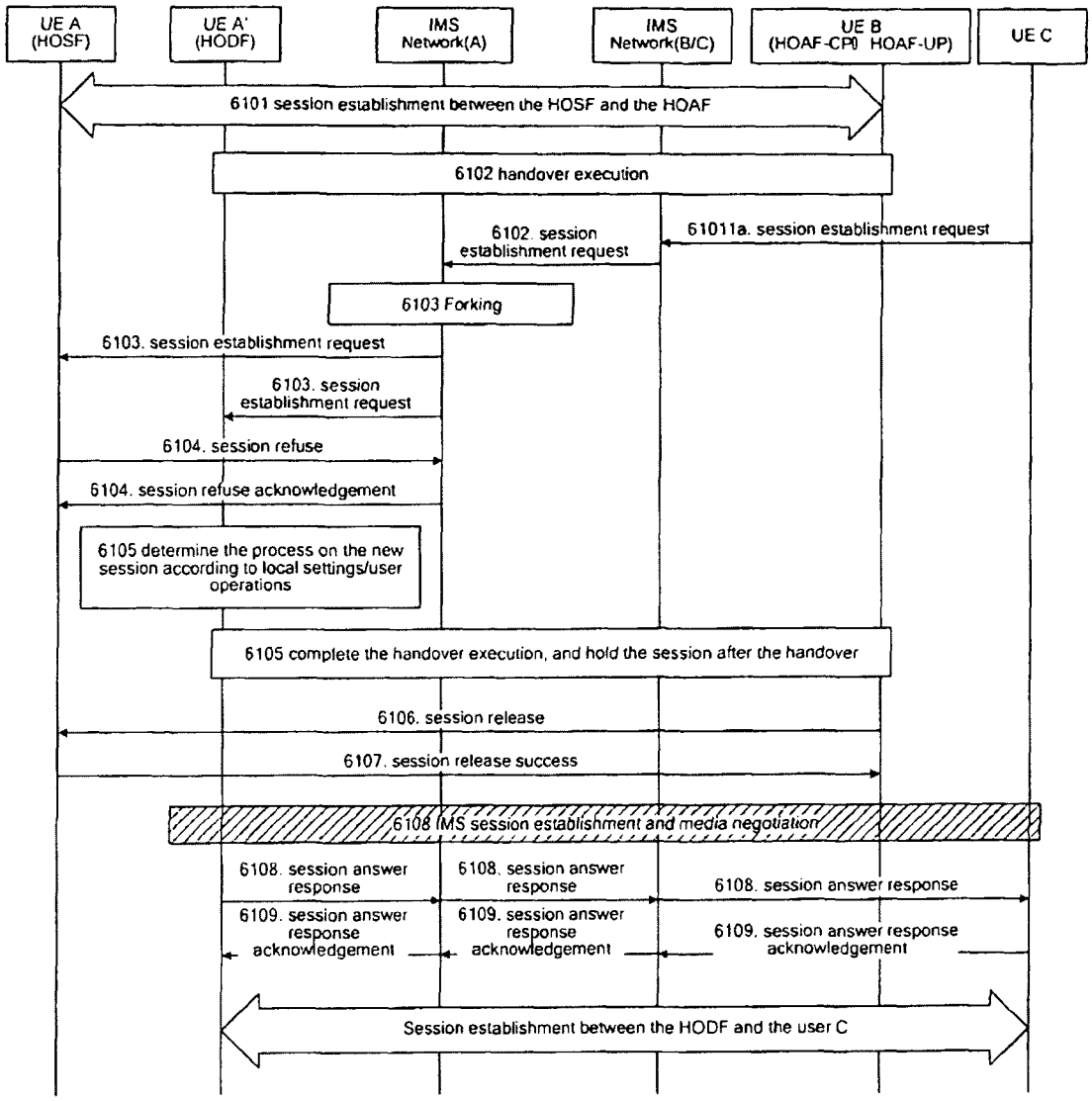
FIG. 6A is a flowchart illustrating a procedure of delivering a call from a third user to the HODF in the handover UE while an IM Public user identity (IMPU) of the handover user is shared by the HOSF and the HODF according to an embodiment of the present invention.

FIG. 6A is a flowchart illustrating a procedure of delivering a call from a third user to the HODF in the handover UE while the IMPU of the handover user is shared by the HOSF and the HODF according to an embodiment of the present invention. As shown in FIG. 6A, taking the end-to-end/terminal-controlled mode as an example, when the HOSF and the HODF share the IMPU of the handover user while having different IMPIs, the procedure of delivering a call from a third user to the HODF in the handover UE during the session handover includes the following steps:

Step 6101: the HOSF in the handover UE establishes a connection with the HOAF on the terminal side of the peer user to implement the conversation.

Step 6102: during the session handover, the home IMS network of the handover user receives a session establishment request from a third user, and the request is towards the shared IMPU of the HOSF and the HODF of the handover user.

Step 6103: the home IMS network of the handover user performs a forking process to the session establishment request following a standard procedure, and sends the session establishment request to the HOSF and the HODF respectively.

The forking process includes: according to corresponding legal contact addresses of the IMPU, synchronously send or serially attempt to send the received session establishment request to multiple addresses based on a preference settings of the user.

Step 6104: the HOSE returns a session refuse message to the home IMS network of the handover user, the home IMS network of the handover user then returns a session refuse acknowledgement to the HOSF.

Step 6105: the HODF determines a processing strategy for the two sessions, i.e., the handover session with the peer user and the new session of the third user, according to pre-set local configurations and a user indication.

For example, the processing strategy of the HODF is to accept the new session from the third user while holding the handover session. Then the HODF holds the handover session with the terminal side of the peer user after the session handover, the HOAF releases the session between the HOAF and the HOSF. After that, the handover user establishes a new session with the third user through the HODF and performs a media negotiation interaction, and finally establishes the new session with the third user.

Step 6106: after completing the session handover and holding the handover session, the HOAF sends a session release message to the HOSF.

Step 6107: the HOSF sends a session release success message to the HOAF.

Thus the session between the HOSF and the HOAF is released. Step 6108: at the same time, the HODF establishes a session and performs a media negotiation interaction with the third user, and finally sends a session answer response to the third UE.

Step 6109: the third UE returns a session answer response acknowledgement to the HODF, and the handover user establishes a session connection with the third user through the HODF.

Figure 6B:
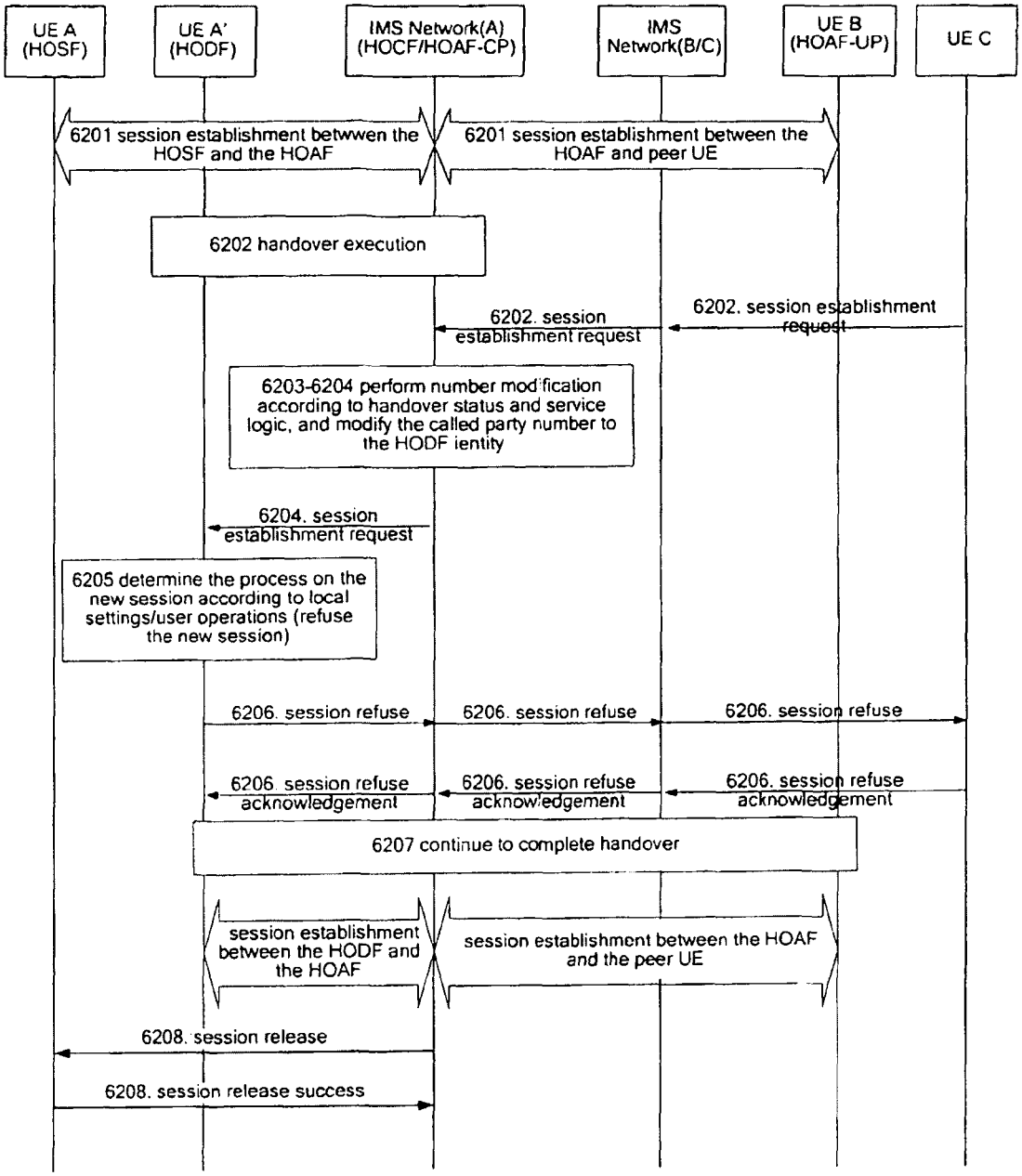
FIG. 6B is a flowchart illustrating a procedure of delivering a call from a third user to the HODF in the handover UE while the IMPU of the handover user is not shared by the HOSF and the HODF according to an embodiment of the invention.

FIG. 6B is a flowchart illustrating a procedure of delivering a call from a third user to the HODF in the handover UE while the IMPU of the handover user is not shared by the HOSF and the HODF according to an embodiment of the invention. As the HOSF and the HODF have different IMPUs, a number modification process by a network control entity is required to deliver the call originally destined to the HOSF to the HODF. The network control entity can be the HOCF in the network-controlled mode or the HOAF-CP in the segmented mode. In the present embodiment, the HOCF is taken as the network control entity. As shown in FIG. 6B, taking the CP-segmented/network-controlled mode as an example, when the HOSF and the HODF employ different IMPUs of the handover user, the procedure of delivering a call from a third user to the HODF in the handover UE during the session handover includes the following steps:

Step 6201: during the establishment of the initial session, the HOSF in the handover UE triggers the control function of the AS which performs the functions of the HOCF/HOAF-CP in the home IMS network of the handover user, and establishes the CP-segmented connections under the control of the HOAF-CP to implement the conversation.

Step 6202: during the session handover, the home IMS network of the handover user receives a session establishment request from a third user, wherein, the session establishment request is towards the IMPU of the HOSF of the handover user.

Step 6203: the HOCF in the home IMS network of the handover user learns that the new session from the third user should be delivered to the HODF in the handover UE according to the handover status and relevant service logic.

The handover status and the relevant service logic include: the HOCF learns that the HOSF is about to lose the network connection according to the handover request sent by the HOSF.

Step 6204: the HOCF indicates to modify the destination identifier in the session establishment request from pointing to the IMPU of the HOSF to the IMPU of the HODF, and then sends the modified session establishment request to the HODF.

Step 6205: the HODF determines a processing strategy for the handover session with the peer user and the new session of the third user according to the pre-set local configuration and the user indication.

For example, the processing strategy of the HODF is to refuse the new session of the third user. Then the HODF returns a session refuse message to the third user through the home IMS network of the handover user, the third user returns a session refuse confirmation to complete the release of the new session. And then the HODF continues with the subsequent process of the handover session, e.g., establishment of the session between the HODF and the HOAF-CP, the session re-negotiation between the HOAF and the terminal side of the peer user, and the final release of the session between the HOAF-CP and the HOSF by the HOAF-CP, as illustrated in following steps.

Step 6206: the HODF sends a session refuse message to the third UE through the IMS network, and the third user returns a session refuse confirmation to the HODF.

Step 6207: the HODF continues with the handover of the session with the terminal side of the peer user, establishes a session connection between the HODF and the HOAF to continue the conversation.

Step 6208: the HOAF-CP sends a session release message to the HOSF, the HOSF then returns a session release success message to the HOAF-UP.

The CS-IMS handover is described hereinafter.

At this time, the correlated relationship between the HOSF and the HODF is the subscription identities of the same user in different network subsystems, i.e., the MSISDN and the IMPU corresponding to the same user.

The CS-IMS handover can be accomplished in various service modes, as shown in FIGS. 3A, 3B and 3C, and the new connection can be initiated to establish by the HODF or by the HOAF-CP. Only some typical embodiments are described hereinafter.

Figure 7A:
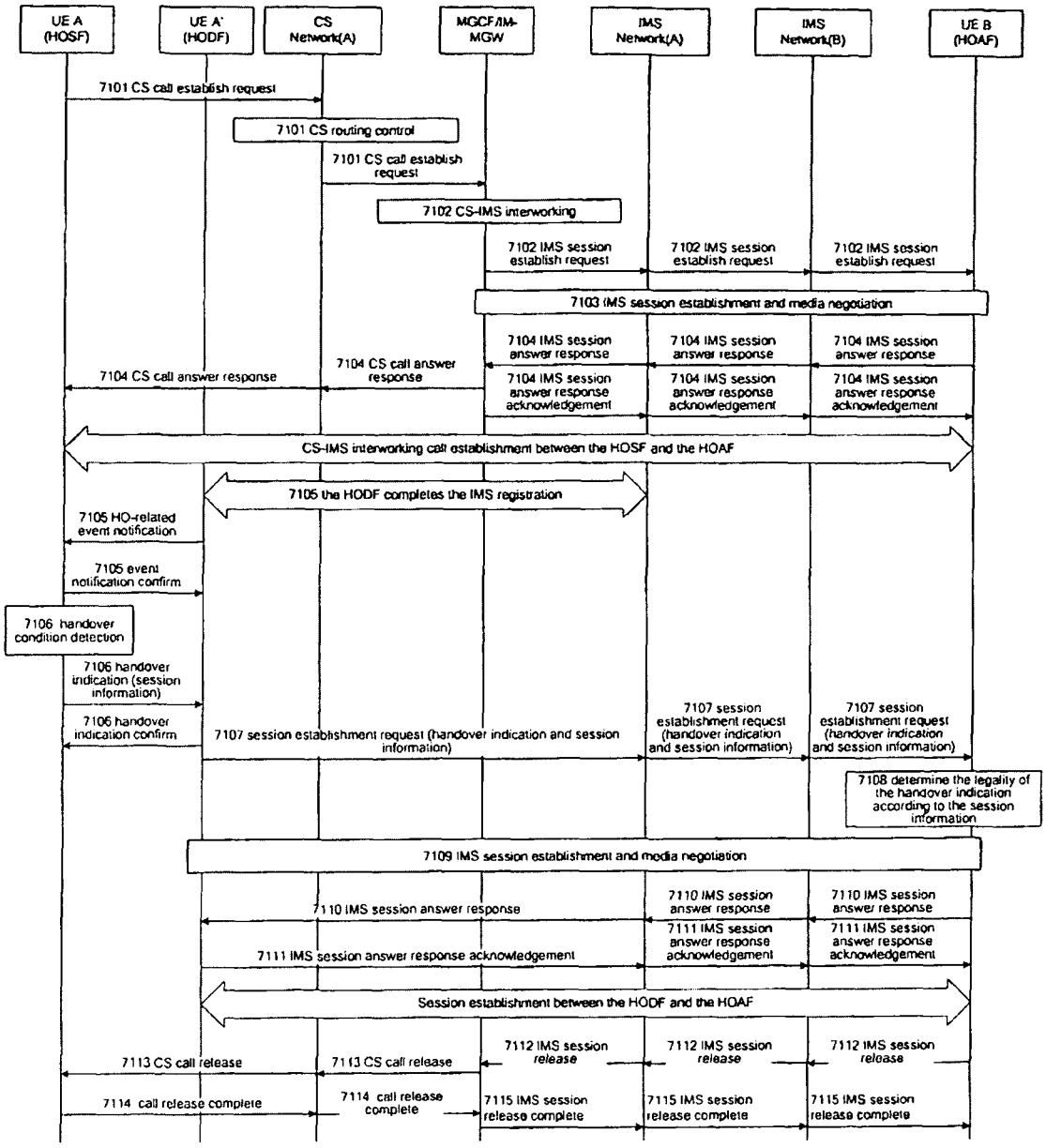
FIG. 7A is a flowchart illustrating a CS-IMS handover in an end-to-end/terminal-controlled mode according to an embodiment of the present invention.

FIG. 7A is a flowchart illustrating a CS-IMS handover in an end-to-end/terminal-controlled mode according to an embodiment of the present invention. As shown in FIG. 7A, taking the handover in the end-to-end/terminal-controlled mode while the new connection is initiated to establish by the HODF as an example, the CS-IMS handover in the embodiment of the present invention includes:

Step 7101: the HOSF in the handover UE initiates a call establishment request in the CS domain to the terminal side of the peer user, and the call establishment request is routed in the CS domain to the CS/IMS interworking gateway MOCF/IM-MGW.

In the present embodiment, the peer UE is located in an IMS network. Therefore, the call establishment request is routed in the CS domain to the CS/IMS interworking gateway MGCF/IM-MGW so as to enter the IMS network of the peer user according to the existing called party analysis procedure. However, when the peer UE is located in a CS/PSTN, in order to implement the IMS based handover in various modes, the CS domain where the handover user is currently located needs to route the call to the home IMS network of the handover user. Wherein, the CS domain can determine the route to the MGCF/IM-MGW and further to the home IMS network of the handover user according to the information including: CS routing strategies (e.g., according to local static routing configuration, or triggering CAMEL for dynamic control by intelligent platform according to various conditions), or Number Portability (NP) mechanisms, or analysis of the called party number, i.e., the number of the peer user side (the handover UE provides a called party number with a special prefix in the initiated CS call establishment request, and the CS domain where the handover user currently is located performs a special routing control according to the prefix).

Step 7102: the CS/IMS interworking gateway performs a CS/IMS interworking process, sends an IMS session establishment request to the terminal side of the peer user through relevant nodes of the home IMS network of the handover user, the home IMS network of the peer user and the IMS network the peer user currently located;

Step 7103: perform a media negotiation and establish an IMS session between the terminal side of the peer user and the CS/IMS interworking gateway.

Step 7104: the terminal side of the peer user returns an IMS session answer response, the CS/IMS interworking gateway converts the IMS session answer response into a CS call answer response and sent the CS call answer response to the HOSF; at the same time, the CS/IMS interworking gateway returns an IMS session answer response acknowledgement to the terminal side of the peer user, and establishes a CS/IMS interworking session between the HOSF and the terminal side of the peer user.

Step 7105: the HODF completes an IMS registration and sends a handover event notification to the HOSF, and then the HOSF returns an event notification confirmation to the HODF.

Step 7106: the HOSF determines whether the session handover condition is currently satisfied; if it is satisfied, the HOSF sends a handover indication carrying session information to the HODF, then the HODF returns a handover indication confirmation to the HOSF and executes Step 7107, otherwise, the HOSF continues with the session and ends the current procedure.

Step 7107: the HODF sends a session establishment request carrying the session information and the handover indication to the HOAF-CP.

Step 7108: the HOAF-CP determines whether the session establishment request is legal; if the request is legal, execute Step 7109; otherwise, end the current procedure.

Step 7109: the HOAF and the HODF perform the establishment of the new session and the media negotiation during the session establishment.

Step 7110: the HOAF returns a session answer response to the HODF.

Step 7111: the HODF returns a session answer response acknowledgement to the HOAF.

Thus, the new session connection between the HODF and the HOAF is established.

Step 7112: the HOAF sends a session release message in the IMS network to the CS/IMS interworking gateway MGCF/IM-MGW.

Step 7113: the CS/IMS interworking gateway performs a CS/IMS interworking process and sends a call release message in the CS domain to the HOSF.

Step 7114: the HOSF sends a call release complete message to the CS/IMS interworking gateway MGCF/IM-MGW.

Step 7115: the interworking gateway MGCF/IM-MGW performs a CS/IMS interworking process and sends a call release confirmation to the HOAF.

Thus, the end-to-end session handover is complete, the handover user and the peer user continue their conversation through the new session connection between the HODF and the HOAF.

To further illustrate the effectiveness of the scheme of the present embodiment in a CS-IMS handover when the peer user is in the CS/PSTN, an embodiment of the present invention is described hereinafter, wherein the handover is in the CP-segmented/terminal-controlled mode and the HODF initiates the performing of the handover, and the peer UE is currently located in a CS network.

Figure 7B:
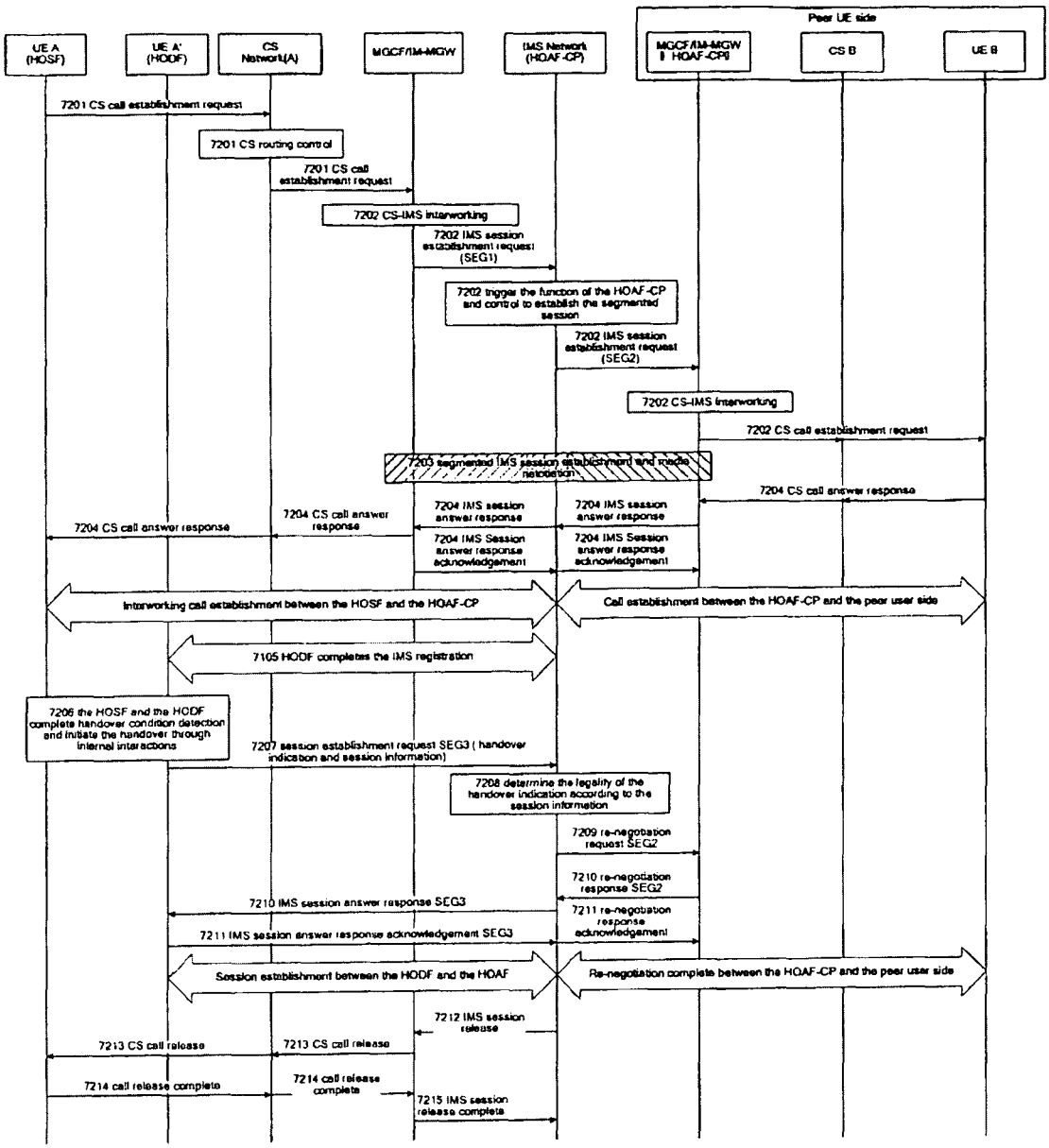
FIG. 7B is a flowchart illustrating a CS-IMS handover in a CP-segmented/terminal-controlled mode when the peer user also is located in a CS domain according to an embodiment of the invention.

FIG. 7B is a flowchart illustrating a CS-IMS handover in a CP-segmented/terminal-controlled mode when a peer user is also located in a CS domain according to an embodiment of the invention. As shown in FIG. 7B, taking the handover in the CP-segmented/terminal-controlled mode and the performing of the handover initiated by the HODF as an example, the CS-IMS handover in the embodiment of the present invention includes:

Step 7201: the HOSF in the handover UE initiates a call establishment request in the CS domain to the terminal side of the peer user; the call establishment request is routed by the CS domain where the handover user is currently located to the CS/IMS interworking gateway MGCF/IM-MGW interworking with the home IMS network of the handover user.

Step 7202: the CS/IMS interworking gateway performs a CS/IMS interworking process, the control function in the AS which performs the functions of the HOAF-CP is triggered in the home IMS network of the handover user, and the HOAF-CP controls the establishment of the segmented connection. Then after an interworking processing and CS domain routing, the CS call establishment request which is used to establish the SEG2 between the HOAF-CP and the terminal side of the peer user is sent to the terminal of the peer side according to the standard interworking procedure and through an interworking gateway, which is selected by the IMS network and interworking with the CS domain where the peer UE is currently located.

The home IMS network of the handover user may trigger the control function in the AS that performs the functions of the HOAF-CP following the current IMS standards according to an E.164 number or a special prefix of the E.164 number modified in the routing control of the CS domain where the handover user is currently located, e.g., taking a special E.164 number or a prefix as an IMS domain Public Service Identity (PSI).

As described above, in the present embodiment, the peer UE is currently in the CS domain, so the terminal side mentioned herein actually includes the peer UE, the interworking gateway interworking for the peer UE, and the CS connection between the interworking gateway and the peer UE.

Step 7203: the HOAF-CP establishes the segmented IMS session and performs a media negotiation during the session establishment respectively with the terminal side of the peer user (actually the interworking gateway interworking with the CS domain where the peer UE is currently located) and the interworking gateway interworking with the CS domain where the handover user is currently located.

Step 7204: the peer UE returns a CS call answer response, an interworking gateway corresponding to the peer UE converts the CS call answer response into an IMS session answer response and sends the IMS session answer response to the HOAF-CP; the HOAF-CP then returns the IMS session answer response to the CS/IMS interworking gateway, the CS/IMS interworking gateway converts the IMS session answer response into a CS call answer response and sends the CS call answer response to the HOSF; meanwhile, the CS/IMS interworking gateway sends an IMS session answer response acknowledgement to the HOAF-CP, which in turn sends the IMS session answer response acknowledgement to the terminal side of the peer user, thus the two segments of the CS/IMS interworking sessions are established respectively from the HOSF to the HOAF-CP and from the HOAF-CP to the terminal side of the peer user; then the handover user and the peer user implements conversation through the session segments.

Step 7205: the HODF completes an IMS registration.

Step 7206: the HODF performs an internal interaction with the HOSF to complete handover condition detection, and indicates to initiate a handover.

Step 7207: the HODF sends a session establishment request carrying session information and a handover indication to the HOAF-CP.

Step 7208: the HOAF-CP judges whether the session establishment request is legal; if it is legal, execute Step 7209, otherwise, end the current procedure.

Step 7209: the HOAF-CP sends a re-negotiation request to the terminal side of the peer user, and indicates the terminal side of the peer user to re-direct the media streams to the HODF.

Step 7210: the terminal side of the peer user returns a re-negotiation response to the HOAF-CP, which in turn returns a session answer response to the HODF.

Step 7211: the HODF returns a session answer response acknowledgement to the HOAP-CP, which in turn returns a re-negotiation response acknowledgement to the terminal side of the peer user.

Thus the new session connection between the HODF and the HOAF-CP is established, and the media streams are re-directed through the re-negotiation between the HOAF-CP and the terminal side of the peer user; the peer user and the handover user are transferred to the new connection to continue their conversation.

Step 7212: the HOAF sends a session release message in the IMS network to the CS/IMS interworking gateway MGCF/IM-MGW.

Step 7213: the CS/IMS interworking gateway performs CS/IMS interworking process and sends a call release message in the CS domain to the HOSF.

Step 7214: the HOSF sends a call release complete message to the CS/IMS interworking gateway MGCF/IM-MGW.

Step 7215: the interworking gateway MGCF/IM-MGW performs a CS/IMS interworking process and sends a session release confirmation to the HOAF.

Then, the handover from IMS to CS domain is described hereinafter.

Similarly, the IMS-CS handover can be accomplished in various service modes, as shown in FIGS. 3A, 3B and 3C, wherein, the new connection established during the handover procedure can be initiated to establish by the HODF or by the HOAF-CP. The embodiment hereinafter shows only the performing of the handover initiated by the HODF in the CP-segmented/network-controlled mode.

Figure 9:
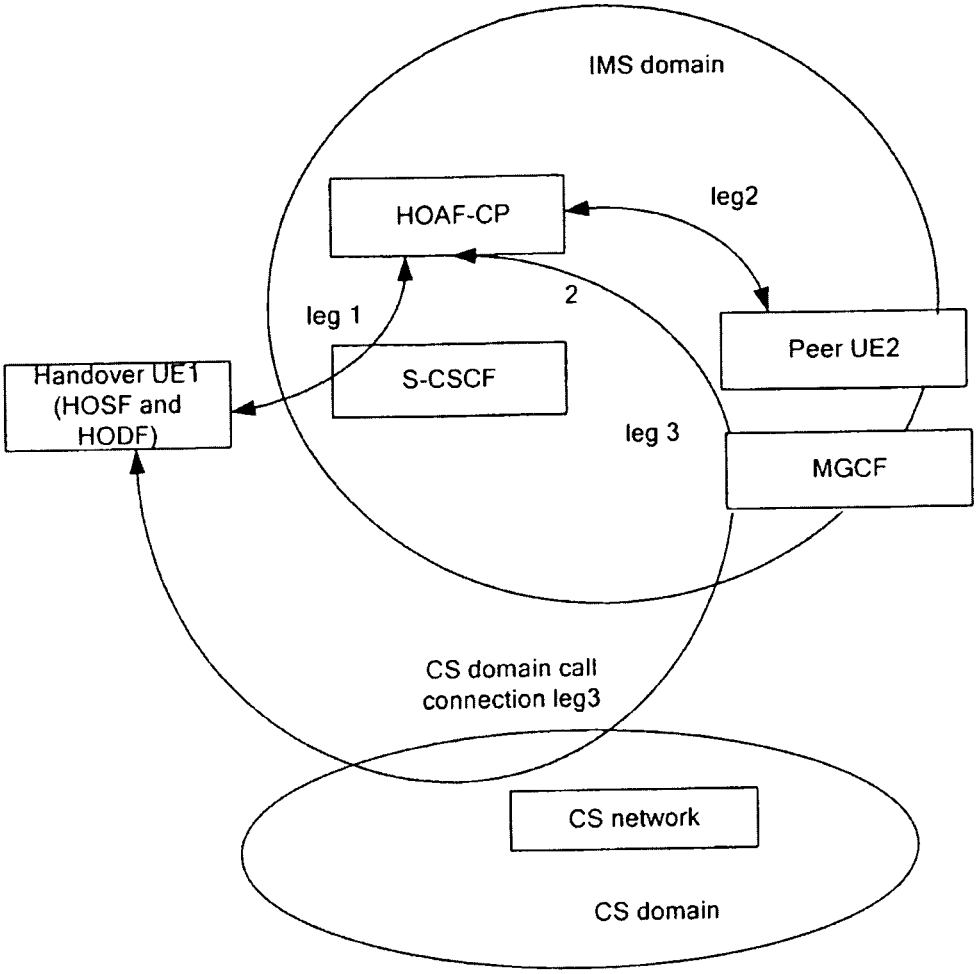
FIG. 9 is a schematic diagram illustrating a system implementing an IMS-CS handover in a CP-segmented mode.

FIG. 9 is a schematic diagram illustrating a system implementing an IMS-CS handover in a CP-segmented mode.

In FIG. 9, during the establishment of the initial session connection, the connection between the HOSF in the handover UE and the HOAF-CP is the control plane first connection, i.e., leg1, the connection between the HOAF-CP and the terminal side of the peer user is leg2, and the handover user performs a conversation with the peer user through the leg1 and the leg2. When the handover condition is satisfied, the HODF in the handover UE establishes a second connection, i.e., leg3, with the HOAF-CP through the CS domain and the interworking gateway. When the handover is accomplished, the handover user continues to perform conversation with the peer user through the leg3 and the leg2.

Figure 7C:
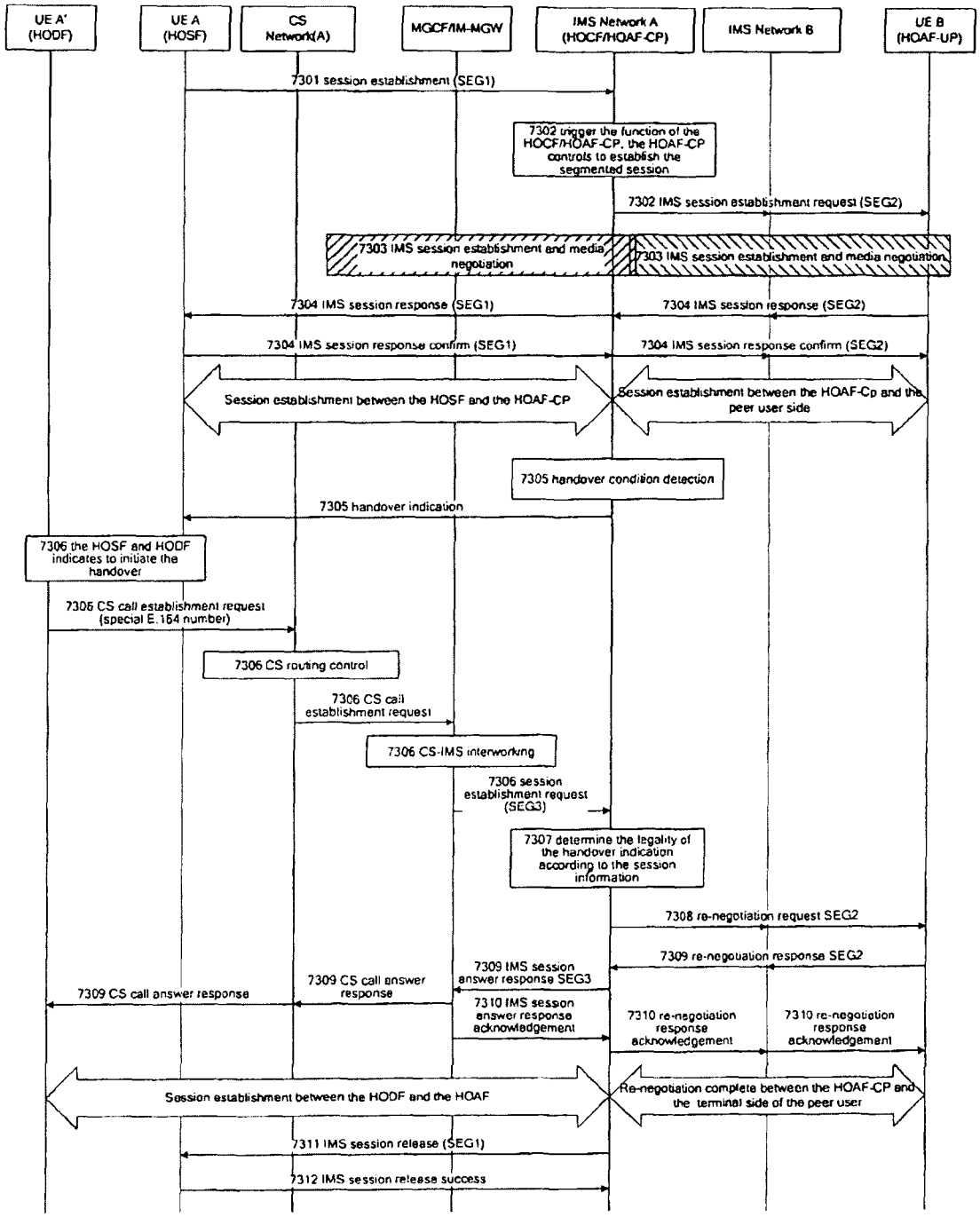
FIG. 7C is a flowchart illustrating an IMS-CS handover in a CP-segmented/terminal-controlled mode according to an embodiment of the present invention.

FIG. 7C is a flowchart illustrating an IMS-CS handover in a CP-segmented/network-controlled mode according to an embodiment of the present invention.

As shown in FIG. 7C and FIG. 9, taking the handover in the CP-segmented/network-controlled mode and the performing of the handover initiated by the HODF as an example, the IMS-CS handover according to the embodiment of the present invention includes:

Steps from Step 7301 to Step 7304 are basically identical to Step 5301, wherein the AS that performs the function of the HOAF-CP also performs the function of the HOCF.

Step 7305: the HOCF detects that the handover condition is satisfied, and sends a handover indication to the HOSF.

The HOCF may judge whether the handover condition is satisfied according to the user pre-configured strategies and related conditions, or after receiving a notification that the HOSF is about to lose the network connection or a notification that the HODF is successfully connected to the network, or according to the user indication from the HOSF/HODF. At the same time, the HOCF may initiate the handover through directly instructing the HOAF to initiate the performing of the handover, or through directly instructing the HODF to initiate the performing of the handover, or through sending a notification to the HOSF and the HOSF instructing the HOAF/HODF to initiate the performing of the handover. In the present embodiment, the HOCF judges according to the user pre-configured strategies and related conditions, and instructs the HODF through the HOSF to initiate the handover.

As described above, the handover may also be detected and initiated by the HOSF or the HODF.

Step 7306: the HOSF instructs the HODF through the internal interaction to initiate a handover, and provides original session information to the HODF, the HODF sends a CS call establishment request in the CS domain where the HODF is located to the HOAF-CP, wherein, the CS call establishment request is routed by the CS domain to the CS/IMS interworking gateway interworking with the home IMS network of the handover user, converted into an IMS session establishment request by the CS/IMS interworking gateway, and routed by the home IMS network of the handover user to the AS that performs the functions of the HOAF-CP.

Since it is the HODF who initiates the performing of the handover, the call establishment request needs to carry a handover indication, original session information and a location identifier of the HOAF-CP. In the present embodiment, since the HOAF-CP is located on the home network side of the handover user, so the HODF can obtain the location identifier of the HOAF-CP from manual settings pre-set by the user or from network settings issued to and saved in the HODF. At the same time, the HODF obtains the original session information from the HOSF. Therefore the HODF can combine the location identifier and the session information according to a pre-configured rule to form a special E.164 number. What is pointing to the AS that performs the function of the HOAF-CP can be a wildcarded IMS domain PSI, i.e., a PSI allowable with an extended part. The PSI with any value in the extended part, i.e., distinct PSI, matches the wildcarded PSI, and this extended part can be used to carry information to be transmitted. Therefore the IMS network can restore a distinct PSI from the special E.164 number through the standard procedure, and routes the session establishment request to the AS corresponding to the PSI (i.e., the AS that performs the function of the HOAF-CP), the AS compares this distinct PSI with the wildcarded PSI and obtains the information corresponding to the extended pail, i.e., the original session information. In addition, the PSI itself may serve as a handover indication.

The call establishment request may also use an ISUP special IE, e.g., a user-to-user information IE, or a call reference number IE, or a sub-address IE, to carry the original session information. At this time, the interworking gateway needs to convert the special IE to an indication in the IMS session establishment request to transmit to the HOAF-CP.

When the HOAF-CP initiates the performing of the handover, the HOAF-CP can uses an E.164 number pointing to the HODF, such as the MSISDN of the HODF, as a destination identifier in the session establishment request, and sends the session establishment request to the HODF through the IMS network, the CS/IMS interworking gateway MGCF/IM-MGW and each entity in the CS domain.

The E.164 number pointing to the HODF may be the MSISDN of the user or the E.164 number with a special prefix. And the E.164 number can be provided by the HOSF or the HODF in the handover indication to the HOAF-CP, or be obtained through deduction by the HOAF-CP from the identifier of the HOSF according to the network numbering plan.

Step 7307: the HOAF-CP verifies whether the session establishment request carries a handover indication, and further verifies whether the session establishment request is legal according to the session information in the request; if it is legal, execute Step 7308, otherwise, end the current procedure.

Step 7308: the HOAF-CP sends a re-negotiation request through the SEG2 between the HOAF-CP and the terminal side of the peer user to initiate the re-negotiation, implements the media re-direction and modifies the media attribute of the SEG2 according to the media negotiation result on the SEG3 between the HOAF-CP and the HODF.

Step 7309: the peer UE returns a re-negotiation response, the HOAF-CP then returns an IMS session answer response to the CS/IMS interworking gateway, the CS/IMS interworking gateway converts the IMS session answer response into a CS call answer response and sent the CS call answer response to the HODF through the CS domain.

Step 7310: the CS/IMS interworking gateway returns an IMS session answer response acknowledgement to the HOAF-CP, which in turn returns a re-negotiation response acknowledgement to the terminal side of the peer user.

The new connection between the HODF and the HOAF-CP is thus established, and the media streams on the terminal side of the peer side is re-directed to the HODF through the re-negotiation initiated under the control of the HOAF-CP; therefore the handover user and the peer user continues their conversation through the new connection.

Step 7311: the HOAF-CP sends a session release message to the HODF through the IMS network.

Step 7312: the HOSF returns a session release confirmation message to the HOAF-CP, and the HOSF and the HOAF release the session connection between them.

In the above embodiments, in order to keep the continuity of the media exchange during the handover better, the HOAF-UP can be equipped with media stream duplication and filtering functions. The HOAF-UP duplicates the media stream to the terminal side of the handover user and sends the duplicated media streams to the HOSF and the HODF simultaneously during the handover, and selects a valid part from the media streams from the HOSF and the HODF to send to the terminal side of the peer user (in case that the HOAF-UP is located on the home network side of the handover user in the CPandUP-segmented mode) or to present to the user (in case that the HOAF-UP is located on the terminal side of the peer user in a mode other than the CPandUP-segmented mode).

To conclude, the method for maintaining session continuity in a network that supports multiple access technologies includes the following key points:

1. The trigger of the HOCF function in the network-controlled mode and/or the trigger of HOAF-CP function in the segmented mode during the session establishment:

(1) during the initial session establishment, according to the general service triggering method in the IMS, the service node S-CSCF assigned to the handover user by his/her home IMS network triggers the session to the AS that performs the functions of the HOCF/HOAF-CP according to the iFC in the subscription data downloaded from the HSS during the user registration. Wherein, in the segmented/network-controlled mode, the HOAF-CP and the HOCF are implemented in the same AS. At this time, in order to reduce the influence to other IMS services, the HOAF-CP should be set as close as possible to the HOSF/HODF, in other words;

when the HOSF is the calling party in the initial session establishment, the priority level of the iFC corresponding to the AS that performs the function of the HOCF/HOAF-CP should be set as high as possible;

when the HOSF is the called party in the initial session establishment, the priority level of the iFC corresponding to the AS that performs the function of the HOCF/HOAF-CP should be set as low as possible;

(2) when the HOSF and the HODF correlated with each other through sharing an IMPU, since the IMS user subscription data is identified only through the user public identity, and the services have been triggered on the connection between the HOAF-CP and the terminal side of the peer user as much as possible in the segmented mode, duplicate triggering of other ASs on the new session between the HOAF and the HODF should be avoided. Besides the iFC priority level settings, other adoptable methods include the following: identifying the new session established during the handover when the IMS service node (S-CSCF) assigned to the handover user performing the iFC evaluation, and so as avoid the service triggering. Wherein, the method for identifying the new session may include, but is not limited to, the following: identifying the new session according to the handover indication in the session establish information, or according to special calling party information and/or called party information (e.g., the called party information pointing to the HOAF when the HODF initiates the operation of the handover, the calling party information that represents the HOAF when the HOAF initiates the performing of the handover) in the session establish information.

2. The handover condition detection:

(1) the handover condition detection can be performed by the HOSF, according to the conditions including the following cases and any combination of them; it is detected that the local end is about to lose the connection to the IMS network due to the problem of the access network or local equipment; a notification indicating that the HODF has successfully connected to the IMS is received; judgment based on user pre-configured conditions or related conditions; judgment based on the user indication; it is detected that the communication quality of the current access point of the HODF is higher than that of the local end; the priority level of the operator of the HODF is higher than that of the local end; the charging rate of the current access method of the HODF is lower than that of the local end;

(2) the handover condition detection can also be performed by the HODF, according to the conditions including the following cases and any combination of them: the local end has successfully connected to the IMS; a notification indicating that the HOSF is about to lose the connection to the IMS network is received; judgment based on user pre-configured strategies and related conditions; judgment based on the user indication: the communication quality of the local end is higher than that of the HOSF; the priority level of the operator of the local end is higher than that of the HOSF; the charging rate of current access method of the local end is lower than that of the HOSF;

(3) the handover condition detection can also be performed by the HOCF, according to the conditions including the following cases and any combination of them: judgment based on user pre-configured strategies and related conditions; a notification indicating that the HOSF is about to lose the connection to the IMS network is received; a notification indicating that the HODF has successfully connected to the IMS is received; judgment based on the user indication from the HOSF/HODF; the communication quality of the access point of the HODF is higher than that of the HOSF; the priority level of the operator of the HODF is higher than that of the HOSF; the charging rate of the current access method of the HODF is lower than that of the HOSF.

3. the handover authorization by the HOCF, can be performed according to the conditions including the following items and any combination of them: the legality of the HODF; the subscription capability of the HODF; the correlated relationship between the HOSF and the HODF; user pre-configured strategies and related conditions; network pre-configured strategies and related conditions; the current status and attribute of the session between the HOSF and the HOAF.

4. the handover initiation, including the handover request and the handover authorization, which can summarized as:

(1) the handover condition detection and the handover initiation are performed by the HOSF, including: the HOSF directly instructs the HOAF to initiate the performing of the handover; or the HOSF directly instructs the HODF to initiate the performing of the handover; or the HOSF sends a request to the HOCF, which sends an indication after the authorization succeeds to indicate the HOAF to initiate the performing of the handover; or the HOSF sends a request to the HOCF, which sends a indication after the authorization succeeds to indicate the HODF to initiate the performing of the handover, or the HOSF sends a request to the HOCF, and instructs the HOAF to initiate the performing of the handover after the HOCF returns a confirmation when the authorization succeeds; or the HOSF sends a request to the HOCF, and instructs the HODF to initiate the performing of the handover after the HOCF returns a confirmation when the authorization succeeds;

(2) the handover condition detection and the handover initiation are performed by the HODF, including: the HODF directly initiates the performing of the handover; or the HODF sends a request to the HOCF, which sends an indication after the authorization succeeds to indicate the HOAF to initiate the performing of the handover; or the HODF sends a request to the HOCF, which returns a confirmation after the authorization succeeds to indicate the HODF to initiate the performing of the handover;

(3) the handover condition detection and the handover initiation are performed by the HOCF, including: the HOCF handover; or HOCF directly instructs the HODF to initiate the performing of the handover; or the HOCF informs the HOSF, which instructs the HOAF to initiate the performing of the handover; or the HOCF informs the HOSF, which instructs the HODF to initiate the performing of the handover;

(4) during the handover initiation, when an entity sends a handover event notification or initiates a handover request to another entity, the interaction between them includs, but is no limited to, the following: when the two entities (e.g., the HOSF and HODF, or the HOCF and the HOAF-CP) are co-located in the same entity, internal customized interactions can be adopted, e.g., interactions through internal messages, or through a shared internal memory; otherwise, the interaction can be performed through SIP INFO and SIP NOTIFY message; or though service location means such as SLP;

(5) during the handover initiation, when an entity instructs another entity to perform the handover, the interaction between them includes, but no limited to, the following:

when the two entities (e.g., the HOSF and HODF, or the HOCF and the HOAF-CP) are co-located in the same entity, internal customized interactions can be adopted, e.g., interactions through internal messages, or through a shared internal memory; otherwise, the interaction can be performed through SIP INFO or SIP NOTIFY message, with the information of the other entity in the message; or through SIP REFER message, with the information of the other entity in a REFER-TO header.

5. the handover execution:

(1) the performing of the handover is initiated by the HODF;

The HODF initiates a session establishment request to the HOAF-CP and instructs the HOAF-CP to replace the original session connection to the HOSF when the new session is established; the session establishment request carries the information of the session to be replaced between the HOSF and the HOAF and a handover indication; the handover indication can also be implicitly represented by other specific handover-related information.

In the session establishment request, the new session can be indicated to be a replacement of the original session between the HOSF and the HOAF and session related information may be carried in the session establishment request through the REPLACES header field or special destination identifier;

the session establishment request is pointing to the HOAF-CP, and the location identifier pointing to the HOAF-CP is obtained from the following: the information carried by the handover indication of the HOCF/HOSF during the handover initiation; the information carried in the handover or handover-related event notification from the HOCF/HOSF during the handover condition detection; wherein, the last two means, i.e., local pre-configured settings or locally stored settings issued by the network, is applicable in the CP-segmented mode and the CPandUP-segmented mode.

The network entities involved between the HOAF and HODF can perform special processes according to the handover indication carried in the session establishment request, the special processes include: avoiding duplicate triggering of service or avoiding the influence from other services, or special charging process, etc.

The HOAF verifies the legality of the session establish request according to the handover indication and initial session information in the session establishment request, establishes the new session, replaces the original session with the new session, and releases the original session; wherein, the replacement of the original session includes, but is not limited to: re-directe the media streams exchanged with the HOSF in the original session to exchanged with the HODF and accomplish the modification of the media streams required by the difference of the media capabilities between the HODF and the HOSF through the session media negotiation.

The HOAF may perform some special processes according to the handover indication in the session establishment request, including avoid ringing.

(2) the performing of the handover is initiated by the HOAF-CP;

The HOAF initiates a session establishment request to the HODF and replaces the original session connection to the HOSF when the new session is established; the session establishment request can further carry a handover indication and HOSF-related information; wherein, the handover indication can also be implicitly carried by other specific handover-related information.

After receiving the session establishment request, the HODF interacts with the HOAF-CP to establish the new session, and during the session establishment, the HODF performs a media negotiation with the HOAF-CP according to the media capability of the local end.

The session establishment request is pointting to the HODF, and the location identifier pointing to the HODF can be obtained from items including: the information carried by the handover indication of the HOCF/HOSF during the handover initiation.

The HODF can verifies the legality of the session establishment request according to the HOSF-related information in the request.

The HODF can perform some special processes according to the handover indication or the HOSF-related information in the session establishment request, including avoid ringing.

The network entities involved between the HOAF and the HODF can perform special processes according to the handover indication and the HOSF-related information carried in the session establishment request, the special processes include avoid duplicate triggering of service, or avoid the influence from other services, or special charging process, etc.

It should be noted that when both the HOSF and the HODF register in the IMS (in other words, there is no such cases that access the IMS through a CS call), based on the IMS subscribed association between the HOSF and the HODF, a same service node is guaranteed to be assigned to the two entities according to the standard service node assignment process during the IMS network user registration.

6. Special processes correlated with the CS domain:

The CS call, which is converted into an IMS session by the CS/IMS network, is regarded as a special IMS access method, and when the HODF/HOSF adopts such access method, the IMS-CS handover will be accomplished through the above IMS-IMS handover method, including:

(1) the HODF and the HOSF correspond respectively to the subscription identities of the same user in different network subsystems, in other words, they correspond respectively to the MSISDN and the IMPU of the same user;

(2) when the HOSF corresponds to the above CS-IMS call, the CS domain routes the call to the CS/IMS interworking gateway MGCF/IM-MGW, and establishes a CS-IMS interworking call after the conversion performed by the MGCF/IM-MGW; the CS domain can decide the route according to the conditions including:CS routing strategies, NP mechanism and the called party number analysis;

(3) when the HODF corresponds to the above CS-IMS call, during the session establishment between the HODF and the HOAF-CP, the CS-IMS interworking call converted by the MGCE/IM-MGW is established through the following process:

when the performing of the handover is initiated by the HODF, the HODF takes the E.164 number which points to the HOAF-CP as the called party number; prefix may be added to distinguish the E.164 number from other E.164 numbers, or the E.164 number can be a special E.164 number.

In the end-to-end mode, the number is provided by the HOSF or the HOCF; the number can be the MSISDN of the peer user, or the E.164 number in the IMPU of the peer user in the Tel-URI format, or the E.164 number in the IMPU of the peer user in the Tel-URI format with a special prefix;

in the segmented mode, the number is provided by the HOSF or the HOCF, or set as a uniform service access number in the UE, or issued by the network and stored in the UE at any prior time (e.g., when the user registers in the IMS or updates the location in the CS domain); and the special E.164 number or the prefix of the E.164 number may correspond to a PSI, therefore the session can be routed to the AS that performs the function of the HOAF-CP in a standard termination routing method for the PSI.

Moreover, the CS call establishment request from the HODF further needs to carry the original session information, the HODF may use the called party number to carry the original session information, e.g., in the segmented mode, the identifier pointing to the AS that performs the functions of the HOAF-CP can be a wildcarded PSI, the HODF combines the identifier pointing to the AS and the original session information to form a special E.164 number according to pre-configured rules. Thus the IMS network can recover a distinct PSI from the E.164 number, and then route the session establishment request to the AS, which compares the distinct PSI with the wildcarded PSI and to obtain the original session information.

the original session information can also be carried by a special IE in the ISUP, e.g., a use-to-user information IE, or a call reference number IE, or a sub-address IE, at this time, the CS/IMS interworking gateway MGCF/IM-MGW needs to recover the original session information from the received CS call establishment request, and sends the original session information to the HOAF-CP through the converted IMS session establishment request.

The CS domain is responsible for routing a CS call to the CS/IMS interworking gateway MGCF/IM-MGW according to the E.164 number, and further establishes a CS-IMS interworking call converted by the MGCF/IM-MGW; the CS domain can decide the route according to the conditions including:CS routing strategies, NP mechanism and the called party number analysis.

The CS domain can perform, according to the E.164 number or the prefix of the E.164 number, some special processes including: avoid influences of the supplementary services on the CS originating side, avoid Customized Application for Mobile network Enhanced Logic (CAMEL) triggering, special charging process, including routing control for routing the call to the CS/IMS interworking gateway.

The IMS network routes the session to the HOAF-CP according to the special E.164 number or the prefix of the E.164 number cooperating with the MGCF, ENUM server and the data settings of the IMS network, wherein, the HOAF-CP includes the peer UE that performs the functions of the HOAF in the end-to-end mode and the AS that performs the function of the HOCF/HOAF-CP in the segmented mode.

When the performing of the handover is initiated by the HOAF-CP, the HOAF-CP may take the MSISDN of the handover user or the MSISDN number with a special prefix as the called party number, wherein, the MSISDN number is provided by the HOSFIHOCF in the handover indication, or deduced from the identity of the HOSF according to the network numbering plan.

The IMS network mutes the session to the selected MGCF according to the number in combination with the data settings of the ENUM and IMS network, the CS network accomplishes a standard number analysis and the called party addressing to route the call request to the HODF, and further establishes an IMS-CS interworking call converted by the MGCF/IM-MGW.

If the called party number is the MSISDN with a special prefix, the gateway can remove the prefix and uses the MSISDN to complete the interaction with the CS network;

if the called party number is the MSISDN with a special prefix, the gateway can further recognize the call as an IMS-CS handover call according to the prefix after removing the prefix, so that a special indication can be added into the CS call control signaling to enable the CS network or the peer user to perform a special process on the IMS-CS handover call;

The CS network can perform some special processes according to the above special indication or prefix, including:

special charging process, e.g., reduce a part of CS call fee according to the indication, which needs corresponding function extension of the charging system;

service conflict process, e.g., avoid the invocation of a part of CS domain supplementary services according to the indication, such as call forwarding, call barring and intelligent triggering, which needs corresponding function extension of the CS network.

The HODF can perform some special processes according to the special indication, including: identify the call as an IMS-CS handover call to prompt the user through a pop-up menu or special ringing, or avoid ringing.

7. the processing of the session establishment request towards the IMPU of the HOSF from a third user;

(1) when the HOSF and the HODF are correlated through a shared IMPU which is used for the terminating addressing:

the IMS network performs a forking process on the corresponding addresses of the HOSF and the HODF according to the IMPU;

the HOSF receives the forking session establishment request, and refuses the request;

the HODF receives the forking session establishment request, regards the request as a legal new session establishment request, and accepts or refuses the request according to the new session processing principles of the user/local end.

(2) when the HOSF and the HODF have different IMPUs which are used for the terminating addressing in the network-controlled mode (including the end-to-end mode and segmented mode) or the segmented mode (including the CP-segmented mode and the CPandUP segmented mode), since all the terminating procedures towards the user will be triggered to the AS that performs the function of the HOCF/HOAF-CP, the AS can control the re-direction of the session that originally destined to the IMPU of the HOSF to the IMPU of the HODF according to the handover status and the user subscription. The above control can be implemented through returning a 3XX (SIP re-direction indication) or directly modifying a forwarding SIP message Request-URI (Universal Resource Identity, also referred to as a destination identifier or a destination address herein).

The fore-going are the implementations of the present invention in the IMS network, and when implemented in the NGN, the principles are basically identical to those in the IMS network, and the differences in the NGN are:

(1) the correlated relationship between the HOSF and the HODF:

in the NGN, a user does not have a clear definition of the IMPI and the IMPU, therefore in the NGN, the correlated relationship between the HOSF and the HODF is generally represented by a subscription association between them on the service layer, or represented by an association between other user identites similar as the IMPI and the IMPU.

(2) when the HOCF and the HOAF-CP are located on the network side of the handover user, the mapping of their functions in the network and the trigger of their functions during the initial session establishment:

in the NGN, there is no clear definition similar as the open service architecture and service triggering control mechanism in the IMS network. Therefore, in the NGN, the entities that performs the functions of the HOCF/HOAF-CP on the network side in the network-controlled and/or segmented mode can be a soft switching entity in the NGN, or an AS implemented using the service architecture in the IMS for reference. If the AS is adopted, the triggering of the AS can be performed through a customized service triggering method defined in the NGN, or through a mechanism similar to the IMS network triggering mechanism.

Despite of the above differences, the present invention is totally applicable to the NGN that supports multiple access technologies and adopts the SIP as the session control protocol.

To sum up, the foregoing are only the preferred embodiments of the present invention and are not for use for confining the protection scope of the present invention. Any modification, equivalent substitution, improvement within the spirit and principle of the present invention should be covered in the protection scope of the present invention.

What is claimed is:

1. A method for maintaining session continuity, comprising:

triggering a Handover Anchor Function-Control Plane (HOAF-CP) on a home network side of a first user, and establishing a first connection, wherein the first connection comprises a control plane first connection between a Handover Source Function (HOSF) of the first user and the HOAF-CP and a user plane first connection between the HOSF and a Handover Anchor Function-User Plane (HOAF-UP) of a second user; establishing a control plane connection between the HOAF-CP and a terminal side of the second user, and establishing a session between the first user and the second user through the user plane first connection, the control plane first connection and the control plane connection between the HOAF-CP and a terminal side of the second user;

determining that a handover condition is satisfied, and establishing a second connection, wherein the second connection comprises a control plane second connection between a Handover Destination Function (HODF) of the first user and the HOAF-CP and a user plane second connection between the HODF and the HOAF-UP; and continuing the session between the first user and the second user through the user plane second connection between the HODF and the HOAF-UP, the control plane second connection between the HODF and the HOAF-CP, and the control plane connection, which is already established between the HOAF-CP and the terminal side of the second user before the handover condition is satisfied.

2. The method according to claim 1, further comprising:

configuring a Handover Control Function (HOCF) on the home network side of the first user, wherein the first connection and the second connection are established under control of the HOCF.

3. The method according to claim 2, wherein if it is the HOSF that detects the handover condition is satisfied, the method comprising at least one of:

the HOSF sending a handover request to the HOCF, the HOCF performing an authorization and notifying the HOSF after the authorization succeeds; after receiving an authorization pass message from the HOCF, the HOSF sending a handover indication message to the HODF or the HOAF-CP, and the HODF or the HOAF-CP which receives the handover indication message initiating to establish the second connection; or, the HOSF sending a handover request to the HOCF, the HOCF performing an authorization and sending a handover indication message to the HODF or the HOAF-CP if the authorization succeeds, and the HODF or the HOAF-CP which receives the handover indication message initiating to establish the second connection.

4. The method according to claim 2, wherein if it is the HODF that detects that the handover condition is satisfied, the method comprising at least one of:

the HODF sending a handover request to the HOCF, the HOCF performing an authorization and if the authorization succeeds, the HOCF sending a handover indication message to the HODF or the HOAF-CP, and the HODF or the HOAF-CP, which receives the handover indication message, initiating to establish the second connection; or the HODF sending a handover request to the HOCF, the HOCF sending a handover indication message to the HOSF and the HOSF sending the handover indication message to the HODF or the HOAF-CP; and the HODF or the HOAF-CP, which receives the handover indication message, initiating to establish the second connection.

5. The method according to claim 2, wherein if it is the HOCF that detects the handover condition is satisfied, the method comprising at least one of:

the HOCF sending a handover indication message to the HODF or the HOAF-CP, and the HODF or the HOAF-CP, which receives the handover indication message, initiating to establish the second connection; or the HOCF sending a handover indication message to the HOSF and the HOSF sending the handover indication message to the HODF or the HOAF-CP, and the HODF or the HOAF-CP, which receives the handover indication message, initiating to establish the second connection.

6. The method according to claim 2, wherein the HOSF and the HODF of the first user have different IP Multimedia public identities (IMPUs), and the method comprises:

a home network of the first user receiving a session establishment request to the HOSF of the first user from a third user;

the HOCF or the HOAF-CP on the home network side of the first user modifying a destination identifier pointing to the HOSF in the session establishment request to the one pointing to the HODF, and then the home network of the first user sending the session establishment request to the HODF;

the HODF determining whether to accept the session establishment request from the third user.

7. The method according to claim 2, wherein the HOCF is implemented in a same Application Server (AS) with the HOAF-CP.

8. The method according to claim 2, further comprising:

the HOCF updating the handover condition correlated with a terminal and pre-stored in the HOCF through signaling interaction between the HOCF and the terminal.

9. The method according to claim 2, wherein the HODF initiates to establish the second connection and the method further comprises: the HODF acquiring an identifier pointing to the HOAF-CP and initiating a connection establishment request according to the identifier pointing to the HOAF-CP; wherein the identifier pointing to the HOAF-CP is obtained by the HOSF during the establishment of the first connection and sent to the HODF by the HOSF, or the identifier pointing to the HOAF-CP is obtained by the HOCF during the control of the establishment of the first connection and sent to the HODF by the HOCF.

10. The method according to claim 2, wherein the HODF initiates to establish the second connection and the method further comprises: the HODF obtaining session information of the first connection and initiating a connection establishment request to the HOAF-CP carrying the session information of the first connection;

wherein the session information of the first connection is obtained by the HOCF during the control of the establishment of the first connection and sent to the HODF by the HOCF.

11. The method according to claim 2, wherein the HOAF-CP initiates to establish the second connection and the method further comprises: the HOAF-CP obtaining an HODF identifier pointing to the HODF and initiating a connection establishment request to the HODF according to the HODF identifier; wherein the HODF identifier is sent to the HOAF-CP by the HOSF or the HODF identifier is obtained by the HODF during the control of the establishment of the first connection and sent to the HOAF-CP by the HOCF.

12. The method according to claim 1, wherein if it is the HOSF that detects the handover condition is satisfied, the HOSF sending a handover indication message to the HODF, and the HODF initiating to establish the second connection; or the HOSF sending a handover indication message to the HOAF-CP, and the HOAF-CP initiating to establish the second connection; or if it is the HODF that detects the handover condition is satisfied, the HODF initiating to establish the second connection.

13. The method according to claim 12, wherein if it is the HOSF that detects the handover condition is satisfied, the HOSF detecting that a communication quality by using the HODF is higher than a communication quality by using the HOSF.

14. The method according to claim 1, wherein the step of establishing the second connection comprises:

the HODF obtaining session information of the first connection and initiating a connection establishment request to the HOAF-CP, wherein the connection establishment request carries the session information of the first connection and a handover indication;

after receiving the connection establishment request, the HOAF-CP interacting with the HODF to establish the control plane second connection between the HODF and the HOAF-CP, and the user plane second connection between the HODF and the HOAF-UP.

15. The method according to claim 14, further comprising:

before the HOAF-CP interacts with the HODF, the HOAF-CP checking whether the connection establishment request carries the handover indication; if the connection establishment request carries the handover indication, the HOAF-CP checking whether the connection establishment request is legal according to the session information carried in the connection establishment request; if the connection establishment request is legal, the HOAF-CP executing the step of interacting with the HODF to establish the control plane second connection and the user plane second connection, if the connection establishment request is illegal, the HOAF-CP sending a message to the HODF to reject the connection establishment request, keeping the session with the HOSF.

16. The method according to claim 14, wherein the handover indication is represented by a REPLACES header field, and the session information is carried by the REPLACES header field; or, the handover indication is represented by an address pre-configured as a destination address of the connection establishment request.

17. The method according to claim 14, wherein the connection establishment request is transmitted through an IP Multimedia Subsystem (IMS) network or a Next Generation Network (NGN) from the HODF to the HOAF-CP;

the method further comprises: network entities in the IMS network or the NGN providing the handover indication to a charging system to indicate whether a connection is the second connection to perform charging reduction.

18. The method according to claim 14, wherein the session information of the first connection is obtained by the HOSF during the establishment of the first connection and sent to the HODF by the HOSF; or, a Handover Control Function (HOCF) is configured on the home network side of the first user, the session information of the first connection is obtained by the HOCF during the establishment of the first connection and sent to the HODF by the HOCF.

19. The method according to claim 1, wherein the HODF initiates to establish the second connection, the HODF is located in a Circuit Switched (CS) domain, and the HOAF-CP is located in an IP Multimedia Subsystem (IMS) domain, the method comprising:

the HODF initiating in the CS domain a CS call establishment request carrying a called party number; and the CS domain sending the CS call establishment request to an interworking gateway between the CS domain and the IMS domain; wherein the called party number is at least one of: a Mobile Station Integrated Service Digital Network (MSISDN) number of the second user, an E.164 number in a Public User Identity of the second user in a Tel-Uniform Resource Identifier (Tel-URI) format, an MSISDN number with a prefix, an E.164 number with a prefix, and an E.164 number composed according to an identifier pointing to the HOAF-CP obtained by the HODF;

after receiving the CS call establishment request, the interworking gateway between the CS domain and the IMS domain converting the CS call establishment request into an IMS session establishment request, and sending the IMS session establishment request to the HOAF-CP.

20. The method according to claim 1, wherein the HOAF-CP initiates to establish the second connection, and the method comprises:

the HOAF-CP obtaining an HODF identifier pointing to the HODF, and initiating a connection establishment request to the HODF according to the HODF identifier;

after receiving the connection establishment request, the HODF interacting with the HOAF-CP to establish the control plane second connection with the HOAF-CP, and the user plane second connection with the HOAF-CP.

21. The method according to claim 20, wherein the connection establishment request is sent by the HOAF-CP to the HODF through an IP Multimedia Subsystem (IMS) network or a Next Generation Network (NGN), and the connection establishment request carries information of the HOSF or a handover indication, the method further comprises:

network entities in the IMS network or the NGN providing the handover indication or the information of the HOSF to a charging system to indicate whether a connection is the second connection to perform charging reduction.

22. The method according to claim 20, wherein the HODF identifier is sent to the HOAF-CP by the HOSF, or, a Handover Control Function (HOCF) is configured on the home network side of the first user, the HODF identifier is obtained by the HOCF during the establishment of the first connection and sent to the HOAF-CP by the HOCF.

23. The method according to claim 20, wherein the connection establishment request carries information of the HOSF;

before the HODF interacts with the HOAF-CP, the method further comprises:

the HODF checking whether the connection establishment request carries the information of the HOSF; if the connection establishment request carries the information of the HOSF, checking whether the connection establishment request is legal according to a pre-configured association between the HOSF and the HODF.

24. The method according to claim 1, wherein the HODF or the HOAF-CP initiates to establish the second connection the method further comprising:

the HOAF-CP sending a session establishment request to an interworking gateway, wherein the session establishment request carries a called party number, and the called party number is a Mobile Station Integrated Service Digital Network (MSISDN) number of the first user pointing to the HODF or a Mobile Station Integrated Service Digital Network (MSISDN) number with a prefix;

after receiving the session establishment request, the interworking gateway converting the session establishment request into a CS call establishment request, and sending the CS call establishment request to the HODF in the CS domain according to the called party number; and after receiving the CS call establishment request, the HODF interacting with the HOAF-CP to establish the control plane second connection, and the user plane second connection is established between the HODF and HOAF-UP.

25. The method according to claim 24, further comprising:

after the CS domain receiving the CS call establishment request, the CS domain adding an identifier in a Call Detailed Record (CDR) according to the prefix or an indication carried in the CS call establishment request.

26. The method according to claim 1, wherein the HOSF and the HODF are respectively corresponding to different IP Multimedia public identities (IMPUs) of a same IP Multimedia private identity (IMPI) of the first user; or respectively corresponding to different IMPIs of a same IMPU of the first user; or respectively corresponding to different IMPUs and IMPIs belonging to a same subscription of the first user in an IMS network; or associated with each other through the first user subscription relationship between different subsystems on an operator layer.

27. The method according to claim 1, wherein the HODF initiates to establish the second connection and the method comprises:

the HODF obtaining an identifier pointing to the HOAF-CP and initiating a connection establishment request according to the identifier pointing to the HOAF-CP, wherein the identifier pointing to the HOAF-CP is obtained by the HOSF during the establishment of the first connection and sent to the HODF by the HOSF, or the identifier pointing to the HOAF-CP is obtained by the HODF according to an advance configuration of the HODF.

28. The method according to claim 1, wherein the HOSF and the HODF of the first user have different IP Multimedia public identities (IMPUs), and the method comprises:

a home network of the first user receiving a session establishment request to the HOSF of the first user from a third user;

the HOAF-CP on the home network side of the first user modifying a destination identifier pointing to the HOSF in the session establishment request to the one pointing to the HODF, and then the home network of the first user sending the session establishment request to the HODF; and the HODF determining whether to accept the session establishment request from the third user.

29. A system for maintaining session continuity, comprising: a Handover Source Function (HOSF), a Handover Destination Function (HODF), a Handover Anchor Function-Control Plane (HOAF-CP), a Handover Anchor Function-User Plane (HOAF-UP) and a Handover Detection Function; wherein the HOSF and the HODF are located in a same terminal of a first user or different terminals of the first user, the HOAF-CP is located on a home network side of the first user, the HOAF-UP is located on a terminal side of a second user, and the HOAF-CP is a control resource;

the HOSF is configured to establish a first connection comprising a control plane first connection between the HOSF and the HOAF-CP and a user plane first connection between the HOSF and the HOAF-UP when the first user initiates or accepts a session;

the HODF is configured to establish a second connection comprising a control plane second connection between the HODF and the HOAF-CP and a user plane second connection between the HODF and the HOAF-UP when a handover condition is satisfied;

the HOAF-CP is configured to establish the control plane first connection between the HOSF and the HOAF-CP when the first user initiates or accepts the session; establish a control plane connection between the terminal side of the second user and the HOAF-CP; establish the control plane second connection between the HODF and the HOAF-CP when the handover condition is satisfied; the HOAF-CP is further configured to perform control over the control plane first connection, the control plane second connection and the control plane connection with the terminal side of the second user, and replace the control plane first connection between the HOSF and the HOAF-CP with the control plane second connection between the HODF and the HOAF-CP;

the HOAF-UP is configured to establish the user plane first connection between the HOSF and the HOAF-UP during the establishment of the control [plan] *plane* first connection and the control plane connection between the HOAF-CP and the terminal side of the second user; establish the user plane second connection between the HODF and the HOAF-UP during the establishment of the control [plan] *plane* second connection; and replace the user plane first connection with the user plane second connection; and the Handover Detection Function is configured to detect whether the handover condition is satisfied.

30. The system according to claim 29, wherein the HOAF-CP is configured to perform control over the establishment of the control plane first connection and the control plane connection between the HOAF-CP and the terminal side of the second user, control to establish the user plane first connection between the HOSF and the HOAF-UP on the terminal side of the second user; and during the establishment of the control plane second connection, initiate a re-negotiation on the control plane connection between the HOAF-CP and the terminal side of the second user and accomplishing the re-negotiation by interacting with the terminal side of the second user, control to establish the user plane second connection between the HODF and the HOAF-UP and indicating the HOAF-UP to replace the user plane first connection with the user plane second connection, and when media capabilities of the HODF and the HOSF are different from each other, add or delete media stream or modify attribute of exchanged media stream according to the media capability of the HODF.

31. The system according to claim 29, further comprising: an HOCF on the home network side of the first user, configured to control the establishments of the first connection and the second connection by sending signal streams between the HOSF and the HOAF-CP, or between the HODF and the HOAF-CP.

32. The system according to claim 31, wherein the Handover Detection Function is a logic unit in the HOCF, and the HOCF is further configured to send to the HODF or the HOAF-CP, or send a handover indication to the HODF through the HOSF when detecting that the handover condition is satisfied.

33. The system according to claim 31, wherein the Handover Detection Function is further configured to send a handover request message to the HOCF when detecting that the handover condition is satisfied, and send a handover indication to the HODF or the HOAF-CP after receiving an authorization pass notification from the HOCF; and the HOCF is further configured to perform an authorization when receiving the handover request message, and send the authorization pass notification to the Handover Detection Function after authorization succeeds.

34. The system according to claim 32, wherein the HODF is further configured to initiate a second connection establishment request to the HOAF-CP after receiving the handover indication.

35. The system according to claim 32, wherein the HOAF-CP is further configured to initiate a second connection establishment request to the HODF after receiving the handover indication.

36. The system according to claim 29, wherein the Handover Detection Function is further configured to send a handover indication to the HODF or the HOAF-CP when detecting that the handover condition is satisfied.

37. The system according to claim 29, wherein the Handover Detection Function is a logic unit in the HODF, the HODF is further configured to initiate a second connection establishment request to the HOAF-CP when-the handover condition is satisfied.

38. The system according to claim 29, wherein when receiving a connection establishment request from a third user to the HOSF of the first user, the HOCF or the HOAF-CP located on the home network side of the first user is configured to send a new session from the third user to the HODF of the first user.

39. A system for maintaining session continuity, comprising: a handover Source Function (HOSF), a Handover Destination Function (HODF), a Handover Anchor Function-Control Plane (HOAF-CP), a Handover Anchor Function-User Plane (HOAF-UP) and a Handover Detection Function; wherein the HOSF and the HODF are located in a same terminal or different terminals of a first user, the HOAF-CP and HOAF-UP are located on a home network side of the first user, the HOAF-CP is control resource, the HOAF-UP is media resource;

the HOSF is configured to establish a first connection comprising a control plane first connection between the HOSF and the HOAF-CP and a user plane first connection between the HOSF and the HOAF-UP when the first user initiates or accepts a session;

the HODF is configured to establish a second connection comprising a control plane second connection between the HODF and the HOAF-CP and a user plane second connection between the HODF and the HOAF-UP when a handover condition is satisfied;

the HOAF-CP is configured to establish the control plane first connection between the HOSF and the HOAF-CP when the first user initiates or accepts the session; establish a control plane connection between a terminal side of a second user and the HOAF-CP; establish the control plane second connection between the HODF and the HOAF-CP when the handover condition is satisfied; the HOAF-CP is further configured to perform control over the control plane first connection, the control plane second connection and the control plane connection between the terminal side of the second user and the HOAF-CP, replace the control plane first connection between the HOSF and the HOAF-CP with the control plane second connection between the HODF and the HOAF-CP;

the HOAF-UP is configured to establish the user plane first connection between the HOSF and the HOAF-UP; establish a user plane connection between the terminal side of the second user and the HOAF-UP, and connect the user plane connection between the HOAF-UP and the terminal side of the second user with the user plane first connection; establish the user plane second connection between the HODF and the HOAF-UP; and connect the user plane connection between the HOAF-UP and the terminal side of the second user with the user plane second connection instead of the user plane first connection; and the Handover Detection Function is configured to detect whether the handover condition is satisfied.

40. The system according to claim 39, wherein the HOAF-CP is configured to:

perform control over the establishments of the control plane first connection and the control plane connection between the terminal side of the second user and the HOAF-CP, control to establish the user plane first connection between the HOAF-UP and the HOSF and the user plane connection between the terminal side of the second user and the HOAF-UP, and control the HOAF-UP to connect the user plane first connection and the user plane second connection; and during the establishment of the control plane second connection between the HOAF-CP and the HODF, control to establish the user plane second connection between the HOAF-UP and the HODF, control the HOAF-UP to connect the user plane connection between the HOAF-UP and the terminal side of the second user, with the user plane second connection instead of the user plane first connection, and when media capabilities of the HODF and the HOSF are different from each other, during the establishment of the control plane second connection, initiate a re-negotiation on the control plane connection with the terminal side of the second user and accomplishing the re-negotiation by interacting with the terminal side of the second user, add or delete media stream or modifying attribute of exchanged media stream between the HOAF-UP and the terminal side of the second user according to the media capability of the HODF.

41. A method for maintaining session continuity, comprising:

triggering a Handover Anchor Function-Control Plane (HOAF-CP) on a home network side of a first user, and establishing a first connection comprising a control plane first connection between a Handover Source Function (HOSF) of the first user and the HOAF-CP and a user plane first connection between the HOSF and a Handover Anchor Function-User Plane (HOAF-UP) on the home network side of the first user, establishing a control plane connection between the HOAF-CP and a terminal side of a second user and a user plane connection between the HOAF-UP and the terminal side of the second user, and establishing a session between the first user and the second user through the control plane first connection, the control plane connection between the HOAF-CP and the terminal side of the second user, the user plane first connection, and the user plane connection between the HOAF-UP and the terminal side of the second user;

determining that a handover condition is satisfied, establishing a second connection, wherein the second connection comprises a control plane second connection between a Handover Destination Function (HODF) of the first user and the HOAF-CP and a user plane second connection between the HODF and the HOAF-UP;

continuing the session between the first user and the second user through the control plane second connection between the HODF of the first user and the HOAF-CP and the control plane connection between the HOAF-CP and the terminal side of the second user, and the user plane second connection between the HODF of the first user and the HOAF-UP and the user plane connection between the HOAF-UP and the terminal side of the second user.

*42. A method for maintaining session continuity, comprising:*

*establishing, by a Handover Anchor Function-Control Plane (HOAF-CP) of an IP multimedia sub-system (IMS) on a home network side of a first user, a control plane first connection and a control plane third connection, wherein the control plane first connection is between a user terminal of the first user and the HOAF-CP, wherein the control plane third connection is between the HOAF-CP and a terminal side of a second user;*

*establishing a user plane first connection between the user terminal and a Handover Anchor Function-User Plane (HOAF-UP) of the IMS, wherein the control plane first connection, the control plane third connection and the user plane first connection achieves a session between the first user and the second user;*

*when a handover condition is satisfied, establishing, by the HOAF-CP, a control plane second connection between the user terminal of the first user and the HOAF-CP, and establishing a user plane second connection between the user terminal and the HOAF-UP; and*

*replacing, by the HOAF-CP, the control plane first connection with the control plane second connection, and replacing the user plane first connection with the user plane second connection, and wherein the control plane second connection, the control plane third connection and the user plane second connection achieves the session after the handover.*

*43. The method according to claim 42, further comprising:*

*receiving, by the HOAF-CP, a connection establishment request from the user terminal after the handover condition is satisfied.*

*44. The method according to claim 42, further comprising:*

*receiving, by the HOAF-CP, a handover indication from the user terminal after the handover condition is satisfied, sending, by the HOAF-CP, a connection establishment request to the user terminal.*

*45. The method according to claim 42, further comprising:*

*receiving, by the HOAF-CP, a handover indication from the user terminal after the handover condition is satisfied; and sending a connection establishment request to the user terminal.*

*46. The method according to claim 42, wherein the step of establishing the control plane second connection comprises:*

*receiving, by the HOAF-CP, a connection establishment request from the user terminal, wherein the connection establishment request carries session information of the the control plane first connection and a handover indication;*

*after receiving the connection establishment request, the HOAF-CP interacting with the user terminal to establish the control plane second connection between the user terminal and the HOAF-CP.*

*47. The method according to claim 42, wherein the HOAF-UP is located on a terminal side of the second user.*

*48. A system for maintaining session continuity, comprising a Handover Anchor Function-Control Plane (HOAF-CP) on a home network side of a first user, wherein the HOAF-CP is configured to communicate with a user terminal of the first user, wherein the HOAF-CP is further configured to:*

*establish a control plane first connection and a control plane third connection, wherein the control plane first connection is between the user terminal and the HOAF-CP, and wherein the control plane third connection is between the HOAF-CP and a terminal side of a second user;*

*control to establish a user plane first connection between the user terminal and a Handover Anchor Function-User Plane (HOAF-UP), wherein the control plane first connection, the control plane third connection and the user plane first connection achieves a session between the first user and the second user;*

*when a handover condition is satisfied, establish a control plane second connection between the user terminal and the HOAF-CP, and control to establish a user plane second connection between the user terminal and the HOAF-UP; and*

*replace the control plane first connection with the control plane second connection, and indicate the HOAF-UP to replace the user plane first connection with the user plane second connection, and wherein the control plane second connection, the control plane third connection and the user plane second connection achieves the session after the handover.*

*49. A method for maintaining session continuity, comprising:*

*establishing a control plane first connection and a control plane third connection, wherein the control plane first connection is between a user terminal of the first user and a Handover Anchor Function-Control Plane (HOAF-CP) of an IP multimedia sub-system (IMS) on a home network side of the first user, wherein the control plane third connection is between the HOAF-CP and a terminal side of a second user;*

*establishing a user plane first connection between the user terminal and a Handover Anchor Function-User Plane (HOAF-UP) of the IMS and a user plane third connection between the HOAF-UP and the terminal side of the second user, wherein the control plane first connection, the control plane third connection, the user plane first connection and the user plane third connection achieves a session between the first user and the second user;*

*when a handover condition is satisfied, establishing, by the HOAF-CP, a control plane second connection between the user terminal of the first user and the HOAF-CP, and establishing a user plane second connection between the user terminal and the HOAF-UP; and*

*replacing, by the HOAF-CP, the control plane first connection with the control plane second connection, and replacing the user plane first connection with the user plane second connection, and wherein the control plane second connection, the control plane third connection, the user plane second connection and the user plane third connection achieves the session after the handover.*

*50. A system for maintaining session continuity, comprising a Handover Anchor Function-Control Plane (HOAF-CP) of an IP multimedia sub-system (IMS) on a home network side of a first user, wherein the HOAF-CP is configured to communicate with a user terminal of the first user and a user terminal of the first user, wherein the HOAF-CP is further configured to:*

*establish a control plane first connection and a control plane third connection, wherein the control plane first connection is between the user terminal and the HOAF-CP, and wherein the control plane third connection is between the HOAF-CP and a terminal side of a second user;*

*control to establish a user plane first connection between the user terminal and a Handover Anchor Function-User Plane (HOAF-UP) of the IMS and a user plane third connection between the HOAF-UP and the terminal side of the second user, wherein the control plane first connection, the control plane third connection, the user plane first connection and the user plane third connection achieves a session between the first user and the second user;*

*when a handover condition is satisfied, establish a control plane second connection between the user terminal and the HOAF-CP, and control to establish a user plane second connection between the user terminal and the HOAF-UP; and*

*replace the control plane first connection with the control plane second connection, and indicate the HOAF-UP to replace the user plane first connection with the user plane second connection, and wherein the control plane second connection, the control plane third connection, the user plane second connection and the user plane third connection achieves the session after the handover.*

*51. A system for maintaining session continuity, comprising a Handover Anchor Function-Control Plane (HOAF-CP) of an IP multimedia sub-system (IMS) on a home network side of a first user, a Handover Anchor Function-User Plane (HOAF-UP) of the IMS,*

*wherein the HOAF-CP is configured to:*

*establish a control plane first connection and a control plane third connection, wherein the control plane first connection is between a user terminal of the first user and the HOAF-CP, and wherein the control plane third connection is between the HOAF-CP and a terminal side of a second user;*

*control to establish a user plane first connection between the user terminal and a Handover Anchor Function-User Plane (HOAF-UP) and a user plane third connection between the HOAF-UP and the terminal side of the second user, wherein the control plane first connection, the control plane third connection, the user plane first connection and the user plane third connection achieves a session between the first user and the second user;*

*when a handover condition is satisfied, establish a control plane second connection between the user terminal of the first user and the HOAF-CP, and control to establish a user plane second connection between the user terminal and the HOAF-UP; and*

*replace the control plane first connection with the control plane second connection, and indicate the HOAF-UP to replace the user plane first connection with the user plane second connection, and wherein the control plane second connection, the control plane third connection, the user plane second connection and the user plane third connection achieves the session after the handover;*

*wherein the HOAF-UP is configured to establish the user plane first connection, the user plane second connection and the user plane third connection, and replace the user plane first connection with the user plane second connection.*

*52. A method for maintaining session continuity, comprising:*

*establishing a first connection, wherein the first connection comprises a control plane first connection between a user terminal of the first user and a Handover Anchor Function-Control Plane (HOAF-CP) on a home network side of the first user and a user plane first connection between the user terminal and a Handover Anchor Function-User Plane (HOAF-UP) of a second user;*

*establishing a control plane connection between the HOAF-CP and a terminal side of the second user, wherein the control plane first connection, the control plane third connection, and the user plane first connection achieve a session between the first user and the second user;*

*determining that a handover condition is satisfied, establishing a second connection, wherein the second connection comprises a control plane second connection between the user terminal of the first user and the*

*HOAF-CP and a user plane second connection between the user terminal and the HOAF-UP; and*

*wherein the user plane second connection between the user terminal and the HOAF-UP, the control plane second connection between the user terminal and the HOAF-CP, and the control plane connection, which is already established between the HOAF-CP and the terminal side of the second user before the handover condition is satisfied, achieves the session after the handover.*

*53. A method for maintaining session continuity, comprising:*

*establishing a first connection comprising a control plane first connection between a user terminal of the first user and a Handover Anchor Function-Control Plane (HOAF-CP) of an IP multimedia sub-system (IMS) on a home network side of the first user and a user plane first connection between the user terminal and a Handover Anchor Function-User Plane (HOAF-UP) of the IMS on the home network side of the first user;*

*establishing a control plane connection between the HOAF-CP and a terminal side of a second user and a user plane connection between the HOAF-UP and the terminal side of the second user, wherein the control plane first connection, the control plane connection, the user plane connection and the user plane first connection achieve a session between the first user and the second user;*

*determining that a handover condition is satisfied, establishing a second connection, wherein the second connection comprises a control plane second connection between the user terminal of the first user and the HOAF-CP and a user plane second connection between the user terminal and the HOAF-UP;*

*wherein the control plane second connection between the user terminal of the first user and the HOAF-CP, the control plane connection between the HOAF-CP and the terminal side of the second user, the user plane second connection between the user terminal of the first user and the HOAF-UP, and the user plane connection between the HOAF-UP and the terminal side of the second user achieve the session after the handover.*

*54. A method for maintaining session continuity, comprising:*

*establishing a first connection comprising a control plane first connection between a user terminal of a first user and a Handover Anchor Function-Control Plane (HOAF-CP) of an IP multimedia sub-system (IMS) on a home network side of the first user and a user plane first connection between the user terminal and a Handover Anchor Function-User Plane (HOAF-UP) of the IMS on the home network side of the first user;*

*establishing a control plane connection between the HOAF-CP and a terminal side of a second user and a user plane connection between the HOAF-UP and the terminal side of the second user, and establishing a session between the first user and the second user through the control plane first connection, the control plane connection between the HOAF-CP and the terminal side of the second user, the user plane first connection and the user plane connection between the HOAF-UP and the terminal side of the second user;*

*when a handover condition is satisfied, establishing a second connection, wherein the second connection comprises a control plane second connection between the user terminal of the first user and the HOAF-CP and a user plane second connection between the user terminal and the HOAF-UP;*

*continuing the session between the first user and the second user through the control plane second connection, the control plane connection between the HOAF-CP and the terminal side of the second user, the user plane second connection and the user plane connection between the HOAF-UP and the terminal side of the second user.*

*55. The method of claim 56, wherein the control plane first connection and the user plane first connection are connections of Packet Switched (PS)domain, the control plane second connection and the user plane second connection are connections of Circuit Switched (CS) domain.*

*56. A method for maintaining session continuity, comprising:*

*establishing a control plane first connection between a user terminal of a first user and a Handover Anchor Function-Control Plane (HOAF-CP) of an IP multimedia sub-system (IMS) on a home network side of the first user and a user plane first connection between the user terminal and a Handover Anchor Function-User Plane (HOAF-UP) of the IMS on the home network side of the first user;*

*establishing a control plane third connection between the HOAF-CP and a terminal side of a second user and a user plane third connection between the HOAF-UP and the terminal side of the second user, and establishing a session between the first user and the second user through the control plane first connection, the control plane third connection between the HOAF-CP and the terminal side of the second user, the user plane first connection and the user plane third connection between the HOAF-UP and the terminal side of the second user;*

*when a handover condition is satisfied, establishing a control plane second connection between the user terminal of the first user and the HOAF-CP and a user plane second connection between the user terminal and the HOAF-UP;*

*wherein the control plane second connection between the user terminal of the first user and the HOAF-CP, the control plane third connection between the HOAF-CP and the terminal side of the second user, the user plane second connection between the user terminal of the first user and the HOAF-UP, and the user plane third connection between the HOAF-UP and the terminal side of the second user achieve the session after the handover.*

*57. The method of claim 56, wherein the control plane first connection and the user plane first connection are connections of Packet Switched (PS)domain, the control plane second connection and the user plane second connection are connections of Circuit Switched (CS) domain.*

*58. The method of claim 42, wherein the HOAF-CP is a server of an IP multimedia subsystem (IMS).*

*59. The system of claim 48, wherein the HOAF-CP is a server of an IP multimedia subsystem (IMS).*

*60. The method of claim 49, wherein the control plane first connection and the user plane first connection are connections of Packet Switched (PS)domain, the control plane second connection and the user plane second connection are connections of Circuit Switched (CS) domain.*

*61. The system of claim 50, wherein the control plane first connection and the user plane first connection are connections of Packet Switched (PS) domain, the control plane*

*second connection and the user plane second connection are connections of Circuit Switched (CS) domain.*

*62. The system of claim 51, wherein the control plane first connection and the user plane first connection are connections of Packet Switched (PS) domain, the control plane second connection and the user plane second connection are connections of Circuit Switched (CS) domain.*

*63. The method of claim 52, wherein the HOAF-CP is a server of an IP multimedia subsystem (IMS).*

*64. The method of claim 53, wherein the control plane first connection and the user plane first connection are connections of Packet Switched (PS) domain, the control plane second connection and the user plane second connection are connections of Circuit Switched (CS) domain.*

* * * * *